US011892127B2

(12) United States Patent
Jiang

(10) Patent No.: US 11,892,127 B2
(45) Date of Patent: Feb. 6, 2024

(54) LED FILAMENT AND LED BULB LAMP

(71) Applicant: ZHEJIANG SUPER LIGHTING ELECTRIC APPLIANCE CO., LTD, Zhejiang (CN)

(72) Inventor: Tao Jiang, Zhejiang (CN)

(73) Assignee: ZHEJIANG SUPER LIGHTING ELECTRIC APPLIANCE CO., LTD, Jinyun (CN)

( * ) Notice: Subject to any disclaimer, the term of this patent is extended or adjusted under 35 U.S.C. 154(b) by 120 days.

(21) Appl. No.: 17/509,078

(22) Filed: Oct. 25, 2021

(65) Prior Publication Data

US 2022/0042657 A1 Feb. 10, 2022

Related U.S. Application Data

(63) Continuation of application No. 16/042,477, filed on Jul. 23, 2018, now Pat. No. 11,187,384, which is a
(Continued)

(30) Foreign Application Priority Data

Sep. 28, 2014 (CN) ......................... 201410510593.6
Feb. 2, 2015 (CN) ......................... 201510053077.X
(Continued)

(51) Int. Cl.
*F21K 9/232* (2016.01)
*F21K 9/68* (2016.01)
(Continued)

(52) U.S. Cl.
CPC ................ *F21K 9/232* (2016.08); *F21K 9/61* (2016.08); *F21K 9/68* (2016.08); *F21V 23/06* (2013.01);
(Continued)

(58) Field of Classification Search
CPC ... F21K 9/61; F21K 9/68; F21V 23/06; F21V 29/503; F21Y 2107/70; F21Y 2109/00; F21Y 2115/10
See application file for complete search history.

(56) References Cited

U.S. PATENT DOCUMENTS 923,117 A 5/1909 Detwiler
2,688,711 A 9/1954 Camillerapp
(Continued)

FOREIGN PATENT DOCUMENTS

CN 1901206 A 1/2007
CN 201163628 Y 12/2008
(Continued)

*Primary Examiner* — Thien M Le
*Assistant Examiner* — Asifa Habib
(74) *Attorney, Agent, or Firm* — Simon Kuang Lu

(57) ABSTRACT

An LED filament includes a plurality of LED chips arranged in an array substantially along an axial direction of the LED filament and electrically connected with one another; two conductive electrodes disposed corresponding to the array, each of the two conductive electrodes being electrically connected to a corresponding LED chip at an end of the array; an enclosure coated on at least two sides of the array and the two conductive electrodes, and a portion of each of the two conductive electrodes being exposed from the enclosure; a surface of the enclosure defines a surface extending direction along the axial direction of the LED filament, a long side of each of the LED chips defines an LED extending direction, and the surface extending direction and the LED extending direction of at least one of the LED chips define an included angler.

18 Claims, 25 Drawing Sheets

Related U.S. Application Data continuation of application No. 15/723,297, filed on Oct. 3, 2017, now Pat. No. 10,655,792, which is a continuation-in-part of application No. 15/499,143, filed on Apr. 27, 2017, now Pat. No. 10,240,724, which is a continuation-in-part of application No. 15/384,311, filed on Dec. 19, 2016, now Pat. No. 10,487,987, which is a continuation-in-part of application No. 15/366,535, filed on Dec. 1, 2016, now Pat. No. 10,473,271, said application No. 15/723,297 is a continuation-in-part of application No. 15/308, 995, filed on Nov. 4, 2016, now Pat. No. 10,781,979, said application No. 15/366,535 is a continuation-in-part of application No. 15/237,983, filed on Aug. 16, 2016, now Pat. No. 10,228,093, said application No. 15/723,297 is a continuation-in-part of application No. 15/168,541, filed as application No. PCT/CN2015/090815 on Sep. 25, 2015, now Pat. No. 9,995,474.

(30) Foreign Application Priority Data

| | | |
|---|---|---|
| Jun. 10, 2015 | (CN) | 201510316656.9 |
| Jun. 19, 2015 | (CN) | 201510347410.8 |
| Aug. 7, 2015 | (CN) | 201510489363.0 |
| Aug. 17, 2015 | (CN) | 201510502630.3 |
| Sep. 2, 2015 | (CN) | 201510555889.4 |
| Dec. 19, 2015 | (CN) | 201510966906.3 |
| Jan. 22, 2016 | (CN) | 201610041667.5 |
| Apr. 27, 2016 | (CN) | 201610272153.0 |
| Apr. 29, 2016 | (CN) | 201610281600.9 |
| Jun. 3, 2016 | (CN) | 201610394610.3 |
| Jul. 7, 2016 | (CN) | 201610544049.2 |
| Jul. 22, 2016 | (CN) | 201610586388.7 |
| Nov. 1, 2016 | (CN) | 201610936171.4 |
| Dec. 6, 2016 | (CN) | 201611108722.4 |
| Jan. 13, 2017 | (CN) | 201710024877.8 |
| Feb. 14, 2017 | (CN) | 201710079423 |
| Mar. 9, 2017 | (CN) | 201710138009.2 |
| Mar. 23, 2017 | (CN) | 201710180574.5 |
| Apr. 11, 2017 | (CN) | 201710234618.8 |
| May 8, 2017 | (CN) | 201710316641.1 |
| Sep. 18, 2017 | (CN) | 201710839083.7 |
| Sep. 26, 2017 | (CN) | 201710883625.0 |

(51) Int. Cl.

| | |
|---|---|
| ***F21V 23/06*** | (2006.01) |
| ***F21K 9/61*** | (2016.01) |
| ***F21Y 115/10*** | (2016.01) |
| ***F21V 29/503*** | (2015.01) |
| ***F21Y 107/70*** | (2016.01) |
| ***F21Y 109/00*** | (2016.01) |

(52) U.S. Cl.

CPC ......... *F21V 29/503* (2015.01); *F21Y 2107/70* (2016.08); *F21Y 2109/00* (2016.08); *F21Y 2115/10* (2016.08)

(56) References Cited

U.S. PATENT DOCUMENTS

| | | | | |
|---|---|---|---|---|
| 3,437,636 | A | 4/1969 | Angelo | |
| 5,262,505 | A | 11/1993 | Nakashima et al. | |
| 5,859,181 | A | 1/1999 | Zhao et al. | |
| 6,337,493 | B1 | 1/2002 | Tanizawa et al. | |
| 6,346,771 | B1 | 2/2002 | Salam | |
| 6,523,978 | B1 | 2/2003 | Huang | |
| 6,586,882 | B1 | 7/2003 | Harbers | |
| 7,041,766 | B2 | 5/2006 | Yoneda et al. | |
| 7,354,174 | B1 | 4/2008 | Yan | |
| 7,399,429 | B2 | 7/2008 | Liu et al. | |
| 7,482,059 | B2 | 1/2009 | Peng et al. | |
| 7,484,860 | B2 | 2/2009 | Demarest et al. | |
| 7,618,162 | B1 | 11/2009 | Parkyn et al. | |
| 7,618,175 | B1 | 11/2009 | Hulse | |
| 7,667,225 | B1 | 2/2010 | Lee et al. | |
| 7,810,974 | B2 | 10/2010 | van Rijswick et al. | |
| 8,025,816 | B2 | 9/2011 | Murase et al. | |
| 8,240,900 | B2 | 8/2012 | Van Rijswick et al. | |
| 8,400,051 | B2 | 3/2013 | Hakata et al. | |
| 8,455,895 | B2 | 6/2013 | Chai et al. | |
| 8,604,678 | B2 | 12/2013 | Dai et al. | |
| 8,858,027 | B2 | 10/2014 | Takeuchi et al. | |
| 8,915,623 | B1 | 12/2014 | Claudet | |
| 8,933,619 | B1 | 1/2015 | Ou | |
| 8,981,636 | B2 | 3/2015 | Matsuda et al. | |
| 9,016,900 | B2 | 4/2015 | Takeuchi et al. | |
| 9,097,396 | B2 | 8/2015 | Rowlette, Jr. | |
| 9,234,635 | B2 | 1/2016 | Kwisthout | |
| 9,261,242 | B2 | 2/2016 | Ge et al. | |
| 9,285,086 | B2 | 3/2016 | Genier et al. | |
| 9,285,104 | B2 | 3/2016 | Takeuchi et al. | |
| 9,360,188 | B2 | 6/2016 | Kircher et al. | |
| 9,488,767 | B2 | 11/2016 | Nava et al. | |
| 9,732,930 | B2 | 8/2017 | Takeuchi et al. | |
| 9,761,765 | B2 * | 9/2017 | Basin | H01L 33/52 |
| 9,909,724 | B2 | 3/2018 | Marinus et al. | |
| 9,982,854 | B2 | 5/2018 | Ma et al. | |
| 10,066,791 | B2 | 9/2018 | Zhang | |
| 10,094,517 | B2 | 10/2018 | Xiang | |
| 10,094,523 | B2 | 10/2018 | Andrews | |
| 10,260,683 | B2 | 4/2019 | Bergmann et al. | |
| 10,218,129 | B1 | 5/2019 | Lai et al. | |
| 10,281,129 | B1 | 5/2019 | Lai et al. | |
| 10,323,799 | B2 * | 6/2019 | Huang | F21K 9/238 |
| 10,330,297 | B2 | 6/2019 | Kwisthout | |
| 10,415,763 | B2 | 9/2019 | Eckert | |
| 10,436,391 | B2 | 10/2019 | Hsiao et al. | |
| 10,544,905 | B2 | 1/2020 | Jiang et al. | |
| 10,655,792 | B2 | 5/2020 | Jiang | |
| 10,663,117 | B2 | 5/2020 | Chen et al. | |
| 10,767,816 | B1 | 9/2020 | Wu et al. | |
| 10,784,428 | B2 | 9/2020 | Jiang et al. | |
| 10,794,545 | B2 | 10/2020 | Jiang et al. | |
| 10,868,226 | B2 | 12/2020 | Jiang et al. | |
| 10,969,063 | B2 * | 4/2021 | Schlereth | H01L 25/0753 |
| 11,015,764 | B2 | 5/2021 | Jiang et al. | |
| 11,047,532 | B1 | 6/2021 | Chen et al. | |
| 11,143,363 | B2 | 10/2021 | Feit | |
| 11,187,387 | B1 | 11/2021 | Yan et al. | |
| 11,215,326 | B2 | 1/2022 | Yan et al. | |
| 11,231,147 | B2 | 1/2022 | Cao et al. | |
| 11,421,827 | B2 | 8/2022 | Jiang et al. | |
| 11,543,083 | B2 | 1/2023 | Jiang et al. | |
| 2003/0057444 | A1 | 3/2003 | Niki et al. | |
| 2003/0123150 | A1 | 7/2003 | Brickey et al. | |
| 2004/0008525 | A1 * | 1/2004 | Shibata | F21K 9/232 362/240 |
| 2004/0020424 | A1 | 2/2004 | Sellin et al. | |
| 2004/0100192 | A1 | 5/2004 | Yano et al. | |
| 2005/0001227 | A1 | 1/2005 | Niki et al. | |
| 2005/0205881 | A1 | 9/2005 | Yamazoe et al. | |
| 2005/0224822 | A1 | 10/2005 | Liu | |
| 2005/0263778 | A1 | 12/2005 | Hata et al. | |
| 2006/0046327 | A1 | 3/2006 | Shieh et al. | |
| 2006/0163595 | A1 * | 7/2006 | Hsieh | H01L 33/22 257/E33.074 |
| 2007/0121319 | A1 | 5/2007 | Wolf et al. | |
| 2007/0225402 | A1 | 9/2007 | Choi et al. | |
| 2007/0267976 | A1 | 11/2007 | Bohler et al. | |
| 2008/0128730 | A1 * | 6/2008 | Fellows | H01L 33/32 257/E33.061 |
| 2008/0137360 | A1 | 6/2008 | Van Jijswick et al. | |
| 2009/0057704 | A1 | 3/2009 | Seo et al. | |
| 2009/0059593 | A1 | 3/2009 | Tsai | |
| 2009/0122521 | A1 | 5/2009 | Hsu | |

(56) References Cited

U.S. PATENT DOCUMENTS

2009/0152586 A1 6/2009 Lee et al.
2009/0184618 A1 7/2009 Hakata et al.
2009/0212698 A1 8/2009 Bailey
2009/0251882 A1 10/2009 Ratcliffe
2010/0025700 A1 2/2010 Jung et al.
2010/0032694 A1 2/2010 Kim et al.
2010/0047943 A1 2/2010 Lee et al.
2010/0053930 A1 3/2010 Kim et al.
2010/0135009 A1 6/2010 Duncan et al.
2010/0200885 A1 8/2010 Hsu et al.
2010/0265711 A1 10/2010 Lee
2011/0001148 A1 1/2011 Sun et al.
2011/0025205 A1 2/2011 Van Rijswick et al.
2011/0026242 A1 2/2011 Ryu et al.
2011/0031891 A1 2/2011 Lee et al.
2011/0037397 A1 2/2011 Lee et al.
2011/0043592 A1 2/2011 Kinoshita et al.
2011/0049472 A1 3/2011 Kim et al.
2011/0050073 A1 3/2011 Huang
2011/0156086 A1 6/2011 Kim et al.
2011/0210330 A1 9/2011 Yang
2011/0210358 A1 9/2011 Kim et al.
2011/0273863 A1 11/2011 Cai et al.
2011/0278605 A1 11/2011 Agatani et al.
2011/0303927 A1 12/2011 Sanpei et al.
2012/0119647 A1 5/2012 Hsu
2012/0145992 A1 6/2012 Yoo et al.
2012/0161193 A1 6/2012 Hassan
2012/0162965 A1 6/2012 Takeuchi et al.
2012/0169251 A1 7/2012 Lai et al.
2012/0175667 A1 7/2012 Golle et al.
2012/0182757 A1 7/2012 Liang et al.
2012/0256238 A1 10/2012 Ning et al.
2012/0256538 A1 10/2012 Takeuchi et al.
2012/0268936 A1 10/2012 Pickard et al.
2012/0273812 A1 11/2012 Takahashi et al.
2012/0281411 A1* 11/2012 Kajiya .................. H05K 1/189
362/249.02
2012/0293721 A1 11/2012 Ueyama
2012/0300432 A1 11/2012 Matsubayashi et al.
2013/0003346 A1 1/2013 Letoquin et al.
2013/0009179 A1* 1/2013 Bhat .................... H05K 1/0209
257/E33.059
2013/0058080 A1 3/2013 Ge et al.
2013/0058580 A1 3/2013 Ge et al.
2013/0077285 A1 3/2013 Isogai et al.
2013/0099271 A1 4/2013 Hakata et al.
2013/0100640 A1 4/2013 Zhang
2013/0100645 A1 4/2013 Ooya et al.
2013/0141892 A1 6/2013 Okazaki et al.
2013/0147348 A1 6/2013 Motoya et al.
2013/0169174 A1 7/2013 Lee et al.
2013/0215625 A1 8/2013 Takeuchi et al.
2013/0235592 A1 9/2013 Takeuchi et al.
2013/0249381 A1 9/2013 Takeuchi et al.
2013/0264591 A1 10/2013 Hussell
2013/0264592 A1 10/2013 Bergmann et al.
2013/0265796 A1 10/2013 Kwisthout
2013/0271989 A1 10/2013 Hussell et al.
2013/0277705 A1 10/2013 Seo et al.
2013/0293098 A1 11/2013 Li et al.
2013/0301252 A1 11/2013 Hussell et al.
2013/0322072 A1 12/2013 Pu et al.
2014/0022788 A1* 1/2014 Dan .......................... F21V 3/02
362/249.02
2014/0035123 A1 2/2014 Seiji et al.
2014/0049164 A1 2/2014 McGuire et al.
2014/0063829 A1 3/2014 Kushalappa et al.
2014/0071696 A1 3/2014 Park et al.
2014/0096901 A1 4/2014 Hsieh et al.
2014/0103376 A1 4/2014 Ou et al.
2014/0103794 A1 4/2014 Ueda et al.
2014/0141283 A1 5/2014 Lee et al.
2014/0152177 A1 6/2014 Matsuda et al.
2014/0175465 A1 6/2014 Lee et al.
2014/0185269 A1 7/2014 Li
2014/0197440 A1 7/2014 Ye et al.
2014/0217558 A1 8/2014 Tamemoto
2014/0218892 A1 8/2014 Edwards et al.
2014/0225514 A1 8/2014 Pickard
2014/0228914 A1 8/2014 van de Ven et al.
2014/0268779 A1* 9/2014 Sorensen ................ F21K 9/232
362/249.06
2014/0362565 A1 12/2014 Yao et al.
2014/0369036 A1 12/2014 Feng
2014/0375201 A1 12/2014 Su et al.
2015/0003038 A1 1/2015 Liu
2015/0014732 A1 1/2015 DeMille et al.
2015/0022114 A1 1/2015 Kim
2015/0069442 A1 3/2015 Liu et al.
2015/0070871 A1 3/2015 Chen et al.
2015/0070887 A1 3/2015 Yamauchi
2015/0085485 A1 3/2015 Park
2015/0085489 A1 3/2015 Anderson
2015/0097199 A1 4/2015 Chen et al.
2015/0171287 A1* 6/2015 Matsumura ............. H01L 33/50
438/27
2015/0197689 A1 7/2015 Tani et al.
2015/0211723 A1 7/2015 Athalye
2015/0221822 A1 8/2015 Kim et al.
2015/0255440 A1* 9/2015 Hsieh ...................... H01L 24/81
257/88
2015/0312990 A1 10/2015 van de Ven et al.
2015/0323139 A1* 11/2015 Tseng .................... F21V 23/001
362/650
2015/0340347 A1 11/2015 Jung et al.
2016/0056334 A1 2/2016 Jang et al.
2016/0064628 A1* 3/2016 Fujii ..................... H01L 33/505
438/27
2016/0087003 A1 3/2016 Lee et al.
2016/0116120 A1 4/2016 Kwisthout
2016/0197243 A1 7/2016 Lee et al.
2016/0238199 A1 8/2016 Yeung et al.
2016/0348853 A1 12/2016 Tanda et al.
2016/0369949 A1 12/2016 Wu et al.
2016/0369952 A1 12/2016 Weekamp
2016/0372647 A1 12/2016 Seo et al.
2016/0377237 A1 12/2016 Zhang
2017/0012177 A1 1/2017 Trottier
2017/0016582 A1 1/2017 Yang et al.
2017/0040504 A1 2/2017 Chen et al.
2017/0051877 A1 2/2017 Weijers et al.
2017/0084809 A1 3/2017 Jiang et al.
2017/0122498 A1 5/2017 Zalka et al.
2017/0122499 A1 5/2017 Lin et al.
2017/0138542 A1 5/2017 Gielen et al.
2017/0138543 A1 5/2017 Steele et al.
2017/0167663 A1* 6/2017 Hsiao ...................... F21K 9/237
2017/0167711 A1 6/2017 Kadijk
2017/0284607 A1* 10/2017 Cheng ..................... F21V 29/83
2017/0299125 A1 10/2017 Takeuchi et al.
2017/0299126 A1 10/2017 Takeuchi et al.
2017/0330868 A1 11/2017 Pu et al.
2018/0045380 A1 2/2018 Li et al.
2018/0080611 A1 3/2018 Haberkorn et al.
2018/0080612 A1 3/2018 Haberkorn et al.
2018/0106435 A1 4/2018 Wu et al.
2018/0119892 A1 5/2018 Jiang et al.
2018/0172218 A1 6/2018 Feit
2018/0230374 A1 8/2018 Ito et al.
2019/0032858 A1 1/2019 Cao et al.
2019/0049073 A1 2/2019 Eckert
2019/0137047 A1 5/2019 Hu
2019/0139943 A1 5/2019 Tiwari et al.
2019/0186697 A1 6/2019 Jiang et al.
2019/0195434 A1 6/2019 Jiang et al.
2019/0219231 A1 7/2019 Jiang et al.
2019/0219232 A1 7/2019 Takeuchi et al.
2019/0242532 A1 8/2019 Jiang et al.
2019/0264874 A1 8/2019 Jiang et al.
2019/0264875 A1 8/2019 Jiang et al.
2019/0264876 A1 8/2019 Jiang et al.
2019/0271443 A1 9/2019 Jiang et al.
2019/0277483 A1 9/2019 Kwisthout

(56) References Cited

U.S. PATENT DOCUMENTS

| | | | |
|---|---|---|---|
| 2019/0277484 | A1 | 9/2019 | Kwisthout |
| 2019/0301683 | A1 | 10/2019 | Jiang et al. |
| 2019/0301684 | A1 | 10/2019 | Jiang et al. |
| 2019/0309907 | A1 | 10/2019 | Jiang et al. |
| 2019/0315921 | A1 | 10/2019 | Saito et al. |
| 2019/0368666 | A1 | 12/2019 | Jiang et al. |
| 2019/0368667 | A1 | 12/2019 | On et al. |
| 2020/0035876 | A1 | 1/2020 | Jiang et al. |
| 2020/0049315 | A1 | 2/2020 | Wu et al. |
| 2020/0144230 | A1 | 5/2020 | Lin et al. |
| 2020/0161522 | A1 | 5/2020 | Jiang et al. |
| 2020/0176646 | A1 | 6/2020 | Li |
| 2021/0148533 | A1 | 5/2021 | Van Bommel et al. |
| 2021/0381657 | A1 | 12/2021 | Xiong et al. |

FOREIGN PATENT DOCUMENTS

| | | | |
|---|---|---|---|
| CN | 201448620 | U | 5/2010 |
| CN | 101826588 | A | 9/2010 |
| CN | 102121576 | A | 7/2011 |
| CN | 102209625 | A | 10/2011 |
| CN | 202209551 | U | 5/2012 |
| CN | 202252991 | U | 5/2012 |
| CN | 202253168 | U | 5/2012 |
| CN | 202473919 | U | 10/2012 |
| CN | 202719450 | U | 2/2013 |
| CN | 101968181 | B | 3/2013 |
| CN | 102958984 | A | 3/2013 |
| CN | 102969320 | A | 3/2013 |
| CN | 102980054 | A | 3/2013 |
| CN | 202834823 | U | 3/2013 |
| CN | 103123949 | A | 5/2013 |
| CN | 203131524 | U | 8/2013 |
| CN | 103335226 | A | 10/2013 |
| CN | 203367275 | U | 12/2013 |
| CN | 103542308 | A | 1/2014 |
| CN | 103560128 | A | 2/2014 |
| CN | 103682042 | A | 3/2014 |
| CN | 203477967 | U | 3/2014 |
| CN | 103700652 | A | 4/2014 |
| CN | 103872224 | A | 6/2014 |
| CN | 103890481 | A | 6/2014 |
| CN | 203628311 | U | 6/2014 |
| CN | 203628391 | U | 6/2014 |
| CN | 203628400 | U | 6/2014 |
| CN | 203656627 | U | 6/2014 |
| CN | 203671312 | U | 6/2014 |
| CN | 103939758 | A | 7/2014 |
| CN | 103956421 | A | 7/2014 |
| CN | 103972364 | A | 8/2014 |
| CN | 103994349 | A | 8/2014 |
| CN | 203771136 | U | 8/2014 |
| CN | 203857313 | U | 10/2014 |
| CN | 203880468 | U | 10/2014 |
| CN | 203907265 | U | 10/2014 |
| CN | 203910792 | U | 10/2014 |
| CN | 203932049 | U | 11/2014 |
| CN | 203940268 | U | 11/2014 |
| CN | 204062539 | U | 12/2014 |
| CN | 104295945 | A | 1/2015 |
| CN | 104319345 | A | 1/2015 |
| CN | 204083941 | U | 1/2015 |
| CN | 204088366 | U | 1/2015 |
| CN | 204153513 | U | 2/2015 |
| CN | 104456165 | A | 3/2015 |
| CN | 104600174 | A | 5/2015 |
| CN | 104600181 | A | 5/2015 |
| CN | 204328550 | U | 5/2015 |
| CN | 104716247 | A | 6/2015 |
| CN | 204387765 | U | 6/2015 |
| CN | 204459844 | U | 7/2015 |
| CN | 204494343 | U | 7/2015 |
| CN | 104913217 | A | 9/2015 |
| CN | 104979455 | A | 10/2015 |
| CN | 105042354 | A | 11/2015 |
| CN | 105090789 | A | 11/2015 |
| CN | 105098032 | A | 11/2015 |
| CN | 105140381 | A | 12/2015 |
| CN | 105161608 | A | 12/2015 |
| CN | 105226167 | A | 1/2016 |
| CN | 204986570 | U | 1/2016 |
| CN | 105371243 | A | 3/2016 |
| CN | 205081145 | U | 3/2016 |
| CN | 105609621 | A | 5/2016 |
| CN | 205264758 | U | 5/2016 |
| CN | 205350910 | U | 6/2016 |
| CN | 105789195 | A | 7/2016 |
| CN | 106060630 | A | 10/2016 |
| CN | 106468405 | A | 3/2017 |
| CN | 106898681 | A | 6/2017 |
| CN | 106939973 | A | 7/2017 |
| CN | 107035979 | A | 8/2017 |
| CN | 107123641 | A | 9/2017 |
| CN | 107170733 | A | 9/2017 |
| CN | 107204342 | A | 9/2017 |
| CN | 206563190 | U | 10/2017 |
| CN | 107314258 | A | 11/2017 |
| CN | 206973307 | U | 2/2018 |
| CN | 207034659 | U | 2/2018 |
| CN | 108039402 | A | 5/2018 |
| CN | 207849021 | U | 9/2018 |
| CN | 109155306 | A | 1/2019 |
| CN | 209354987 | U | 9/2019 |
| CN | 111550687 | A | 8/2020 |
| EP | 2535640 | A1 | 12/2012 |
| EP | 2631958 | A1 | 8/2013 |
| EP | 2760057 | A1 | 7/2014 |
| EP | 2567145 | B1 | 4/2016 |
| GB | 2547085 | A | 8/2017 |
| JP | 3075689 | U | 2/2001 |
| JP | 2001126510 | A | 5/2001 |
| JP | 2003037239 | A | 2/2003 |
| JP | 2006202500 | A | 8/2006 |
| JP | 2012064568 | A | 3/2012 |
| JP | 2012099726 | A | 5/2012 |
| JP | 2013021346 | A | 1/2013 |
| JP | 2013225587 | A | 10/2013 |
| JP | 2014032981 | A | 2/2014 |
| JP | 2014143156 | A | 8/2014 |
| KR | 20140132517 | A | 11/2014 |
| WO | 2012053134 | A1 | 4/2012 |
| WO | 2014012346 | A1 | 1/2014 |
| WO | 2014167458 | A1 | 10/2014 |
| WO | 2017037010 | A1 | 3/2017 |
| WO | 2017085063 | A1 | 5/2017 |
| WO | 2017186150 | A1 | 11/2017 |

* cited by examiner

LED FILAMENT AND LED BULB LAMP

CROSS-REFERENCE TO RELATED APPLICATIONS

This application is a continuation application of U.S. application Ser. No. 16/042,477 filed on 2018 Jul. 23, which is a continuation application claiming benefits of U.S. application Ser. No. 15/723,297 filed on 2017 Oct. 3 and a continuation-in-part application claiming benefits of U.S. application Ser. No. 15/308,995 filed on 2016 Nov. 4, U.S. application Ser. No. 15/168,541 filed on 2016 May 31, and U.S. application Ser. No. 15/499,143 filed on 2017 Apr. 27, which is hereby incorporated by reference in their entirety.

This application claims priority to Chinese Patent Applications No. 201410510593.6 filed on 2014 Sep. 28; No. 201510053077.X filed on 2015 Feb. 2; No. 201510489363.0 filed on 2015 Aug. 7; No. 201510555889.4 filed on 2015 Sep. 2; No. 201510316656.9 filed on 2015 Jun. 10; No. 201510347410.8 filed on 2015 Jun. 19; No. 201510502630.3 filed on 2015 Aug. 17; No. 201510966906.3 filed on 2015 Dec. 19; No. 201610041667.5 filed on 2016 Jan. 22; No. 201610281600.9 filed on 2016 Apr. 29; No. 201610272153.0 filed on 2016 Apr. 27; No. 201610394610.3 filed on 2016 Jun. 3; No. 201610586388.7 filed on 2016 Jul. 22; No. 201610544049.2 filed on 2016 Jul. 7; No. 201610936171.4 filed on 2016 Nov. 1; No. 201611108722.4 filed on 2016 Dec. 6; No. 201610281600.9 filed on 2016 Apr. 29; No. 201710024877.8 filed on 2017 Jan. 13; No. 201710079423.0 filed on 2017 Feb. 14; No. 201710138009.2 filed on 2017 Mar. 9; No. 201710180574.5 filed on 2017 Mar. 23; No. 201710234618.8 filed on 2017 Apr. 11; No. 201710316641.1 filed on 2017 May 8; No. 201710839083.7 filed on 2017 Sep. 18; and No. 201710883625.0 filed on 2017 Sep. 26, which is hereby incorporated by reference in their entirety.

FIELD OF THE INVENTION

The disclosure relates to a lighting field, in particular, to Led filaments and LED light bulbs.

BACKGROUND

LED lamps have the advantages of long service life, small size and environmental protection, etc., so their applications are increasing more and more. However, the light emitting surface of the LED lamps generally is small due to the LED packaging holder and the substrate which blocks the light, and the LED lamps presents the status of lighting in half of circumference where the angle of the light distribution is less than 180 degree.

To achieve a similar light distribution with incandescent lamp of which the light distribution is more than 180 degree, some LED bulb lamps adopt COB (Chip On Board) integrated light sources and is configured with light distribution lens, and some adopt SMD (Surface Mount Technology) light sources arranged on the substrate in an encircling manner. Nevertheless, the light shape curves of these LED bulb lamps are not smooth and have higher local jitter, which result in a situation in which the brightness transits unevenly.

In addition, the traditional LED bulb lamp generally has a glass lamp housing which is fragile and the glass fragments can hurt users easily, further, after being broken, the exposed and charged part in the lamp body, such as the light source, solder joints on the substrate or the wires on the lamp substrate etc., will lead to an accident of electric shock easily and result in the risk of personal safety.

Recently, LED light bulbs each of which has an LED filament for emitting light are commercially available. The LED filament includes a substrate plate and several LEDs on the substrate plate. The effect of illumination of the LED light bulb has room for improvement. A traditional light bulb having a tungsten filament can create the effect of even illumination light because of the nature of the tungsten filament; however, the LED filament is hard to generate the effect of even illumination light. There are some reasons as to why the LED filament is hard to create the effect of even illumination light. One reason is that the substrate plate blocks light rays emitted from the LEDs. Another reason is that the LED generates point source of light, which leads to the concentration of light rays. In contrast, to reach the effect of even illumination light requires even distribution of light rays. The LEDs in the LED filament are aligned with an axis of the LED filament. Postures and illumination directions of the LEDs are identical. It is hard to provide omnidirectional light for the LED filament since light rays from the LEDs in the LED filament are concentrated towards one direction.

In addition, a traditional light bulb having a tungsten filament with elaborate curvatures and varied shapes could present an aesthetical appearance, especially when the traditional light bulb is lighting. The LED filament of the LED light bulb is difficult to be bent to form curvature because the substrate plate causes less flexibility. Further, electrodes on the LED filament and wires connecting the electrodes with the LEDs may be broken or disconnected when the LED filament is bent due to stress concentration.

SUMMARY OF THE INVENTION

The disclosure relates to an LED filament comprising: a plurality of LED chips arranged in an array substantially along an axial direction of the LED filament and electrically connected with one another; two conductive electrodes disposed corresponding to the array, each of the two conductive electrodes being electrically connected to a corresponding LED chip at an end of the array; and an enclosure coated on at least two sides of the array and the two conductive electrodes, a portion of each of the two conductive electrodes being exposed from the enclosure; a surface of the enclosure defines a surface extending direction along the axial direction of the LED filament, a long side of each of the LED chips defines an LED extending direction, and the surface extending direction and the LED extending direction of at least one of the LED chips define an included angle.

In accordance with an embodiment of the present invention, the included angle is an acute angle.

In accordance with an embodiment of the present invention, the surface extending direction is defined by a part of the surface in a section of the LED filament along the axial direction, and the LED extending direction is defined by the long side of the LED chip in the section.

In accordance with an embodiment of the present invention, the part of the surface in the section is overlapped by the LED chip in the section along a radial direction perpendicular to the axial direction of the LED filament.

In accordance with an embodiment of the present invention, the long side of each of the LED chips is parallel with a light emitting face of the corresponding LED chip.

In accordance with an embodiment of the present invention, the enclosure comprises a top layer and a base layer, the base layer is coated on one side of the array, the top layer is coated on other sides of the array, the base layer has a base plane away from the top layer, the top layer has a top plane away from the base layer, and the surface extending direction is defined by the top plane or the base plane.

In accordance with an embodiment of the present invention, the plurality of LED chips are interposed in the enclosure in a shape selecting from a group consisting of a wave-shape, a saw tooth shape, a bended shape, and a curved shape.

DETAILED DESCRIPTION

In order to make the objects, technical solutions and advantages of the invention more apparent, the invention will be further illustrated in details in connection with accompanying figures and embodiments hereinafter. It should be understood that the embodiments described herein are just for explanation, but not intended to limit the invention.

Figure 1A:
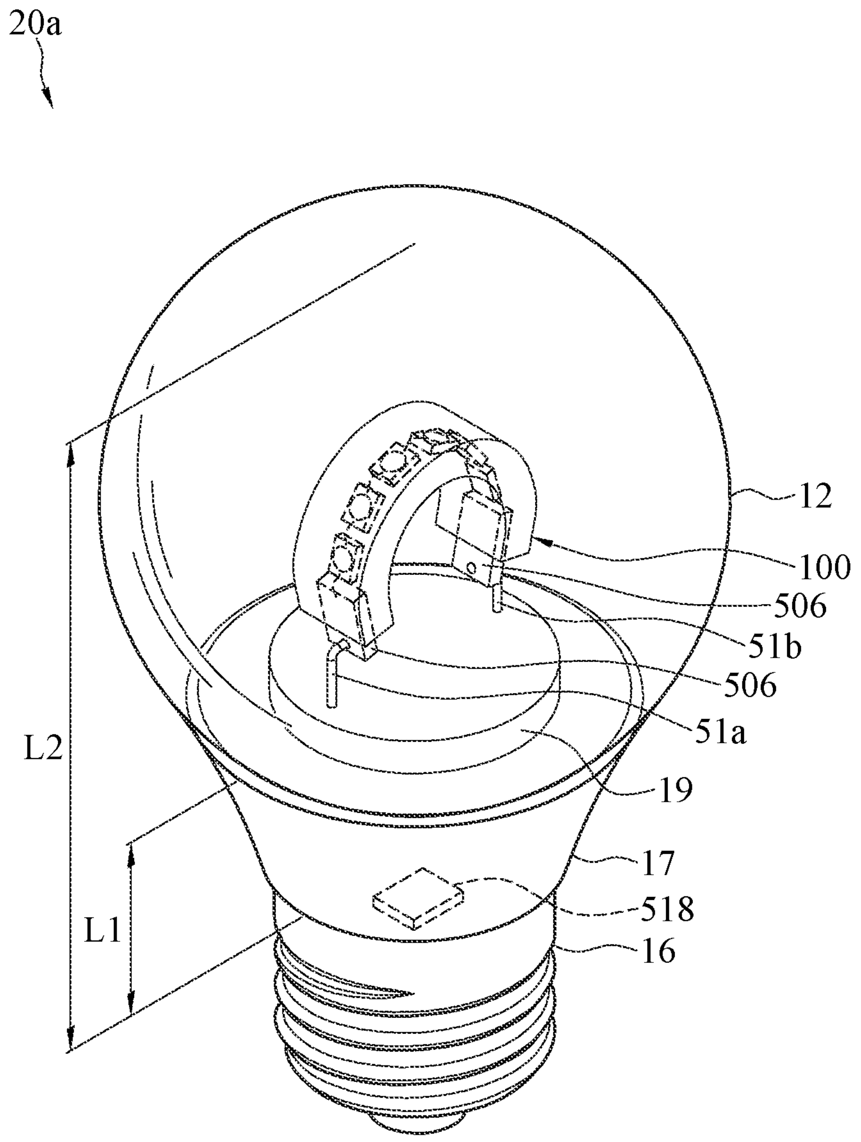
FIG. 1A to FIG. 1C illustrate perspective views of LED light bulbs according to different embodiments of the present disclosure.
Figure 1B:
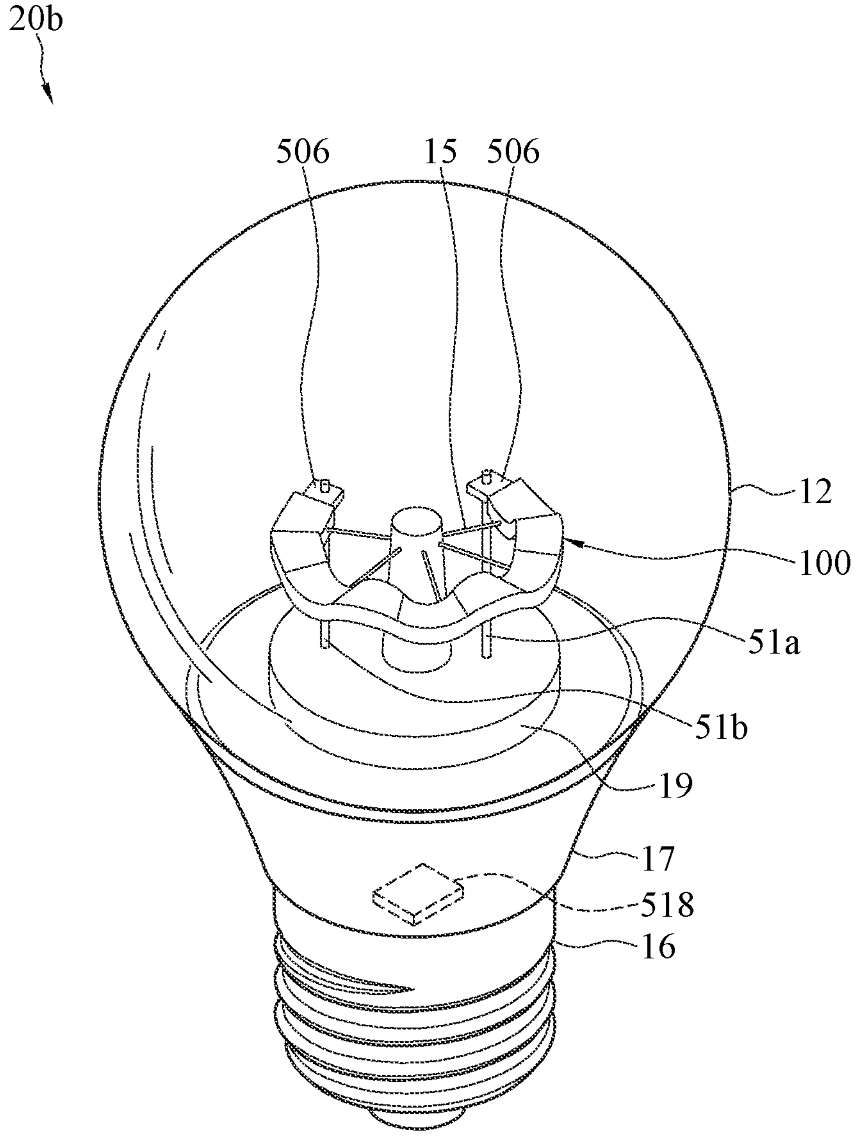

Please refer to FIGS. 1A and 1B which illustrate a perspective view of LED light bulb applying the LED filaments according to a first and a second embodiments. The LED light bulb 20*a*, 20*b* comprises a bulb shell 12, a bulb base 16 connected with the bulb shell 12, at least two conductive supports 51*a*, 51*b* disposed in the bulb shell 12, a driving circuit 518 electrically connected with both the conductive supports 51*a*, 51*b* and the bulb base 16, and a single LED filament 100 disposed in the bulb shell 12.

The conductive supports 51*a*, 51*b* are used for electrically connecting with the conductive electrodes 506 and for supporting the weight of the LED filament 100. The bulb base 16 is used to receive electrical power. The driving circuit 518 receives the power from the bulb base 16 and drives the LED filament 100 to emit light. Due that the LED filament 100 emits light like the way a point light source does, the LED light bulb 20*a*, 20*b* may emit omnidirectional light. In this embodiment, the driving circuit 518 is disposed inside the LED light bulb. However, in some embodiments, the driving circuit 518 may be disposed outside the LED bulb.

In the embodiment of FIG. 1A, the LED light bulb 20*a* comprises two conductive supports 51*a*, 51*b*. In an embodiment, the LED light bulb may comprise more than two conductive supports 51*a*, 51*b* depending upon the design.

The bulb shell 12 may be shell having better light transmittance and thermal conductivity; for example, but not limited to, glass or plastic shell. Considering a requirement of low color temperature light bulb on the market, the interior of the bulb shell 12 may be appropriately doped with a golden yellow material or a surface inside the bulb shell 12 may be plated a golden yellow thin film for appropriately absorbing a trace of blue light emitted by a part of the LED chips 102, 104, so as to downgrade the color temperature performance of the LED bulb 20*a*, 20*b*. A vacuum pump may swap the air as the nitrogen gas or a mixture of nitrogen gas and helium gas in an appropriate proportion in the interior of the bulb shell 12, so as to improve the thermal conductivity of the gas inside the bulb shell 12 and also remove the water mist in the air. The air filled within the bulb shell 12 may be at least one selected from the group substantially consisting of helium (He), and hydrogen (H2). The volume ratio of Hydrogen to the overall volume of the bulb shell 12 is from 5% to 50%. The air pressure inside the bulb shell may be 0.4 to 1.0 atm (atmosphere). According to the embodiments of FIGS. 1A and 1B, each of the LED light bulbs 20*a*, 20*b* comprises a stem 19 in the bulb shell 12 and a heat dissipating element (i.e. heat sink) 17 between the bulb shell 12 and the bulb base 16. In the embodiment, the bulb base 16 is indirectly connected with the bulb shell 12 via the heat dissipating element 17. Alternatively, the bulb base 16 can be directly connected with the bulb shell 12 without the heat dissipating element 17. The LED filament 100 is connected with the stem 19 through the conductive supports 51*a*, 51*b*. The stem 19 may be used to swap the air inside the bulb shell 12 with nitrogen gas or a mixture of nitrogen gas and helium gas. The stem 19 may further provide heat conduction effect from the LED filament 100 to outside of the bulb shell 12. The heat dissipating element 17 may be a hollow cylinder surrounding the opening of the bulb shell 12, and the interior of the heat dissipating element 17 may be equipped with the driving circuit 518. The exterior of the heat dissipating element 17 contacts outside gas for thermal conduction. The material of the heat dissipating element 17 may be at least one selected from a metal, a ceramic, and a plastic with a good thermal conductivity effect. The heat dissipating element 17 and the stem 19 may be integrally formed in one piece to obtain better thermal conductivity in comparison with the traditional LED light bulb whose thermal resistance is increased due that the screw of the bulb base is glued with the heat dissipating element.

Please referring to FIG. 1B, the LED filament 100 is bent to form a portion of a contour and to form a wave shape having wave crests and wave troughs. In the embodiment, the outline of the LED filament 100 is a circle when being observed in a top view and the LED filament 100 has the wave shape when being observed in a side view. Alternatively, the outline of the LED filament 100 can be a wave shape or a petal shape when being observed in a top view and the LED filament 100 can have the wave shape or a line shape when being observed in a side view. In order to appropriately support the LED filament 100, the LED light bulb 20*b* further comprises a plurality of supporting arms 15 which are connected with and supports the LED filament 100. The supporting arms 15 may be connected with the wave crest and wave trough of the waved shaped LED filament 100. In this embodiment, the arc formed by the filament 100 is around 270 degrees. However, in other embodiment, the arc formed by the filament 100 may be approximately 360 degrees. Alternatively, one LED light bulb 20*b* may comprise two LED filaments 100 or more. For example, one LED light bulb 20*b* may comprise two LED filaments 100 and each of the LED filaments 100 is bent to form approximately 180 degrees arc (semicircle). Two semicircle LED filaments 100 are disposed together to form an approximately 360 circle. By the way of adjusting the arc formed by the LED filament 100, the LED filament 100 may provide with omnidirectional light. Further, the structure of one-piece filament simplifies the manufacturing and assembly procedures and reduces the overall cost.

The LED filament 100 has no any substrate plate that the conventional LED filament usually has; therefore, the LED filament 100 is easy to be bent to form elaborate curvatures and varied shapes, and structures of conductive electrodes 506 and wires connecting the conductive electrodes 506 with the LEDs inside the LED filament 100 are tough to prevent damages when the LED filament 100 is bent. The details of the LED filament 100 will be discussed later.

In some embodiment, the supporting arm 15 and the stem 19 may be coated with high reflective materials, for example, a material with white color. Taking heat dissipating characteristics into consideration, the high reflective materials may be a material having good absorption for heat radiation like graphene. Specifically, the supporting arm 15 and the stem 19 may be coated with a thin film of graphene.

Figure 1C:
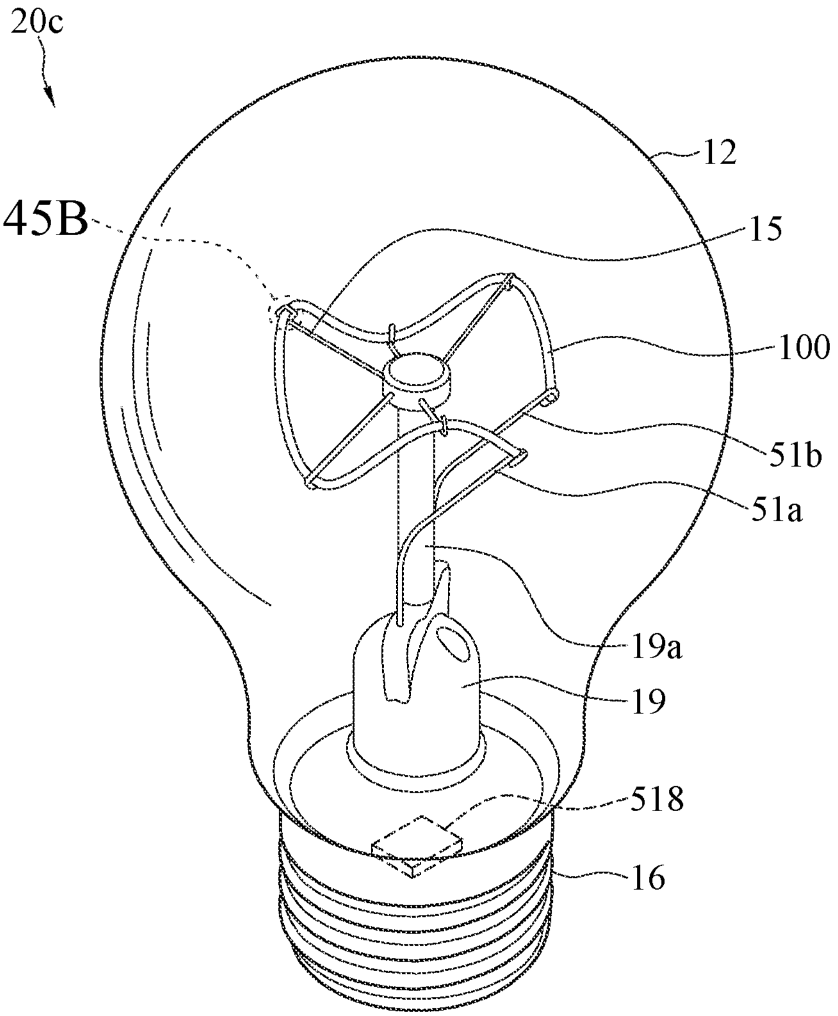

Please refer to FIG. 1C. FIG. 1C illustrates a perspective view of an LED light bulb according to a third embodiment of the present disclosure. According to the third embodiment, the LED light bulb 20*c* comprises a bulb shell 12, a bulb base 16 connected with the bulb shell 12, two conductive supports 51*a*, 51*b* disposed in the bulb shell 12, a driving circuit 518 electrically connected with both the conductive supports 51*a*, 51*b* and the bulb base 16, a stem 19, supporting arms 15 and a single LED filament 100.

The cross-sectional size of the LED filaments 100 is small than that in the embodiments of FIGS. 1A and 1B. The conductive electrodes 506 of the LED filaments 100 are electrically connected with the conductive supports 51*a*, 51*b* to receive the electrical power from the driving circuit 518. The connection between the conductive supports 51*a*, 51*b* and the conductive electrodes 506 may be a mechanical pressed connection or soldering connection. The mechanical connection may be formed by firstly passing the conductive supports 51*a*, 51*b* through the through holes 506*h* (shown in FIG. 2A) and secondly bending the free end of the conductive supports 51*a*, 51*b* to grip the conductive electrodes 506. The soldering connection may be done by a soldering process with a silver-based alloy, a silver solder, a tin solder.

Similar to the first and second embodiments shown in FIGS. 1A and 1B, the LED filament 100 shown in FIG. 1C is bent to form a contour from the top view of FIG. 1C. In the embodiment of FIG. 1C, the LED filament 100 is bent to form a wave shape from side view. The shape of the LED filament 100 is novel and makes the illumination more uniform. In comparison with a LED bulb having multiple LED filaments, single LED filament 100 has less connecting spots. In implementation, single LED filament 100 has only two connecting spots such that the probability of defect soldering or defect mechanical pressing is decreased.

In some embodiments, four quadrants may be defined in a top view of an LED light bulb (e.g., the LED light bulb 20*b* shown in FIG. 1B or the LED light bulb 20*c* shown in FIG. 1C), and the origin of the four quadrants may be defined as a center of a stem/stand of the LED light bulb in the top view (e.g., a center of the top of the stand of the stem 19 shown in FIG. 1B or a center of the top of the stand 19*a* shown in FIG. 1C). The LED filament of the LED light bulb (e.g., the LED filaments 100 shown in FIG. 1B and FIG. 1C) in the top view may be presented as an annular structure, shape or, contour. The LED filament presented in the four quadrants in the top view may be symmetric. For example, the structure of a portion of the LED filament in the first quadrant is symmetric with that of a portion of the LED filament in the second quadrant, in the third quadrant, or in the fourth quadrant. The LED filament presented in the four quadrants in the top view may be in point symmetry (e.g., being symmetric with the origin of the four quadrants) or in line symmetry (e.g., being symmetric with one of the two axis the four quadrants).

A tolerance (a permissible error) of the symmetric structure of the LED filament in the four quadrants in the top view may be 20%-50%. For example, in a case that the structure of a portion of the LED filament in the first quadrant is symmetric with that of a portion of the LED filament in the second quadrant, a designated point on portion of the LED filament in the first quadrant is defined a first position, a symmetric point to the designated point on portion of the LED filament in the second quadrant is defined a second position, and the first position and the second position may be exactly symmetric or be symmetric with 20%-50% difference.

In addition, a length of a portion of the LED filament in one of the four quadrants in the top view is substantially equal to that of a portion of the LED filament in another one of the four quadrants in the top view. The lengths of portions of the LED filament in different quadrants in the top view may also have 20%-50% difference.

In some embodiments, four quadrants may be defined in a side view of an LED light bulb (e.g., the LED light bulb 20*a* shown in FIG. 1A or the LED light bulb 20*c* shown in FIG. 1C). In such case, a stand may be defined as the Y-axis, and the X-axis may cross a middle of the stand (e.g., the stand 19*a* of the LED light bulb 20*c* shown in FIG. 1C) while the origin of the four quadrants may be defined as the middle of the stand. Portions of the LED filament presented in the first quadrant and the second quadrant (the upper quadrants) in the side view may be symmetric (e.g., in line symmetry with the Y-axis) in structure; portions of the LED filament presented in the third quadrant and the fourth quadrant (the lower quadrants) in the side view may be symmetric (e.g., in line symmetry with the Y-axis) in structure. Additionally, the portions of the LED filament presented in the upper quadrants in the side view may be asymmetric with the portions of the LED filament presented in the lower quadrants in the side view. In particular, the portion of the LED filament presented in the first quadrant and the fourth quadrant in the side view is asymmetric, and the portion of the LED filament presented in the second quadrant and the third quadrant in the side view is asymmetric.

A tolerance (a permissible error) of the symmetric structure of the LED filament in the first quadrant and the second quadrant in the side view may be 20%-50%. For example, a designated point on portion of the LED filament in the first quadrant is defined a first position, a symmetric point to the designated point on portion of the LED filament in the second quadrant is defined a second position, and the first position and the second position may be exactly symmetric or be symmetric with 20%-50% difference.

In addition, a length of a portion of the LED filament in the first quadrant in the side view is substantially equal to that of a portion of the LED filament in the second quadrant in the side view. A length of a portion of the LED filament in the third quadrant in the side view is substantially equal to that of a portion of the LED filament in the fourth quadrant in the side view. However, the length of the portion of the LED filament in the first quadrant or the second quadrant in the side view is different from the length of the portion of the LED filament in the third quadrant or the fourth quadrant in the side view. In some embodiment, the length of the portion of the LED filament in the third quadrant or the fourth quadrant in the side view may be less than that of the portion of the LED filament in the first quadrant or the second quadrant in the side view. The lengths of portions of the LED filament in the first and the second quadrants or in the third and the fourth quadrants in the side view may also have 20%-50% difference.

Figure 2A:
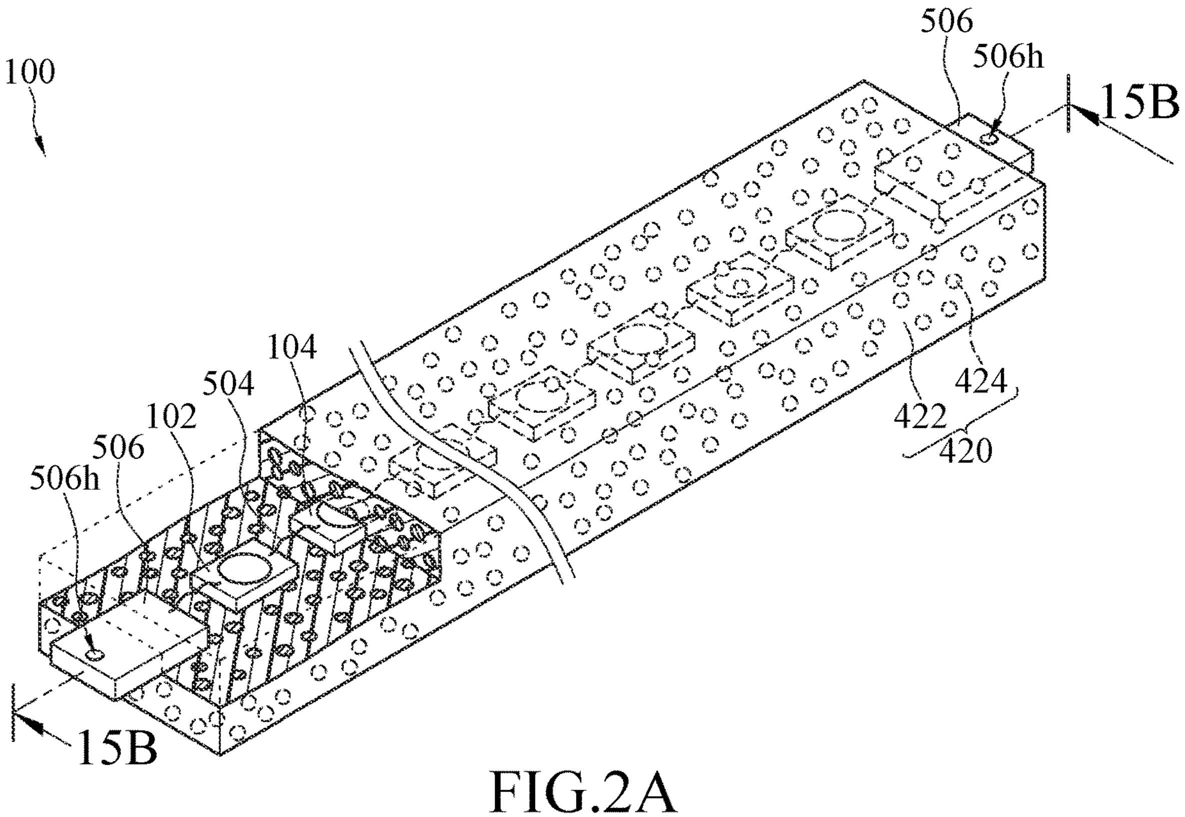
FIG. 2A and FIG. 2B respectively illustrate a perspective view and a partially cross sectional view of an LED filament according to an embodiment of the present disclosure.
Figure 2B:
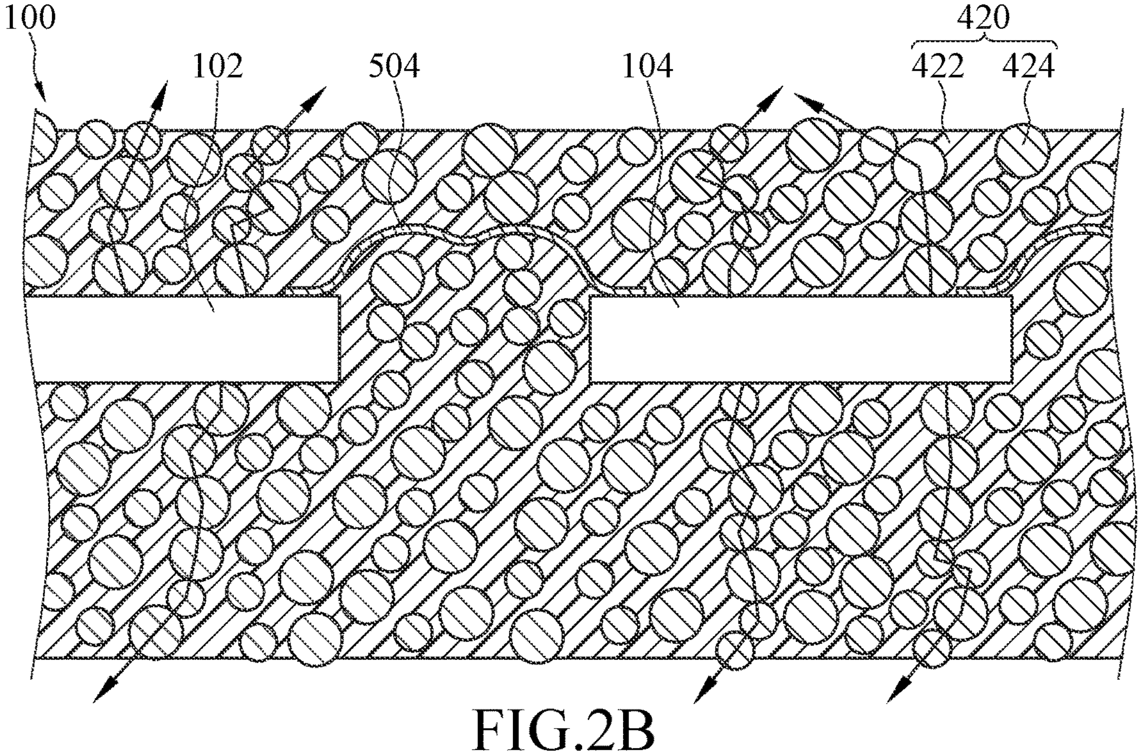

Please refer to FIGS. 2A and 2B. FIG. 2A illustrates a perspective view of an LED filament with partial sectional view according to a first embodiment of the present disclosure while FIG. 2B illustrates a partial cross-sectional view at section 15B-15B of FIG. 2A. According to the first embodiment, the LED filament 100 comprises a plurality of LED chips 102, 104, at least two conductive electrodes 506, and a light conversion coating 420. The conductive electrodes 506 are disposed corresponding to the plurality of LED chips 102, 104. The LED chips 102, 104 are electrically coupled together. The conductive electrodes 506 are electrically connected with the plurality of LED chips 102, 104. The light conversion coating 420 coats on at least two sides of the LED chips 102, 104 and the conductive electrodes 506. The light conversion coating 420 exposes a portion of two of the conductive electrodes 506. The light conversion coating 420 comprises an adhesive 422 and a plurality of phosphors 424.

LED filament 100 emits light while the conductive electrodes 506 are applied with electrical power (electrical current sources or electrical voltage sources). In this embodiment, the light emitted from the LED filament 100 is substantially close to 360 degrees light like that from a point light source. An LED light bulb 20_a_, 20_b_, illustrated is in FIGS. 1A and 1B, utilizing the LED filament 100 is capable of emitting omnidirectional light, which will be described in detailed in the followings.

As illustrated in the FIG. 2A, the cross-sectional outline of the LED filament 100 is rectangular. However, the cross-sectional outline of the LED filament 100 is not limited to rectangular, but may be triangle, circle, ellipse, square, diamond, or square with chamfers.

Each of LED chips 102, 104 may comprise a single LED die or a plurality of LED dies. In the embodiment, each of the LED chips 102, 104 is an LED die without any package. The outline of the LED chip 102, 104 may be, but not limited to, a strip shape. The number of the LED chips 102, 104 having strip shapes of the LED filament 100 could be less, and, correspondingly the number of the electrodes of the LED chips 102, 104 is less, which can improve the illuminating efficiency since the electrodes may shield the illumination of the LED chip, thereby affecting the illumination efficiency. In addition, the LED chips 102, 104 may be coated on their surfaces with a conductive and transparent layer of Indium Tin Oxide (ITO).

The LED chips 102, 104 may comprise sapphire substrate or transparent substrate. Consequently, the substrates of the LED chips 102, 104 do not shield/block light emitted from the LED chips 102, 104. In other words, the LED chips 102, 104 are capable of emitting light from each side of the LED chips 102, 104.

The electrical connections among the plurality of LED chips 102, 104 and the conductive electrodes 506, in this embodiment, may be shown in FIG. 2A. The LED chips 102, 104 are connected in series and the conductive electrodes 506 are disposed on and electrically and respectively connected with the two ends of the series-connected LED chips 102, 104. However, the connections between the LED chips 102, 104 are not limited to that in FIG. 2A. Alternatively, the connections may be that two adjacent LED chips 102, 104 are connected in parallel and then the parallel-connected pairs are connected in series.

According to this embodiment, the conductive electrodes 506 may be, but not limited to, metal electrodes. The conductive electrodes 506 are disposed at two ends of the series-connected LED chips 102, 104 and a portion of each of the conductive electrodes 506 are exposed out of the light conversion coating 420. The arrangement of the conductive electrodes 506 is not limited to the aforementioned embodiment.

Please refer to FIGS. 2A and 2B again. According to this embodiment, the LED filament 100 further comprises conductive wires 540 for electrically connecting the adjacent LED chips 102, 104 and conductive electrodes 506. The conductive wires 540 may be gold wires formed by a wire bond of the LED package process, like Q-type. In an embodiment, the conductive wire 540 is naturally arched between two adjacent LED chips 102, 104 and between the LED chip 102 and the conductive electrode 506. In some embodiments, according to FIG. 2B, the conductive wires 540 are of M shape. The M shape here is not to describe that the shape of the conductive wires 540 exactly looks like letter M, but to describe a shape which prevents the wires from being tight and provides buffers when the conductive wires 540 or the LED filament 100 is stretched or bended. Specifically, the M shape may be any shape formed by a conductive wire 540 whose length is longer than the length of a wire which naturally arched between two adjacent LED chips 102, 104. The M shape includes any shape which could provide buffers while the conductive wires 104 are bended or stretched; for example, S shape.

The light conversion coating 420 comprises adhesive 422 and phosphors 424. The light conversion coating 420 may, in this embodiment, wrap or encapsulate the LED chips 102, 104 and the conductive electrodes 506. In other words, in this embodiment, each of six sides of the LED chips 102, 104 is coated with the light conversion coating 420; preferably, but not limited to, is in direct contact with the light conversion coating 420. However, at least two sides of the LED chips 102, 104 may be coated with the light conversion coating 420. Preferably, the light conversion coating 420 may directly contact at least two sides of the LED chips 102, 104. The two directly-contacted sides may be the major surfaces which the LED chips emit light. Referring to FIG.

2A, the major two surfaces may be the top and the bottom surfaces. In other words, the light conversion coating 420 may directly contact the top and the bottom surfaces of the LED chips 102, 104 (upper and lower surfaces of the LED chips 102, 104 shown in FIG. 2B). Said contact between each of six sides of the LED chips 102, 104 and the light conversion coating 420 may be that the light conversion coating 420 directly or indirectly contacts at least a portion of each side of the LED chips 102, 104. Specifically, one or two sides of the LED chips 102, 104 may be in contact with the light conversion coating 420 through die bond glue. The light conversion coating 420 may further comprise heat dissipation particles (such as nanoparticle oxide) to improve the effect of heat dissipation.

The phosphors 424 of the light conversion coating 420 absorb some form of radiation to emit light. For instance, the phosphors 424 absorb light with shorter wavelength and then emit light with longer wavelength. In one embodiment, the phosphors 424 absorb blue light and then emit yellow light. The blue light which is not absorbed by the phosphors 424 mixes with the yellow light to form white light. According to the embodiment where six sides of the LED chips 102, 104 are coated with the light conversion coating 420, the phosphors 424 absorb light with shorter wavelength out of each of the sides of the LED chips 102, 104 and emit light with longer wavelength. The mixed light (longer and shorter wavelength) is emitted from the outer surface of the light conversion coating 420 which surrounds the LED chips 102, 104 to form the main body of the LED filament 100. In other words, each of sides of the LED filament 100 emits the mixed light.

The light conversion coating 420 may expose a portion of two of the conductive electrodes 506. Phosphors 424 are harder than the adhesive 422. The size of the phosphors 424 may be 1 to 30 um (micrometer) or 5 to 20 um. The size of the same phosphors 424 are generally the same. In FIG. 2B, the reason why the cross-sectional sizes of the phosphors 424 are different is the positions of the cross-section for the phosphors 424 are different. The adhesive 422 may be transparent, for example, epoxy resin, modified resin or silica gel, and so on.

The composition ratio of the phosphors 424 to the adhesive 422 may be 1:1 to 99:1, or 1:1 to 50:1. The composition ratio may be volume ratio or weight ratio. Please refer to FIG. 2B again. The amount of the phosphors 424 is greater than the adhesive 422 to increase the density of the phosphors 424 and to increase direct contacts among phosphors 424. The arrow lines on FIG. 2B show thermal conduction paths from LED chips 102, 104 to the outer surfaces of the LED filament 100. The thermal conduction paths are formed by the adjacent and contacted phosphors. The more direct contacts among the phosphors 424, the more thermal conduction paths forms, the greater the heat dissipating effect the LED filament 100 has, and the less the light conversion coating becomes yellow. Additionally, the light conversion rate of the phosphors 424 may reach 30% to 70% and the total luminance efficiency of the LED light bulb 20*a*, 20*b* is increased. Further, the hardness of the LED filament 100 is increased, too. Accordingly, the LED filament 100 may stand alone without any embedded supporting component like rigid substrates. Furthermore, the surfaces of cured LED filament 100 are not flat due to the protrusion of some of the phosphors 424. In other words, the roughness of the surfaces and the total surface area are increased. The increased roughness of the surfaces improves the amount of light passing the surfaces. The increased surface area enhances the heat dissipating effect. As a result, the overall luminance efficiency of the LED light filament 100 is raised.

As mention above, a desired deflection of the LED filament 100 may be achieved by the adjustment of the ratio of phosphors 424 to the adhesive 422. For instance, the Young's Modulus (Y) of the LED filament 100 may be between 0.1×1010 to 0.3×1010 Pa. If necessary, the Young's Modulus of the LED filament 100 may be between 0.15×1010 to 0.25×1010 Pa. Consequently, the LED filament 100 would not be easily broken and still possess adequate rigidity and deflection.

Figure 3A:
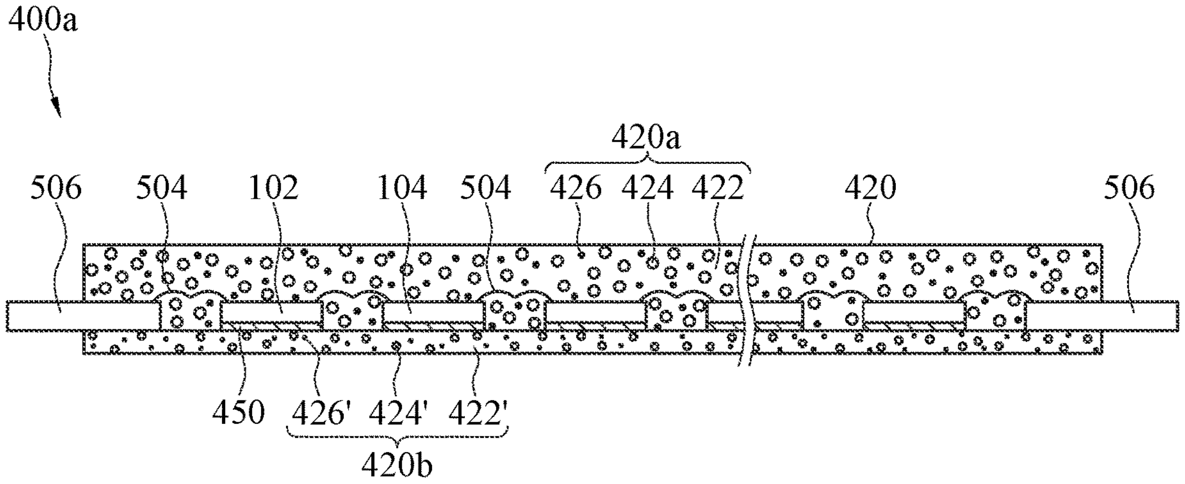
FIG. 3A illustrates a cross sectional view of an LED filament according to an embodiment of the present disclosure.

Please refer to FIG. 3A. FIG. 3A illustrates a cross-sectional view of an LED filament 400*a* according to an embodiment of the present disclosure. In an embodiment, the LED filament comprises multiple layers as shown in FIG. 3A including a base layer 420*b* formed by phosphor film and a top layer 420*a* formed by phosphor glue. An outer surface of the base layer 420*b* and/or an outer surface of the top layer 420*a* may be processed in a surface roughening manner. The LED filament 400*a* is analogous to and can be referred to the LED filament 100 with a light conversion coating 420 divided into the top layer 420*a* and the base layer 420*b*. The LED filament 400*a* comprises LED chips 102, 104, conductive electrodes 506, conductive wires 504 for electrically connecting the adjacent LED chips 102, 104 and conductive electrodes 506, and light conversion coating 420 coating on at least two sides of the LED chips 102, 104 and the conductive electrodes 506. The light conversion coating 420 exposes a portion of two of the conductive electrodes 506. The light conversion coating 420 comprises a top layer 420*a* and a base layer 420*b*. The base layer 420*b* coats on one side of the LED chips 102, 104 and the conductive electrodes 506. The top layer 420*a* coats on another sides of the LED chips 102, 104 and the conductive electrodes 506.

The top layer 420*a* and the base layer 420*b* may be distinct by a manufacturing procedure of the LED filament 400*a*. During a manufacturing procedure, the base layer 420*b* can be formed in advance. Next, the LED chips 102, 104 and the conductive electrodes 506 can be disposed on the base layer 420*b*. The LED chips 102, 104 are connected to the base layer 420*b* via die bond glues 450. The conductive wires 504 can be formed between the adjacent LED chips 102, 104 and conductive electrodes 506. Finally, the top layer 420*a* can be coated on the LED chips 102, 104 and the conductive electrodes 506.

In the embodiment, the top layer 420*a* is the phosphor glue layer, and the base layer 420*b* is the phosphor film layer. The phosphor glue layer comprises an adhesive 422, a plurality of phosphors 424, and a plurality of inorganic oxide nanoparticles 426. The adhesive 422 may be silica gel or silicone resin. The plurality of the inorganic oxide nanoparticles 426 may be, but not limited to, aluminium oxides ($Al_2O_3$). The phosphor film layer comprises an adhesive 422', a plurality of phosphors 424', and a plurality of inorganic oxide nanoparticles 426'. The compositions of the adhesives 422 and adhesive 422' may be different. The adhesive 422' may be harder than the adhesive 422 to facilitate the disposition of the LED chips 102, 104 and the conductive wires 504. For example, the adhesive 422 may be silicone resin, and the adhesive 422' may be a combination of silicone resin and PI gel. The mass ratio of the PI gel of the adhesive 422' can be equal to or less than 10%. The PI gel can strengthen the hardness of the adhesive 422'. The plurality of the inorganic oxide nanoparticles 426 may be, but not limited to, aluminium oxides ($Al_2O_3$) or aluminium nitride. The size of the phosphors 424' may be smaller than that of the phosphors 424. The size of the inorganic oxide nanoparticles 426' may be smaller than that of the inorganic oxide nanoparticles 426. The size of inorganic oxide nanoparticles may be around 100 to 600 nanometers (nm). The inorganic oxide nanoparticles are beneficial of heat dissipating. In some embodiment, part of inorganic oxide nanoparticles may be replaced by inorganic oxide particles which have the size of 0.1 to 100 μm. The heat dissipation particles may be with different sizes.

Figure 3B:
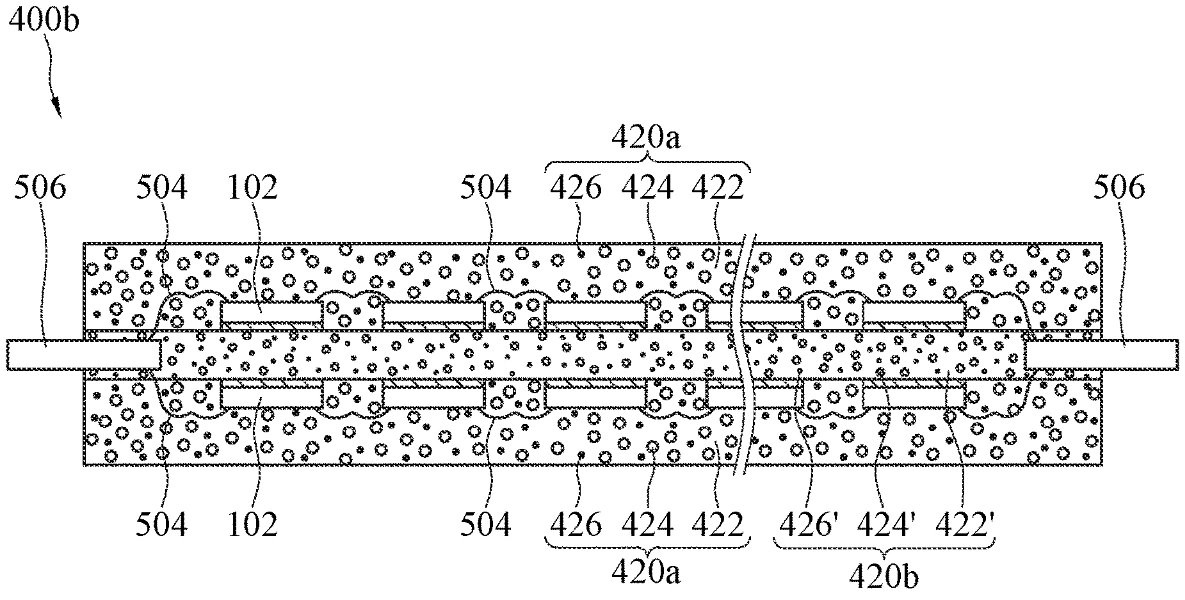
FIG. 3B to FIG. 3E respectively illustrate a cross-sectional view of an LED filament according to another embodiments of the present disclosure.

Please refer to FIG. 3B. FIG. 3B illustrates a cross-sectional view of an LED filament 400*b* according to another embodiment of the present disclosure. The LED filament 400*b* is analogous to and can be referred to the LED filament 400*a*. In the embodiment, the LED chips 102, 104, the conductive wires 504, and the top layer 420*a* are disposed on two opposite sides of the base layer 420*b*. In other words, the base layer 420*b* is between the two top layers 420*a*. The conductive electrodes 506 are at two opposite ends of the base layer 420*b*. The LED chips 102 of both of the two top layers 420*a* can be connected to the same conductive electrodes 506 via the conductive wires 504.

Figure 3C:
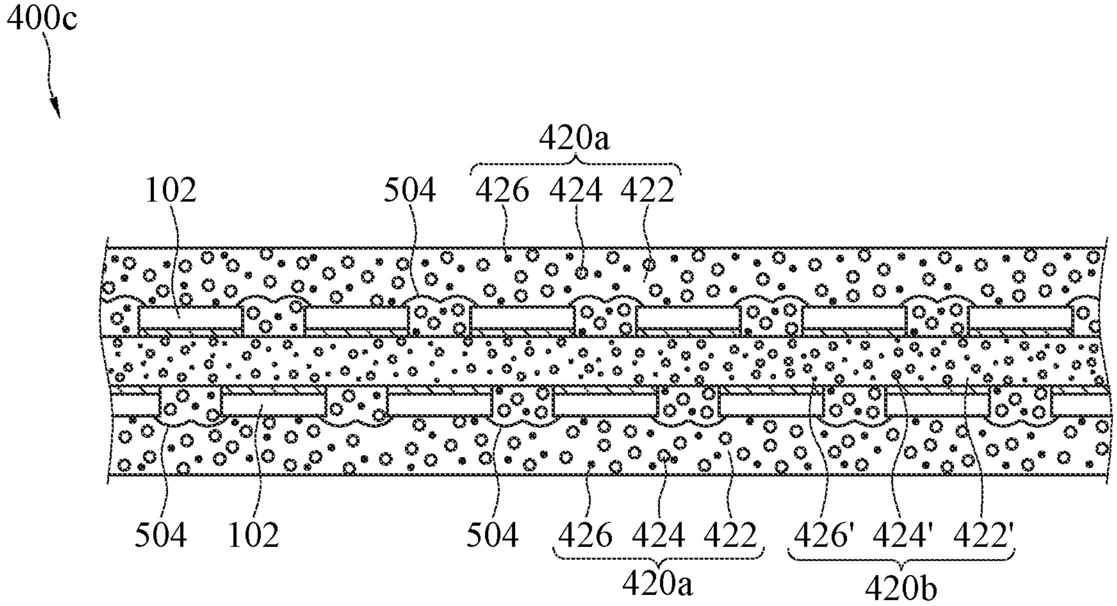

Please refer to FIG. 3C. FIG. 3C illustrates a cross-sectional view of an LED filament 400*c* according to another embodiment of the present disclosure. In the embodiments, as shown in FIG. 3C, the LED chips 102, 104 at the two opposites sides of the base layer 420*b* are interlaced with each other. For illustration purpose, the LED chips 102, 104 at an upper side of the base layer 420*b* shown in FIG. 3C is named an upper LED chip set, and the LED chips 102, 104 at a lower side of the base layer 420*b* shown in FIG. 3C is named a lower LED chip set. There are gaps defined on an axial direction of the LED filament 400*c* between each adjacent two of the LED chips 102, 104 of the upper LED chip set, between each adjacent two of the LED chips 102, 104 of the lower LED chip set, or between the conductive electrode 506 and the LED chip 102 of the upper or lower LED chip set. Each of the LED chips 102, 104 of the upper LED chip set is aligned with, on a radial direction of the LED filament 400*c*, the closest gap between each adjacent two of the LED chips 102, 104 of the lower LED chip set or between the conductive electrode 506 and the LED chip 102 of the lower LED chip set, and vice versa.

As shown in FIG. 3C, in an embodiment, a length of each of the gaps of the upper and lower LED chip sets on the axial direction of the LED filament 400*c* is less than that of the LED chips 102, 104. In an embodiment, the length of each of the gaps of the upper and lower LED chip sets on the axial direction of the LED filament 400*c* is ½ length of the LED chips 102, 104. Each of the LED chips 102, 104 of the upper LED chip set not only overlaps the closest gap between each adjacent two of the LED chips 102, 104 of the lower LED chip set, but also overlaps a part (e.g., ¼ in length) of each of the adjacent two of the LED chips 102, 104 of the lower LED chip set forming the closest gap. A gap between LED chips usually causes a dark region where has a lower brightness. However, in the embodiment, illumination of the LED filament 400*c* would be more smooth and even because every gap in one LED chip sets (the upper or lower LED chip set) can be covered by another LED chips 102, 104 of another LED chip set on the radial direction of the LED filament 400*c*.

In some embodiments, the base layer 420*b* between the upper or lower LED chip set as shown in FIG. 3C can be replaced by a brace made by metal or other adequate materials. The brace is hollowed out or engraved out to form mane through holes, such that light rays emitted from the LED chips 102, 104 of the upper LED chip set can pass through the brace to the opposite side, and vice versa.

Figure 3D:
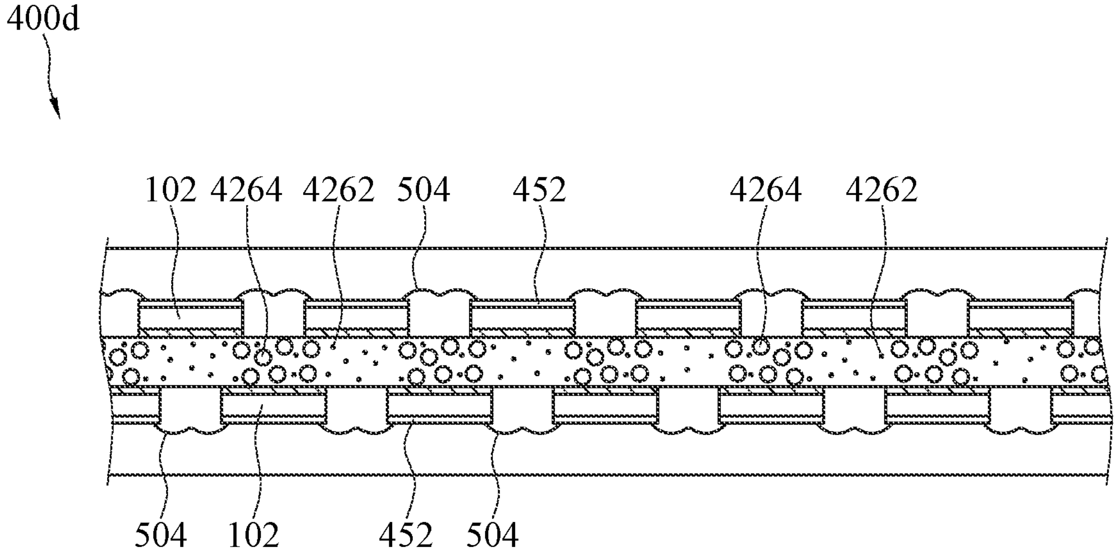

Please refer to FIG. 3D. FIG. 3D illustrates a cross-sectional view of an LED filament 400*d* according to another embodiment of the present disclosure. For illustration purpose, the phosphors 424, 424' and the inorganic oxide nanoparticles 426, 426' of the LED filament 400*b*, 400*c* shown in FIG. 3B and FIG. 3C are omitted in FIG. 3D. The LED filament 400*d* in FIG. 3D comparing to the LED filament 400*c* in FIG. 3C further comprises scattering particles 4262 and reflecting particles 4264 in the base layer 420*b*, and the LED chips 102, 104 of the upper and lower LED chip set face toward the base layer 420*b*. The scattering particles 4262 can scatter light rays. The scattering particles 4262 may comprise material such as oxide of metal or hydroxide of metal. The reflecting particles 4264 can reflect light rays. The reflecting particles 4264 may comprise metal such as aluminum or silver. The scattering particles 4262 are distributed all over the base layer 420*b*. The reflecting particles 4264 are concentrated between each of the LED chips 102, 104 of the upper LED chip set and the closest gap corresponding to the LED chips 102, 104 of the lower LED chip set. Light rays emitted from the LED chips 102, 104 of the upper and lower LED chip set enters the base layer 420*b* in advance and are reflected and scattered by the reflecting particles 4264 and the scattering particles 4262. Reflected and scattered light rays would pass through the gaps toward different directions. As shown in FIG. 3D, the LED filament 400*d* further comprises, but is not limited to, a plurality of reflecting layers 452. The reflecting layers 452 are respectively disposed on a face of each of the LED chips 102, 104 away from the base layer 420*b*. Light rays may be reflected by the reflecting layers 452, and the reflected light rays may enter the base layer 420*b* and be further scattered and reflected by the scattering particles 4262 and the reflecting particles 4264. In such case, the illumination of the LED filament 400*d* can be more smooth and even.

In other embodiments according to FIG. 3D, the reflecting particles 4264 may be replaced by reflecting thin films. In other embodiments according to FIG. 3D, the reflecting particles 4264 or the reflecting thin films are not necessary and may be eliminated from the base layer 420*b*.

Figure 3E:
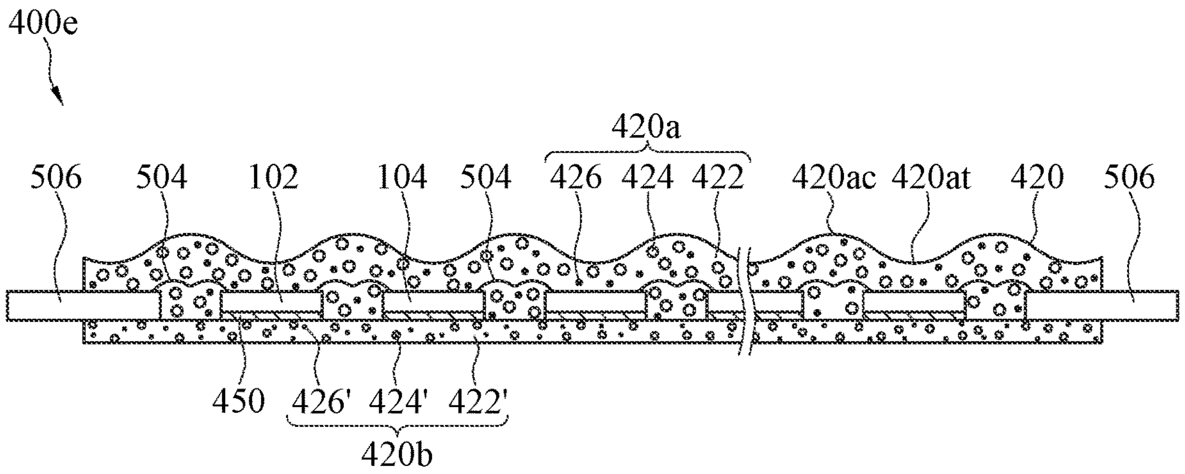

Please refer to FIG. 3E. FIG. 3E illustrates a cross-sectional view of an LED filament 400*e* according to another embodiment of the present disclosure. A difference between the LED filament 400*e* in FIG. 3E and the LED filament 400*a* in FIG. 3A is that the top layer 420*a* of the LED filament in FIG. 3E has wave shape. The wave shaped top layer 420*a* comprises wave crests 420*ac* and wave troughs 420*at*. Each of the wave crests 420*ac* are respectively corresponding to each of gaps between the adjacent two of the LED chips 102, 104. Each of the wave troughs 420*at* are respectively corresponding to each of the LED chips 102, 104. In particular, each of the wave crests 420*ac* overlaps each of the gaps between the adjacent two of the LED chips 102, 104 on a radial direction of the LED filament 400*e*, and each of the wave troughs 420*at* overlaps each of the LED chips 102, 104 on the radial direction of the LED filament 400*e*. The amount of the phosphors 424 and the inorganic oxide nanoparticles 426 in the wave crests 420*ac* is greater than that of the phosphors 424 and the inorganic oxide nanoparticles 426 in the wave troughs 420*at*; therefore, the brightness of the region corresponding to the gaps can be increased. In such case, the illumination of the LED filament 400*e* can be more smooth and even.

Figure 4A:
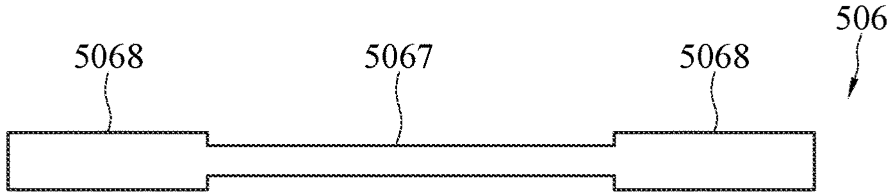
FIG. 4A to FIG. 4Q respectively illustrate bottom views and cross sectional views of conductive electrodes of an LED filament according to different embodiments of the present disclosure.
Figure 4B:
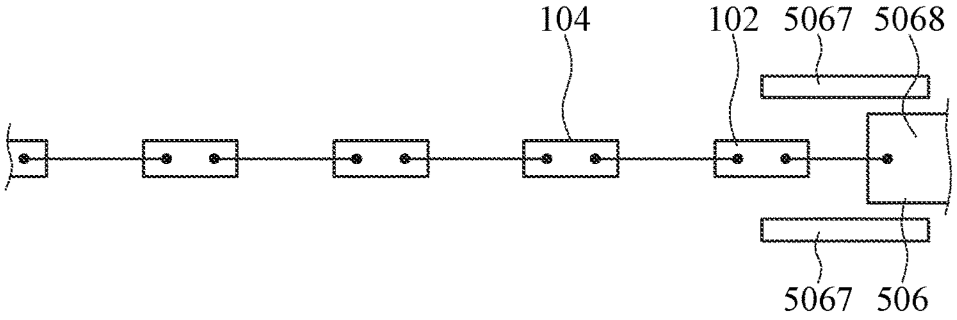
Figure 4C:
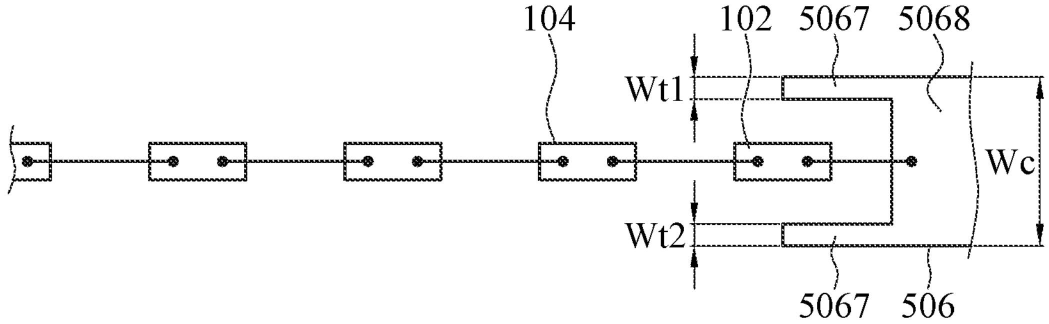
Figure 4D:
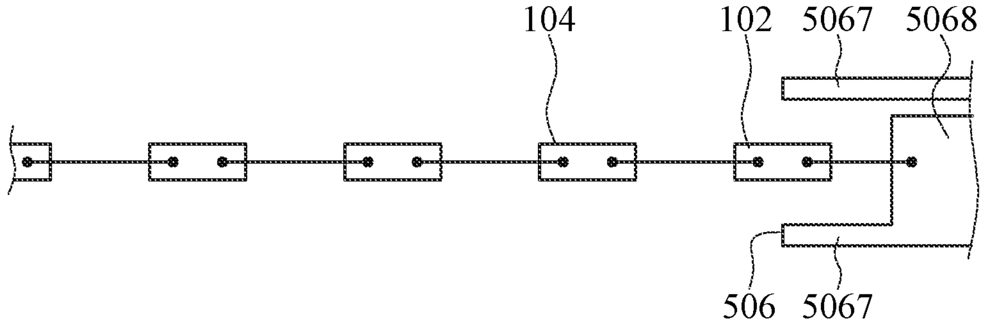
Figure 4E:
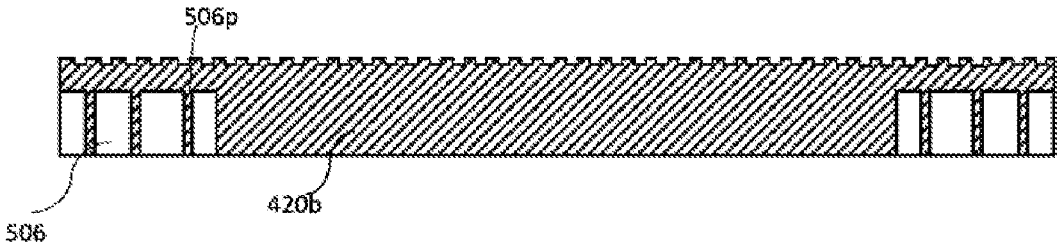
Figure 4F:
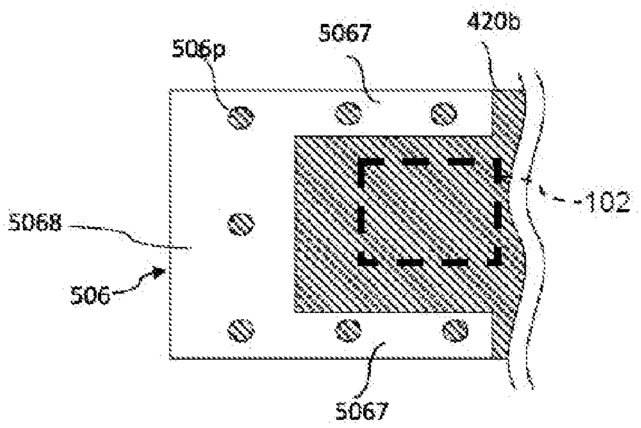
Figure 4G:
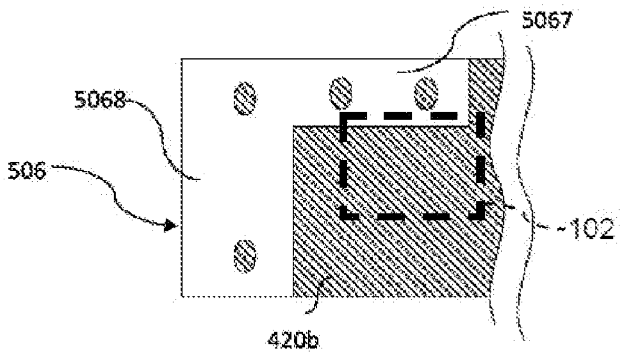
Figure 4H:
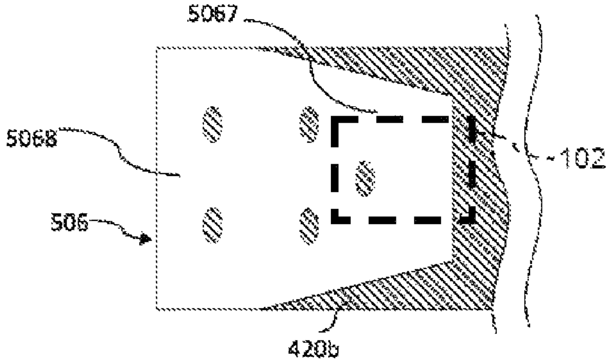
Figure 4I:
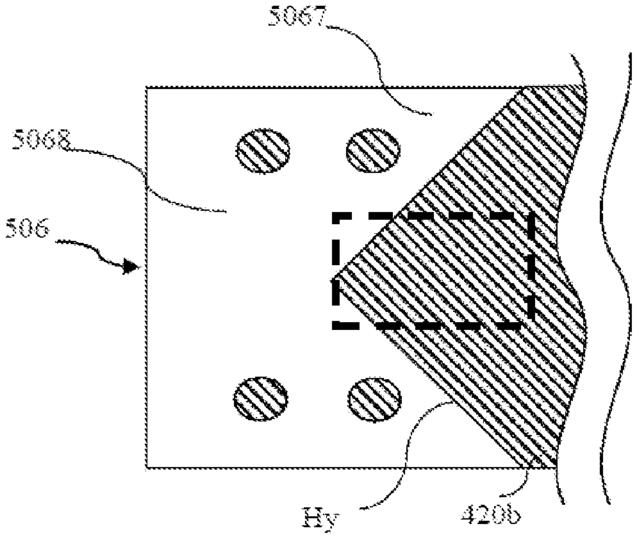
Figure 4J:
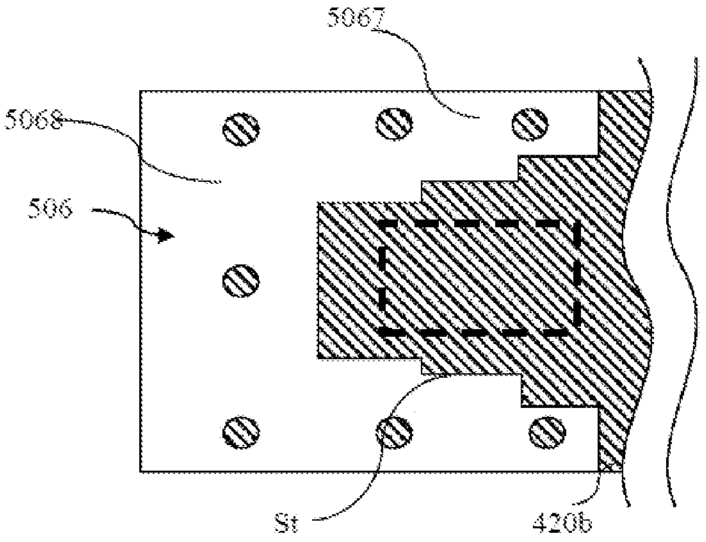
Figure 4K:
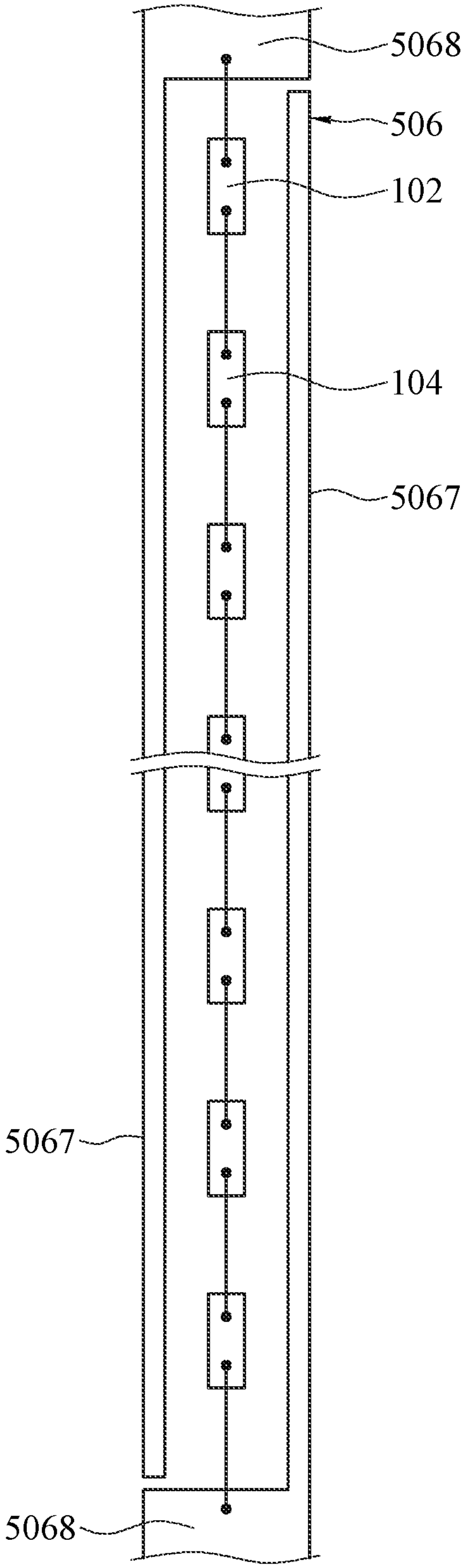
Figure 4L:
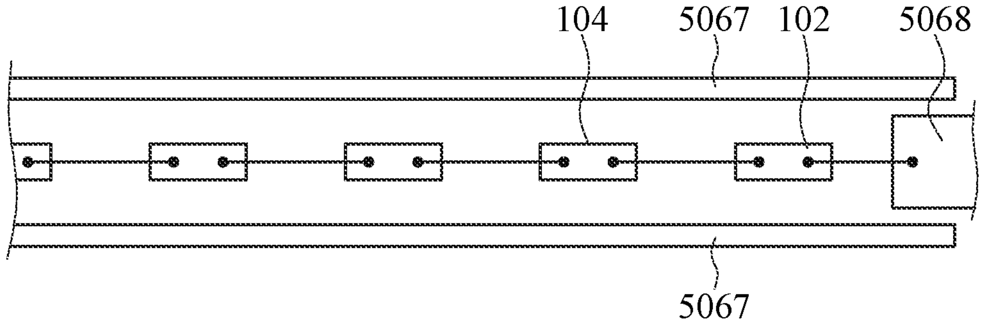
Figure 4M:
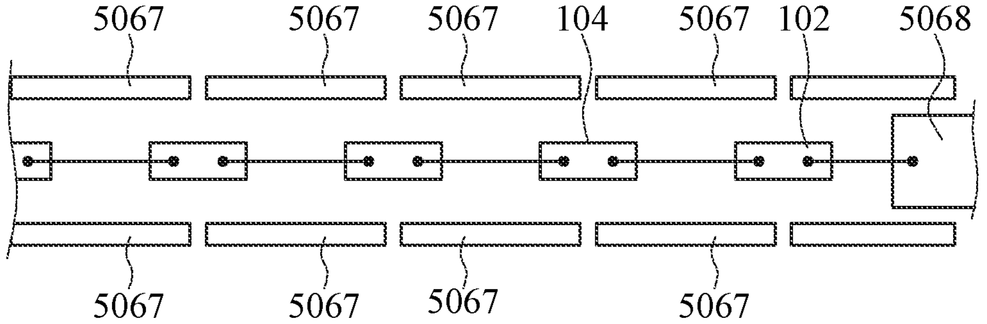
Figure 4N:
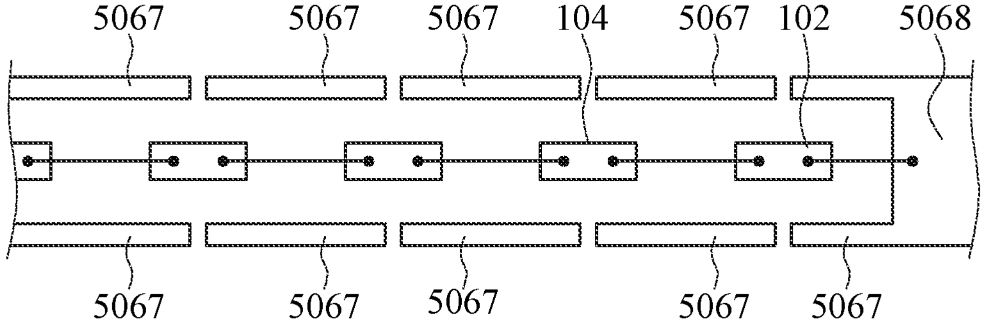
Figure 4O:
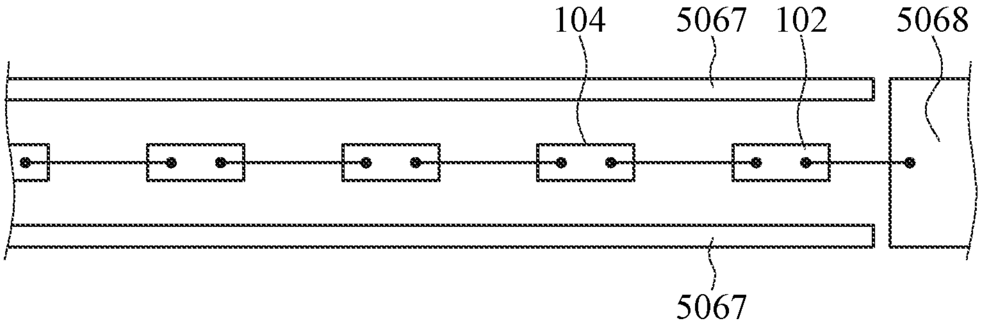
Figure 4P:
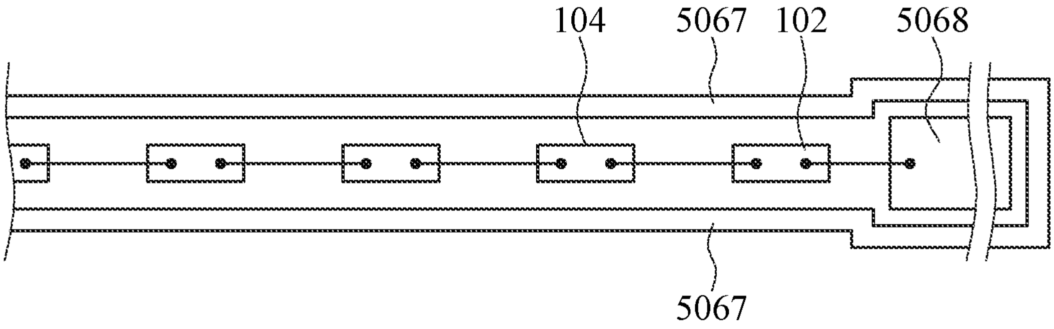
Figure 4Q:
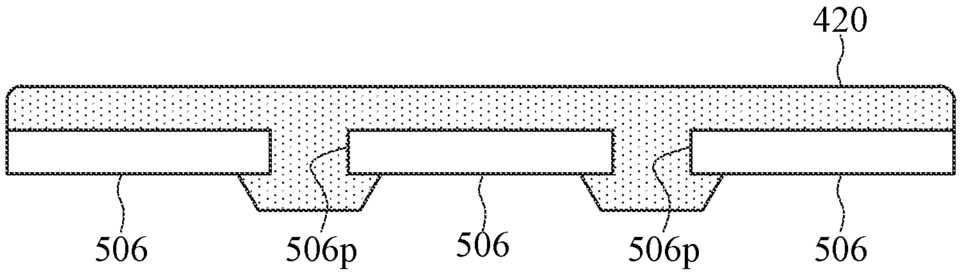

Please refer to FIG. 4A to FIG. 4Q. FIG. 4A to FIG. 4Q respectively illustrate bottom views and cross sectional views of conductive electrodes of an LED filament according to different embodiments of the present disclosure. The design of shape of a conductive electrode (e.g., the electrical connector 506) may consider factors such as wire bonding and filament bending. For example, as show in FIG. 4A, the conductive electrode 506 comprises a connecting region 5068 and a transition region 5067. The connecting region 5068 is at an end of the conductive electrode 506 for being electrically connected with other components. For example, the connecting regions 5068 of the conductive electrodes 506 can be connected to the conductive supports 51*a*, 51*b* shown in FIG. 1A to FIG. 1C. In the embodiment, the conductive electrode 506 comprises two connecting regions 5068. The transition region 5067 is between the two connecting regions 5068 for connecting the connecting regions 5068. A width of the connecting region 5068 is greater than that of the transition region 5067. Because the connecting region 5068 is utilized to form a joint point (or a welding point), it is required that the connecting region 5068 has sufficient width. For example, if a width of a filament is W, the width of the connecting region 5068 of the conductive electrode 506 may be between ¼W to 1 W. The number of the connecting region 5068 may be plural, and the width of the connecting regions 5068 may be not identical. Because the transition region 5067 between the connecting regions 5068 is not required to form any joint point, a width of the transition region 5067 may be less than that of the connecting region 5068. For example, if a width of a filament is W, the width of the transition region 5067 may be between 1/10W to ⅕W. The conductive electrode 506 is easier to be bended along with the bending of the filament due to the less width of the transition region 5067 of the conductive electrode 506; therefore, the risk that a wire close to the conductive electrode may be easily broken by stress of bending is lower.

As shown in FIG. 4B, in an embodiment, an LED filament comprises LED chips 102, 104, conductive electrodes 506, two auxiliary pieces (analogous to the transition regions) 5067, wires, and light conversion coating (not shown). The LED filament in the embodiment can be referred to the LED filament 400*a* in the above embodiments. The wires in the embodiment can be referred to the conductive wires 504 in the above embodiments. For example, the LED chip 102 located at an end of an array of plural LED chips 102, 104 comprised in a filament is connected to the conductive electrode 506 via the wire (e.g., the conductive wire 504 shown in FIGS. 2A and 2B). The light conversion coating in the embodiment can be referred to the light conversion coating 420 in the above embodiment. There is no need to go into details regarding the wires, the light conversion coating, and other components and connections of the LED filament having been discussed in above embodiments. In the embodiment, the discussion would be focused on the wire between the LED chip 102 at the end and the conductive electrodes 506 and the auxiliary pieces 5067.

As shown in FIG. 4B, in the embodiment, each of the conductive electrodes 506 comprises a connecting region 5068. The wire at the end is connected between the LED chip 102 at the end and the connecting region 5068. Each of the auxiliary pieces 5067 extends from a side of the corresponding connecting region 5068 to a side of the LED chip 102 at the end of the LED filament and adjacent to the corresponding connecting region 5068 along an axial direction of the LED filament. Each of the auxiliary pieces 5067 at least overlaps the wire between the corresponding LED chip 102 at the end and the corresponding connecting regions 5068 on a radial direction of the LED filament. In the embodiment, each of the auxiliary pieces 5067 not only overlaps the wire between the corresponding LED chip 102 at the end and the corresponding connecting regions 5068 on the radial direction of the LED filament but also further overlaps a portion of the corresponding LED chip 102 at the end and the corresponding connecting region 5068 on the radial direction of the LED filament. In the embodiment, the auxiliary piece 5067 is not connected to the connecting region 5068. In another embodiment, each of the auxiliary pieces 5067 at least overlaps the wire between the corresponding LED chip 102 at the end and the corresponding connecting regions 5068, a portion of the corresponding LED chip 102 at the end, and a portion of the corresponding connecting region 5068 on the radial direction of the LED filament.

In another embodiment, there could be only one auxiliary piece 5067 overlapping one and only one of the two wires respectively between the two corresponding LED chips 102 at the ends and the corresponding connecting regions 5068 on the radial direction of the LED filament. In another embodiment, there could be only one auxiliary piece 5067 overlapping all wires including the two wires respectively between the two corresponding LED chips 102 at the ends and the corresponding connecting regions 5068 on the radial direction of the LED filament. In another embodiment, there could be two auxiliary piece 5067 respectively overlapping the two wires respectively between the two corresponding LED chips 102 at the ends and the corresponding connecting regions 5068 on the radial direction of the LED filament. In another embodiment, there could be two auxiliary piece 5067 respectively overlapping all wires including the two wires respectively between the two corresponding LED chips 102 at the ends and the corresponding connecting regions 5068 on the radial direction of the LED filament.

The fact that the auxiliary pieces 5067 overlap the wires between the LED chips 102 at the end and the connecting regions 5068 of the conductive electrodes 506 on the radial direction of the LED filament reinforce the connection of the LED chips 102 and the conductive electrodes 506. As a result, the toughness of two ends of the LED filament at which the conductive electrodes 506 locate can be significantly increased. In such cases, the LED filament can be bent to form varied curvatures without the risks of the wires between the conductive electrodes 506 and the LED chips 102 being broken. While the LED filament with elegance curvatures emits light, the LED light bulb would present an amazing effect.

The following discusses the objective of the auxiliary pieces 5067 in detail. The conductive electrode 506 is considerably larger than the LED chips 102, 104. For example, the length of the conductive electrode 506 on an axial direction of the LED filament may be 10-20 times the length of the LED chip 102. It is noted that the drawing of the present disclosure is merely schematic, and thus the considerable difference in terms of size between the conductive electrode 506 and the LED chips 102, 104 is not fully presented. According to the difference in terms of size, the rigidity of the conductive electrode 506 is considerably greater than that of the LED chips 102, 104. While the LED filament is bent, the section where the LED chips 102, 104 would be bent in a smooth way, but the section where the LED chip 102 at the end and the conductive electrode 506 would be bent in a stiff way due to the huge difference of rigidity between the LED chip 102 at the end and the conductive electrode 506. More particularly, the section where the LED chip 102 at the end and the conductive electrode 506 would be bent to form an angle, which cause the wire between the LED chip 102 at the end and the conductive electrode 506 to be bent into a sharp angle. Because the conductive electrode 506 is relatively harder to be bent, and the LED chip 102 at the end is relative easier to be bent, the section between the LED chip 102 at the end and the conductive electrode 506 would be over bent, and force (e.g., shear force) would concentrate on the section. As a result, the wire between the LED chip 102 at the end and the conductive electrode 506 is considerably easier to be broken.

In order to overcome the concentrated force on the section at which the wire between the LED chip 102 at the end and the conductive electrode 506 is located, the auxiliary piece 5067 would at least overlap the wire between the LED chip 102 at the end and the conductive electrode 506 on a radial direction of the LED filament. The radial direction is perpendicular to an axial direction of the LED filament. The radial direction may be any direction extending from a center of a cross section crossing the axial direction of the LED filament; alternatively, the radial direction may be in a direction parallel with the cross section of the LED filament. The axial direction may be aligned with a longitudinal direction of the LED filament; alternatively, the axial direction may be in a direction of the longest side of the LED filament. The LED filament extends from one of the conductive electrodes 506 towards another one of the conductive electrodes 506 along the axial direction. The LED chips 102, 104 are aligned along the axial direction between the conductive electrodes 506. The cross section of the LED filament parallel with the radial direction is not limited to a circular shape (the shape may be formed by the contour of the cross section). The cross section may form any shape. For example, the cross section may form an ellipse shape or a rectangular shape. The shape of the cross section may function as lens to adjust light emitting direction of the LED chip. While the LED filament is bent, force concentrating on the section between the LED chip 102 at the end and the conductive electrode 506 may primarily apply on the section along the radial direction and may cause the section (or the wire in the section) shear failure. The fact that the auxiliary piece 5067 at least overlapping the section at which the wire between the LED chip 102 at the end and the conductive electrode 506 is located on the radial direction of the LED filament can strengthen the mechanical strength of the section to prevent the wire from being broken by the concentrated force.

In another embodiment, in order to overcome the concentrated force on the section at which the wire between the LED chip 102 at the end and the conductive electrode 506 is located, the auxiliary piece 5067 would be arranged on a position, such that while a virtual plane crosses the wire between the LED chip 102 at the end and the conductive electrode 506, the virtual plane must further cross the auxiliary piece 5067. For example, the virtual plane may be a cross section on the radial direction of the LED filament. In addition, a virtual plane would cross the auxiliary piece 5067 while the virtual plane crosses the corresponding LED chip 102 at the end, and a virtual plane would cross the auxiliary piece 5067 while the virtual plane crosses the corresponding connecting region 5068.

Based upon the above configurations, the auxiliary piece 5067 functions as a strengthening element, which increases the mechanical strength of the section where the LED chip 102 at the end and the conductive electrode 506 are and prevent the wire between the LED chip 102 at the end and the conductive electrode 506 from being broken. There are embodiments of the conductive electrode 506 and the auxiliary piece 5067 illustrated below.

As shown in FIG. 4C, in an embodiment, an LED chip 102 located at an end of an array of plural LED chips 102, 104 comprised in a filament is connected to the conductive electrode 506 via a wire. The conductive electrode 506 has a shape surrounding the LED chip 102 at the end by three sides of the conductive electrode 506 while observed in a top view. In another embodiment, the conductive electrode 506 has a shape surrounding the LED chip 102 at the end by three sides of the conductive electrode 506 while observed in a side view (not shown). In another embodiment, the conductive electrode 506 has a shape surrounding the LED chip 102 at the end by at least two sides of the conductive electrode 506. Three sides of the conductive electrode 506 surrounding the LED chip 102 comprise two auxiliary pieces (transition regions) 5067 and one connecting region 5068. In the embodiment shown in FIG. 4C, the auxiliary piece 5067 is connected to the connecting region 5068, and thus the auxiliary piece 5067 pertains to the conductive electrode 506. A sum of widths of the two auxiliary pieces 5067 on the radial direction of the LED filament is less than a width of the connecting region 5068 on the radial direction of the LED filament. As shown in FIG. 4C, a sum of the widths Wt1, Wt2 of the two auxiliary pieces 5067 on the radial direction of the LED filament is less than the width Wc of the connecting region 5068 on the radial direction of the LED filament. In the embodiment, the width Wc of the connecting region 5068 is equal to that of the base layer 420*b* (or the LED filament), as shown in FIG. 4F. A side of the LED chip 102 at the end not surrounded by the conductive electrode 506 is connected to another LED chip 102 via a wire (e.g., the conductive wire 504 shown in FIGS. 2A and 2B). A wire between the LED chip 102 at the end and the conductive electrode 506 is shorter than those between the LED chips 102, 104 not at the end. In such case, the risk that the wire may be broken by elastic buckling stress is lower.

In an embodiment, one or more of the auxiliary pieces 5067 extend from the connecting region 5068 along an axial direction of the LED filament. The auxiliary piece(s) 5067 overlap the LED chips 102 at the end of the LED filament and the wires between the LED chips 102 at the end and the connecting regions 5068 on the radial direction of the LED filament. The less width of the auxiliary pieces 5067 gives more flexibility than the connecting region 5068 does, and, on the other hand, the fact that the auxiliary pieces 5067 overlap the LED chips 102 at the end and the wires between the LED chips 102 at the end and the connecting regions 5068 of the conductive electrodes 506 on the radial direction of the LED filament reinforce the connection of the LED chips 102 and the conductive electrodes 506. As a result, the toughness of two ends of the LED filament at which the conductive electrodes 506 locate can be significantly increased. A difference between the auxiliary piece 5067 shown in FIG. 4C and the auxiliary piece 5067 shown in FIG. 4B is both of the auxiliary piece 5067 shown in FIG. 4C being connected to the connecting region 5068 while both of the auxiliary piece 5067 shown in FIG. 4B being not connected to the connecting region 5068. Notwithstanding the auxiliary pieces 5067 shown in FIGS. 4B and 4C have different configurations, they all function as strengthening elements to increase the mechanical strength of the section where the LED chip 102 at the end and the conductive electrode 506 are and to prevent the wire between the LED chip 102 at the end and the conductive electrode 506 from being broken.

As shown in FIG. 4D, there are two auxiliary pieces 5067 overlapping the wire between the corresponding LED chip 102 at the end and the corresponding connecting region 5068 of each of the conductive electrodes 506 on the radial direction of the LED filament. One of the two auxiliary pieces 5067 (i.e., the lower one in FIG. 4D) is connected to the corresponding connecting region 5068, which is analogous to the auxiliary pieces 5067 as shown in FIG. 4B. The other one of the two auxiliary pieces 5067 (i.e., the upper one in FIG. 4D) is not connected to the corresponding connecting region 5068 but instead extends from a side of the connecting region 5068, which is analogous to the auxiliary pieces 5067 as shown in FIG. 4C. In the embodiment, the conductive electrode 506 may be form an L shape based upon the connecting region 5068 and the lower auxiliary piece 5067.

In some embodiments, there may be only one auxiliary piece 5067 overlapping the wire between the corresponding LED chip 102 at the end and the corresponding connecting region 5068 of each of the conductive electrodes 506 on the radial direction of the LED filament. The only one auxiliary piece corresponding to each conductive electrode would also increase the mechanical strength of the section where the LED chip 102 at the end and the conductive electrode 506 are and prevent the wire between the LED chip 102 at the end and the conductive electrode 506 from being broken.

The conductive electrodes 506 can be secured in the light conversion coating 420. More particularly, a portion of each of the conductive electrodes 506 is enveloped in the light conversion coating 420. In a case that the light conversion coating 420 is divided into the top layer **420*a* and the base layer 420*b*, the conductive electrodes 506 can be enveloped in the top layer 420*a*, in the base layer 420, or in both of the top layer 420*a* and the base layer 420*b*. In some embodiments, the conductive electrodes 506 are not only enveloped but also embedded in the top layer 420*a* or the base layer 420*b* of the LED filament, which creates significant attaching strength between the conductive electrodes 506 and the light conversion coating 420. In an embodiment, the structure of the conductive electrode 506 in the LED filament as shown in FIG. 4F comprises one connecting region 5068 and two auxiliary piece 5067 to surround the LED chip 102 as described above. The conductive electrode 506 may have holes 506*p***.

Please refer to FIGS. 4E and 4F. FIG. 4E illustrates the base layer **420*b* and the conductive electrode 506 of the LED filament without showing the top layer 420*a*, the LED chips 102, 104, and the wires 504. FIG. 4F illustrates a bottom view of a portion of the LED filament of FIG. 4E. The LED chip 102 is blocked by the base layer 420*b* in the bottom view and is thus depicted by dashed lines shown in FIG. 4F to FIG. 4K. A base layer (e.g., a phosphor film) can be made with the conductive electrode 506 embedded inside, which can be referred to the base layer (the phosphor film) 420*b* as shown in FIG. 4E and FIG. 4F. The conductive electrode 506 comprises holes 506*p*. The holes 506*p* are distributed over the connecting region 5068 and the auxiliary pieces 5067. The base layer (the phosphor film) 420*b* infiltrates the holes 506*p* from one end and, depending on needs, can pass through the other end of the holes 506*p*. The base layer (the phosphor film) 420*b* shown in FIG. 4E does not pass through the holes 506*p*; alternatively, the base layer (the phosphor film) 420*b* can pass through the holes 506*p* and extend to another side of the holes 506*p*. An upper surface facing upwardly in FIG. 4E of the base layer 420*b* is processed in a surface roughening treatment; therefore, the base layer 420*b* has better heat dissipation ability based upon the roughened surface. FIG. 4F is the bottom view of the base layer 420*b* shown in FIG. 4E. As shown in FIG. 4F, in a certain view (e.g., the bottom view) of the LED filament, either the auxiliary piece 5067 or the connecting region 5068 has a rectangular shape. The two auxiliary pieces 5067 are respectively connected with two opposite sides of the connecting region 5068. The LED chip 102 at the end of the LED filament (or at the end of the array of the LED chips 102, 104) is between the two auxiliary pieces 5067. The two auxiliary pieces 5067 and the connecting region 5068** mutually form a U shape in the bottom view.

Please refer to FIGS. 4G and 4H. FIG. 4G and FIG. 4H show embodiments of the conductive electrode 506 with holes. The difference between the embodiments of FIG. 4G and FIG. 4F is that the conductive electrode 506 of the embodiment of FIG. 4G has only one auxiliary piece 5067. As shown in FIG. 4G, in a certain view (e.g., the bottom view) of the LED filament, either the auxiliary piece 5067 or the connecting region 5068 has a rectangular shape. The only one auxiliary piece 5067 is connected with one of the two opposite sides of the connecting region 5068. The LED chip 102 at the end of the LED filament (or at the end of the array of the LED chips 102, 104) is next to the auxiliary piece 5067. In the embodiment, the LED chip 102 partially overlaps the auxiliary piece 5067 in the bottom view. In another embodiment, the LED chip 102 does not overlap the auxiliary piece 5067 in the bottom view. The auxiliary piece 5067 and the connecting region 5068 mutually form an L shape in the bottom view. In another embodiment, the only one auxiliary piece 5067 may be connected with the center of the connecting region 5068, and the auxiliary piece 5067 and the connecting region 5068 may mutually form a T shape in the bottom view.

The difference between the embodiments of FIG. 4G and FIG. 4H is that the auxiliary piece 5067 of the conductive electrode 506 of the embodiment in FIG. 4H extends from the entire connecting region 5068 (not one of or two of the opposite sides of the connecting region 5068), and the width of the auxiliary piece 5067 decreases gradually from a fixed end of the auxiliary piece 5067 connected with the connecting region 5068 to a free end of the auxiliary piece 5067 opposite with the fixed end. The fixed end of the auxiliary piece 5067 is aligned with the connecting region 5068 and the base layer **420*b*. In other words, the width of the fixed end of the auxiliary piece 5067 is equal to that of the connecting region 5068 and the base layer 420*b*. The auxiliary piece 5067 has a trapezoidal shape. In another embodiment, the auxiliary piece 5067 with a gradually-decreasing width decreasing gradually from the fixed end to the free end may have a triangular shape or a semi-circular shape. As shown in FIG. 4H, in the embodiment, the LED chip 102 at the end partially overlaps the auxiliary piece 5067** in the bottom view.

Generally, an average width of the auxiliary piece 5067 is less than that of the connecting region 5068 if there is only one auxiliary piece 5067 of each conductive electrode 506. A sum of widths of the auxiliary pieces 5067 is less than the width of the connecting region 5068 if there are two or more auxiliary pieces 5067 of each conductive electrode 506. The conductive wires are not shown in FIGS. 4F-4H, and the LED chips 102 are illustrated as dashed line.

As shown in FIG. 4I, the difference between the embodiments of FIG. 4I and FIG. 4F is that each of the two auxiliary pieces 5067 of the conductive electrode 506 of the embodiment in FIG. 4I has a triangular shape in the bottom view. More particular, each of the two auxiliary pieces 5067 forms a right triangle. Each of the two auxiliary pieces 5067 comprises an inclined side. The two inclined sides of the auxiliary pieces 5067 face towards each other. The inclined sides of the auxiliary pieces 5067 are close to each other at the fixed end. In the embodiment, the inclined sides of the auxiliary pieces 5067 are, but are not limited to, connected with each other. The inclined sides are gradually away from each other from the fixed end to the free end and respectively contact two opposite sides of the base layer **420*b* at the free end. A vertical distance between the two inclined sides of the auxiliary pieces 5067 is gradually increased from the fixed end to the free end. The auxiliary pieces 5067 are aligned with the connecting region 5068 and the base layer 420*b*, and the width of the fixed end is equal to the distance between the two free ends of the auxiliary pieces 5067 and is also equal to the width of the connecting region 5068 and the base layer 420*b***.

As shown in FIG. 4J, the difference between the embodiments of FIG. 4J and FIG. 4I is that the inclined sides of the auxiliary pieces 5067 in FIG. 4J are not straight but are stepped. In another embodiment, the inclined sides of the auxiliary pieces 5067 may be curved, arched, or waved.

As shown in FIG. 4K, in the embodiment, each of the conductive electrodes 506 comprises the connecting region 5068 and one auxiliary piece 5067. The two auxiliary pieces 5067 of the two conductive electrodes 506 may be respectively aligned with the two opposite sides of the base layer **420*b* and respectively at two opposite sides of the array of the LED chips 102, 104 along the axial direction of the LED filament. In other words, the two auxiliary pieces 5067 are in a staggered arrangement. Each of the auxiliary pieces 5067 extends from the corresponding connecting region 5068 along the axial direction of the LED filament. Each of the auxiliary pieces 5067 not only overlaps the LED chip 102 at the end of the LED filament close to the corresponding connecting region 5068 and the wire between the LED chip 102 at the end and the corresponding connecting regions 5068 on the radial direction but also further overlaps two or more LED chips 102, 104 and two or more wires between the LED chips 102, 104 next to the LED chip 102 at the end. In the embodiment, the auxiliary piece 5067 of the conductive electrode 506 overlaps all of the LED chips on the radial direction but is not connected with the other conductive electrode 506**.

As shown in FIG. 4L, the difference between the embodiments of FIG. 4L and FIG. 4C is that each of the two auxiliary pieces 5067 of the embodiment in FIG. 4L is not connected with the connecting region 5068. The auxiliary piece 5067 overlaps all of the LED chips 102, 104, the wires between the LED chips 102 at the end and the connecting region 5068, and the connecting regions 5068. As shown in FIG. 4K and FIG. 4L, there are two auxiliary pieces 5067 in one LED filament, and each of the two auxiliary pieces 5067 overlaps all wires including the two wires respectively between the two corresponding LED chips 102 at the ends and the corresponding connecting regions 5068 on the radial direction of the LED filament.

As shown in FIG. 4M, the difference between the embodiments of FIG. 4L and FIG. 4M is that each of the two auxiliary pieces 5067 of the embodiment in FIG. 4M is divided into a plurality of segments. The segments of each of the two auxiliary pieces 5067 respectively overlap the wires on the radial direction. Each of the segments of each of the two auxiliary pieces 5067 overlaps the corresponding wire and the adjacent two LED chips 102, 104 or overlaps the corresponding wire at the end, the corresponding connecting region 5068, and the corresponding LED chip at the end on the radial direction. There is a gap formed between every two adjacent segments of each of the two auxiliary pieces 5067. Each of the gaps is aligned with the corresponding LED chip 102 or 104 on the radial direction. These sections at which the wires are located are weaker points comparing to where the LED chips 102, 104 are located at; therefore, the segments of each of the two auxiliary pieces 5067 can function as strengthening elements to increase the mechanical strength of these sections.

As shown in FIG. 4N, the difference between the embodiments of FIG. 4M and FIG. 4N is that the segment of each of the two auxiliary pieces 5067 at the end is connected to the corresponding connecting region 5068.

As shown in FIG. 4O, the difference between the embodiments of FIG. 4O and FIG. 4L is that each of the two auxiliary pieces 5067 of the embodiment in FIG. 4O does not overlap the connecting region 5068 on the radial direction of the LED filament and is instead aligned with the connecting region 5068 along the axial direction of the LED filament. The LED filament according to the embodiment of FIG. 4O may be finer.

As shown in FIG. 4P, the difference between the embodiments of FIG. 4P and FIG. 4C is that the auxiliary piece 5067 of the embodiment in FIG. 4P is not connected with the connecting region 5068 and is instead around the connecting region 5068 by three sides of the connecting region 5068. In the embodiment, the number of the auxiliary piece 5067 in FIG. 4P is one and is around the entire array aligned by the LED chips 102, 104 and the connecting regions 5068 (i.e., the conductive electrodes 506)

The auxiliary pieces 5067 of the embodiments in FIGS. 4B, 4L, 4M, 4O, and 4P are not connected with the corresponding connecting region 5068; therefore, the auxiliary pieces 5067 of the embodiments in FIGS. 4B, 4L, 4M, 4O, and 4P may not pertain to the conductive electrodes 506 and, instead, may be deemed as individual elements, which may be non-conductive. The auxiliary pieces 5067 of the embodiments in FIG. 4N is an exception where one segment of each of the auxiliary pieces 5067 at the end is connected to the corresponding connecting region 5068 while the other segments of each of the auxiliary pieces 5067 are not connected to the corresponding connecting region 5068. In other words, only a portion of the auxiliary piece 5067 pertains to the corresponding conductive electrode 506.

In the embodiment shown in FIG. 4C, the first/last one of the LED chips 102 at the two ends of the array of the LED chips 102, 104 is entirely disposed within the area between the two auxiliary pieces 5067, in the other words, the first/last one of the LED chips 102 is entirely disposed within the boundary of the conductive electrode 506, i.e., the segment where the conductive electrode 506 disposed in. In other embodiments, the first/last one of the LED chips 102 may be only partially within the boundary of conductive electrode.

In the FIGS. 4F and 4G, the auxiliary pieces 5067 have a rectangle shape which has a constant width. In other embodiments, the auxiliary pieces 5067 may be similar to FIG. 4H, and have a width gradually decrease from the end close to the connecting region 5068.

The conductive electrode 506 and the LED chips 102, 104 are not limited to be in the same layer. In the embodiment of FIGS. 4E-4J, the conductive electrodes 506 are disposed in the base layer **420*b*, and the LED chips 102, 104 may be disposed in the top layer 420*a* (not shown in FIGS. 4E-4J), in this situation, the base layer 420*b* may be reversed and make the conductive electrodes 506** face upward during a manufacturing process of the LED filament, so as to electrically connect to the LED chips easily.

FIG. 4E and FIG. 4F shows an embodiment of a base layer (e.g., a phosphor film) with the conductive electrode embedded inside. As described previously, embodiments of FIGS. 4G-4J may be also a base layer with the conductive electrode embedded inside. As modified embodiments thereof, the conductive electrodes 506 shown in FIGS. 4F-4J may be disposed in top layer where LED chips disposed in (as shown in FIG. 3A). In this situation, the conductive electrodes 506 may be disposed at different height even they are in the same layer.

As shown in FIG. 4Q, The phosphor powder glue forming the light conversion coating 420 may extends into the holes 506*p* of the conductive electrode 506 as described above. The phosphor powder glue further extends from one side of the conductive electrode 506 to another side of the conductive electrode 506 through the holes 506*p*, as shown in FIG. 4Q. The phosphor powder glue contacts at least two sides (the upper side and the lower side) of the conductive electrode 506. That is to say, the conductive electrode 506 is clamped by the phosphor powder glue (the light conversion coating 420). In other words, the conductive electrode 506 is riveted by the phosphor powder glue (the light conversion coating 420), which increases the mechanical strength between the conductive electrode 506 and the light conversion coating 420.

Figure 5A:
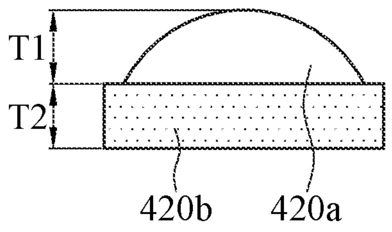
FIG. 5A to FIG. 5D respectively illustrate a cross sectional views of LED filaments according to different embodiments of the present disclosure.
Figure 5B:
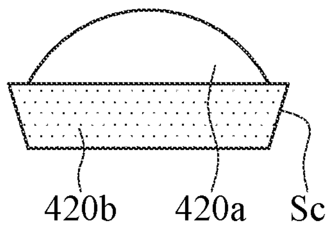
Figure 5C:
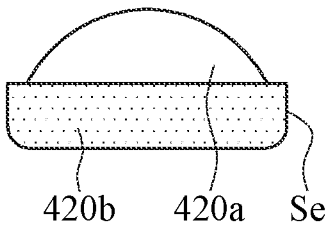
Figure 5D:
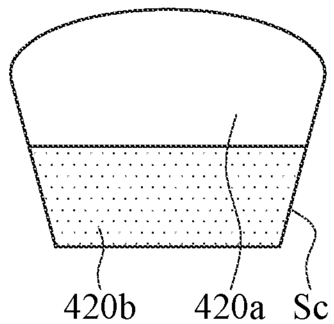

FIGS. 5A, 5B, 5C, and 5D are cross-sectional views of an LED filament according to different embodiments of the present invention. Surfaces of the filaments shown in FIGS. 5A-5D are with different angles. Top layers 420*a* shown in FIGS. 5A-5D may be made by a glue dispenser. Two sides of the top layer 420*a* naturally collapse to form arc surfaces after dispensing process by adjusting the viscosity of the phosphors glue. A cross section of a base layer 420*b* in FIG. 5A is rectangular because the phosphor film of the base layer 420*b* is cut vertically. A cross section of a base layer 420*b* in FIG. 5B is trapezoidal and has slant edges Sc because the phosphor film of the base layer 420*b* is cut bias or is cut by a cutter with an angular configuration. The top layer 420*a* may cut together with the base layer 420*b*, in this situation, the cross section of the top layer 420*a* has slant edges too. A cross section of a base layer 420*b* in FIG. 5C is similar to that of the base layer 420*b* in FIG. 5A. The difference between the base layers 420*b* of FIG. 5A and FIG. 5C is that lower corners of the base layer 420*b* in FIG. 5C are further processed to form arc corners Se. Based upon different finishing manners of FIGS. 5A-5D, the filament may have different illuminating angles and different effects of illumination. The base layer 420*b* in FIG. 5D is analogous to that in FIG. 5B. The difference between the LED filament of FIG. 5B and FIG. 5D is that the slant edges Sc in FIG. 5D extends from the base layer 420*b* to the top layer 420*a*. In other words, both of the top layer 420*a* and the base layer 420*b* in FIG. 5D have the slant edges Sc on two opposite sides of the LED filament. The slant edges Sc of the top layer 420*a* are aligned with the slant edges Sc of the base layer 420*b*. In such case, the cross section of the top layer 420*a* in FIG. 5D has an outline with an arched edge and the two opposite slant edges Sc.

The thickness of the base layer 420*b* may be less than that of the top layer 420*a*. As shown in FIG. 5A, the thickness T2 of the base layer 420*b* is less than the thickness T1 of the top layer 420*a*. In some case, the conductive electrodes 506 are mainly disposed at the base layer 420*b*. Heat generated by the conductive electrodes 506 may be easier dissipated from the base layer 420*b* under the circumstances that the base layer 420*b* is thinner than the top layer 420*a*. In some case, the LED chips 102, 104 face towards the top layer 420*a*, and therefore most of light rays emitted from the LED chips 102, 104 may pass through the top layer 420*a*, which results in lower brightness of the base layer 420*b* comparing to the brightness of the top layer 420*a*. The thicker top layer 420*a* with a greater amount of light reflecting/diffusing particles (e.g., phosphors) can reflect or diffuse a part of light rays towards the base layer 420*b*, and light rays can easily pass through the thinner base layer 420*b*; therefore, the brightness of top layer 420*a* and the base layer 420*b* can be uniform.

Figure 6A:
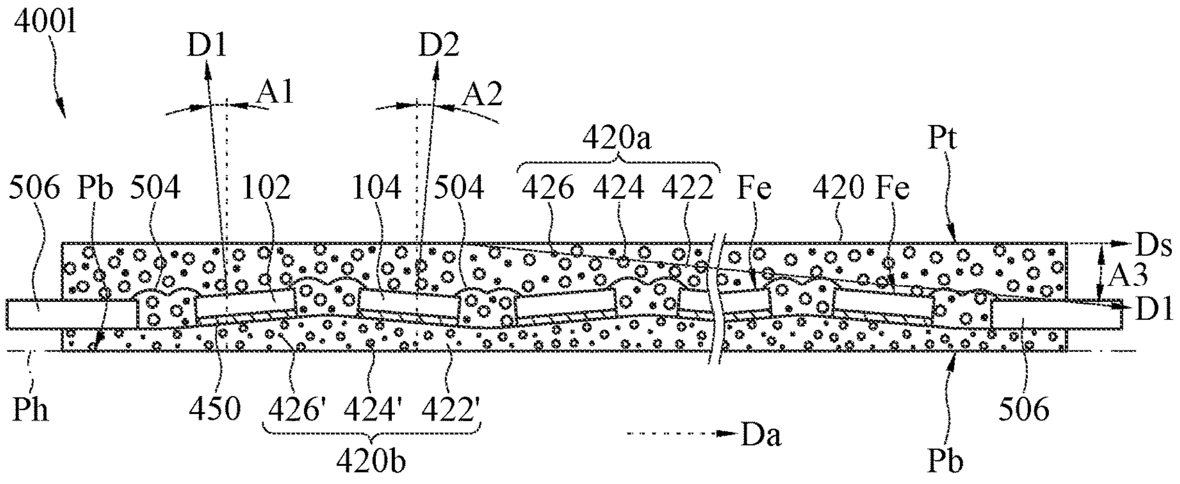
FIG. 6A and FIG. 6B respectively illustrate a cross sectional view and a perspective view of an LED filament according to an embodiment of the present disclosure.
Figure 6B:
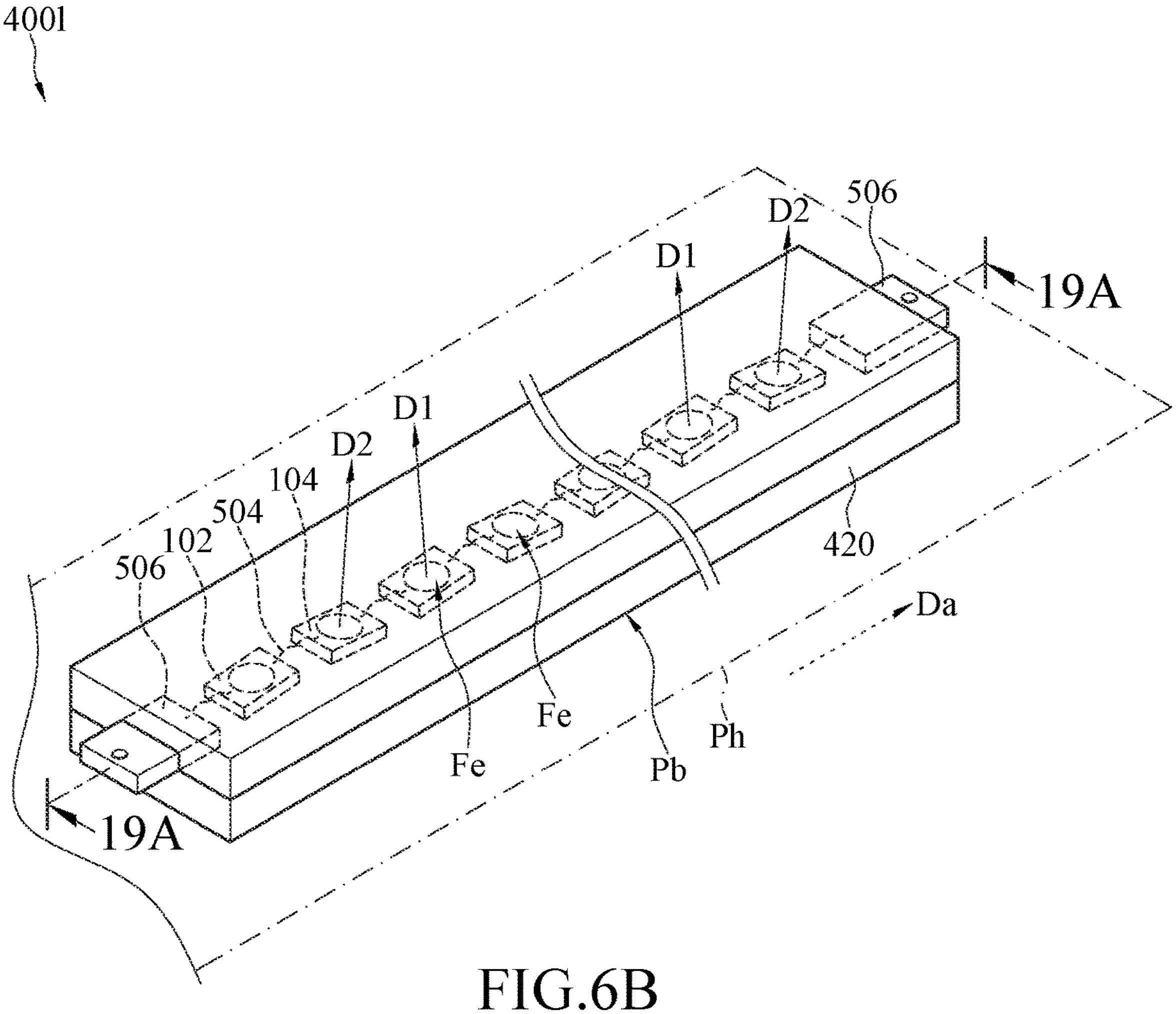

As shown in FIG. 3A, the LED chips 102, 104 are arranged on a flat surface of an embedded region between the base layer 420*b* and the top layer 420*a*; therefore, all of the LED chips 102, 104 on the flat surface face towards the same direction. Alternatively, as shown in FIG. 6A and FIG. 6B, the LED chips 102, 104 are arranged on a wave-shaped interface rather than a flat surface. The embedded region between the top layer 420*a* and the base layer 420*b* is not limited to the wave-shaped interface. In some embodiments, the embedded region may be of saw tooth shape. In an embodiment, the upper surface of the base layer 420*b* (the contact face contacting the top layer 420*a*) may have greater surface roughness to achieve similar effect.

Please refer to FIG. 6A and FIG. 6B. FIG. 6A illustrates a cross-sectional view of an LED filament 4001 according to an embodiment of the present disclosure. FIG. 6B illustrate a perspective view of the LED filament 4001. The LED filament 4001 can be referred to the LED filament 400*a*. A difference between the LED filament 4001 and the LED filament 400*a* is regarding the alignment or postures of the LED chips 102, 104. The LED chips 102, 104 of the LED filament 400*a* are aligned along the axial direction of the LED filament 400*a* and parallel with a horizontal plane on which the base layer 420*b* of the LED filament 400*a* is laid (referring to FIG. 3). In contrast, as shown in FIG. 6A and FIG. 6B, the LED chips 102, 104 of the LED filament 4001 are substantially arranged along the axial direction Da of the LED filament 4001 but not completely aligned with the axial direction Da of the LED filament 4001, which means that postures of at least a part of the LED chips 102, 104 of the LED filament 4001 related to the axis of the LED filament 4001 along the axial direction Da may be different from one another. In addition, at least a part of the LED chips 102, 104 of the LED filament 4001 is not parallel with a horizontal plane Ph on which the base layer 420*b* of the LED filament 4001 is laid (referring to FIG. 6A). The LED chips 102, 104 of the LED filament 4001 may respectively have different angles related to the horizontal plane Ph. In other words, postures of the LED chips 102, 104 of the LED filament 4001 related to the horizontal plane Ph where the LED filament 4001 is laid on are not identical. The horizontal plane Ph is a plane where the LED filament 4001 is laid on flatly and a bottom side of the LED filament 4001 (e.g., a face of the base layer 420*b* away from the top layer 420*a*) contacts with. The bottom side of the LED filament 4001 is substantially a flat surface and contacts the horizontal plane Ph while the LED filament 4001 is flatly laid on the horizontal plane Ph. Thus the bottom side of the LED filament 4001 can be referred to a base plane Pb of the LED filament 4001. The base plane Pb can be a reference indicating that the postures of the LED chips 102, 104 related to the base plane Pb may be varied and different from one another. Correspondingly, the illuminating directions of the LED chips 102, 104 may be different from one another. Under the circumstances, a side of the base layer 420*b* of the LED filament 4001 carrying the LED chips 102, 104 (or the die bond glues 450) and contacting the top layer 420*a* may be not a flat plane but may be a successively concave-convex plane so that each of the LED chips 102, 104 disposed on different positions of the successively concave-convex plane have different angles, accordingly. In some embodiments, all of the LED chips 102, 104 of the LED filament 4001 have angles related to the base plane Pb different from one another. Alternatively, a part of the LED chips 102, 104 of the LED filament 4001 have a first angle related to the base plane Pb, and another part of LED chips 102, 104 of the LED filament 4001 have a second angle related to the base plane Pb. In some embodiments, the first angle equals to 180 degrees minus the second angle. Additionally, the LED chips 102, 104 of the LED filament 4001 may have different heights related to the base plane Pb. As a result, the LED filament 4001 with the LED chips 102, 104 having different illuminating directions (different angles related to the base plane Pb) and/or different heights may generate a more even illumination, such as an omni-directional illumination.

As shown in FIG. 6A and FIG. 6B, in the embodiment, the LED chips 102, 104, one by one, tilt towards a first direction and a second direction related to the base plane Pb. The first direction and the second direction are opposite with each other. The first direction is substantially towards one of the two opposite conductive electrodes 506, and the second direction is substantially towards the other one of the two opposite conductive electrodes 506. For example, the first one of the LED chips 102, 104 tilts towards the first direction, the next one of the LED chips 102, 104 tilts towards the second direction, the third one of the LED chips 102, 104 tilts towards the first direction, and so on. While the LED chips 102, 104 individually tilt towards the first direction and the second direction, the LED chips 102, 104 individually face a first illumination direction D1 and a second illumination direction D2 shown in FIG. 6B. The first illumination direction D1 and the second illumination direction D2 point to different directions. Herein, the illumination direction is parallel with a normal line of the primary light emitting face of an LED chip.

In the embodiment, as shown in FIG. 6A and FIG. 6B, each of the LED chips 102, 104 has a light emitting face Fe where each of the LED chips 102, 104 generates the most intense light. The first illumination direction D1 and the second illumination direction D2 are parallel with the normal lines of the light emitting faces Fe of corresponding LED chips 102, 104. For example, the first illumination direction D1 is parallel with the normal line of the light emitting face Fe of the corresponding LED chip 102, and the second illumination direction D2 is parallel with the normal line of the light emitting face Fe of the corresponding LED chip 104. In addition, angles between the illumination directions of the LED chips 102, 104 and a direction perpendicular to the base plane Pb may be varied and different from one another. In the embodiment, the angles may be between 15 degrees to 20 degrees. For example, an angle A1 between the first illumination direction D1 of the LED chip 102 and the direction perpendicular to the base plane Pb may be 16 degrees, and an angle A2 between the second illumination direction D2 of the LED chip 104 and the direction perpendicular to the base plane Pb may be 19 degrees.

Figure 6C:
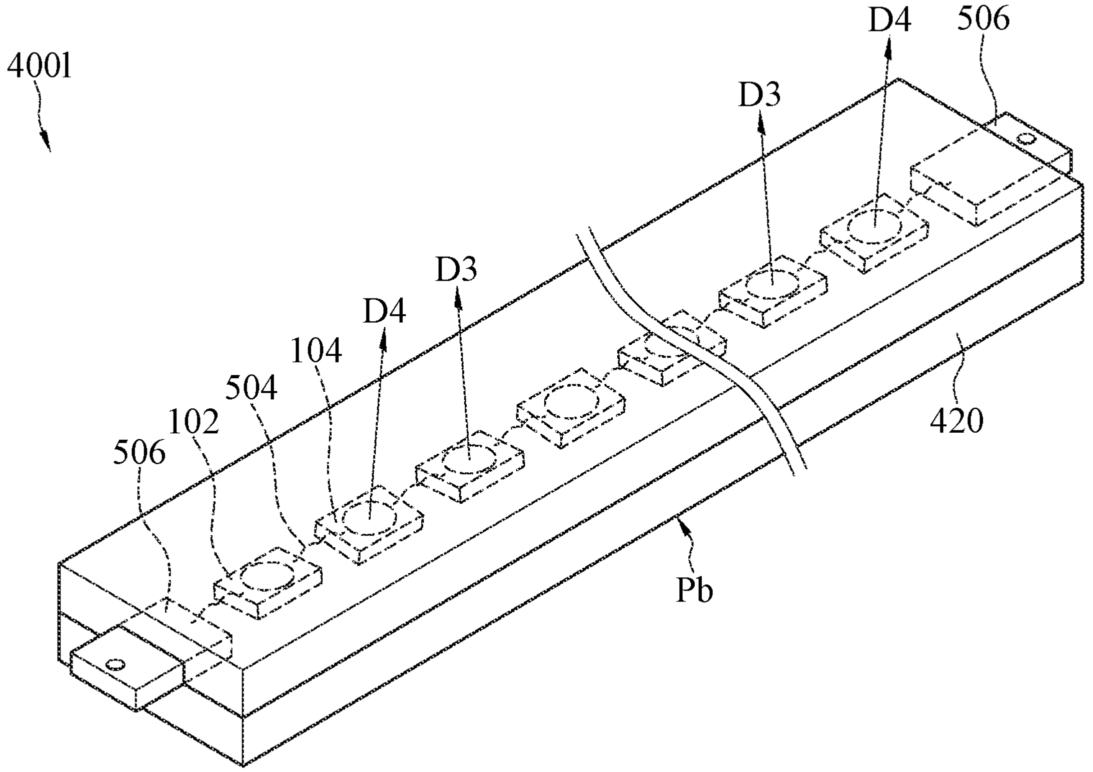
FIG. 6C to FIG. 6I respectively illustrate perspective views of LED filaments according to different embodiments of the present disclosure.

As shown in FIG. 6C, in the embodiment, the LED chips 102, 104, one by one, tilt towards a third direction (e.g., a third illumination direction) and a fourth direction (e.g., a fourth illumination direction) related to the base plane Pb. The third direction and the fourth direction are opposite with each other and are substantially perpendicular to the first direction and the second direction. The third direction is substantially towards one of the two opposite sides of the LED filament 4001 on a radial direction thereof; and the fourth direction is substantially towards the other one of the two opposite sides of the LED filament 4001 on the radial direction thereof. For example, the first one of the LED chips 102, 104 tilts towards the third direction, the next one of the LED chips 102, 104 tilts towards the fourth direction, the third one of the LED chips 102, 104 tilts towards the third direction, and so on. While the LED chips 102, 104 individually tilt towards the third direction and the fourth direction, the LED chips 102, 104 individually face a third illumination direction D3 and a fourth illumination direction D4 shown in FIG. 6C. The first illumination direction D1, the second illumination direction D2, the third illumination direction D3, and the fourth illumination direction D4 point to different directions.

Figure 6D:
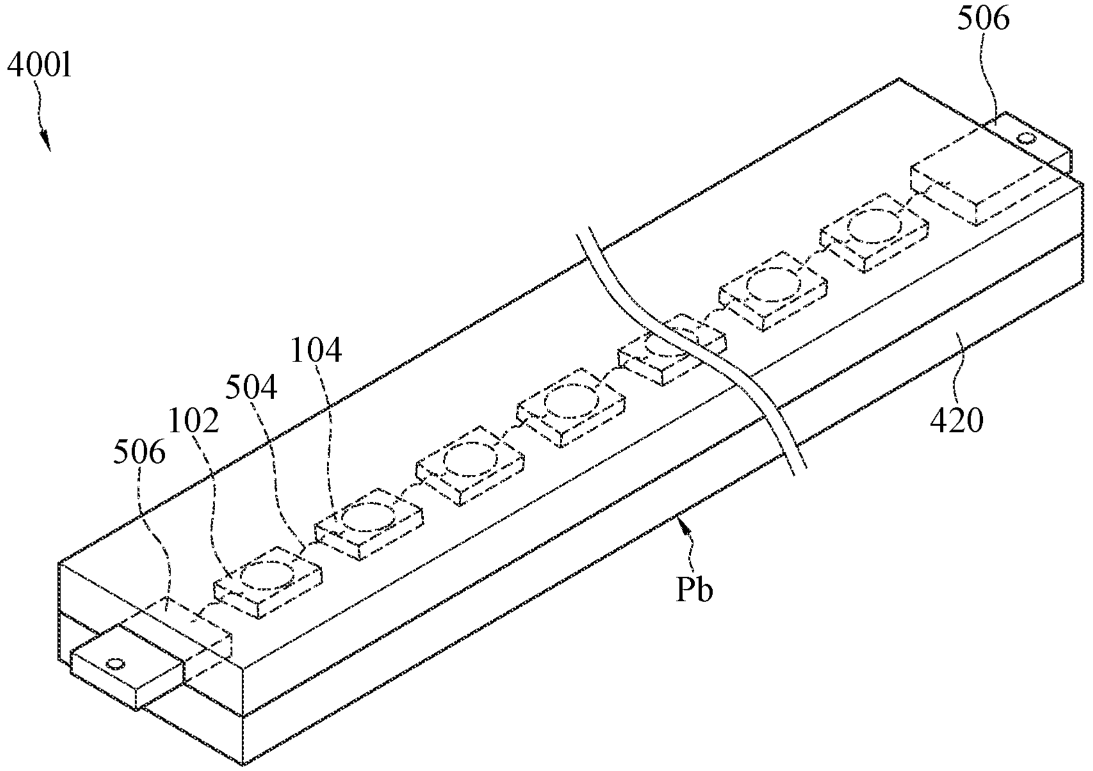

As shown in FIG. 6D, in the embodiment, the LED chips 102, 104, one set by one set (e.g., every two or more adjacent LED chips are defined as one set), tilt towards the third direction and the fourth direction related to the base plane Pb. In the embodiment, every two adjacent LED chips are defined as one set. For example, the first one set of the two adjacent LED chips 102, 104 tilts towards the third direction, the next one set of the two adjacent LED chips 102, 104 tilts towards the fourth direction, the third one set of the two adjacent LED chips 102, 104 tilts towards the third direction, and so on.

Figure 6E:
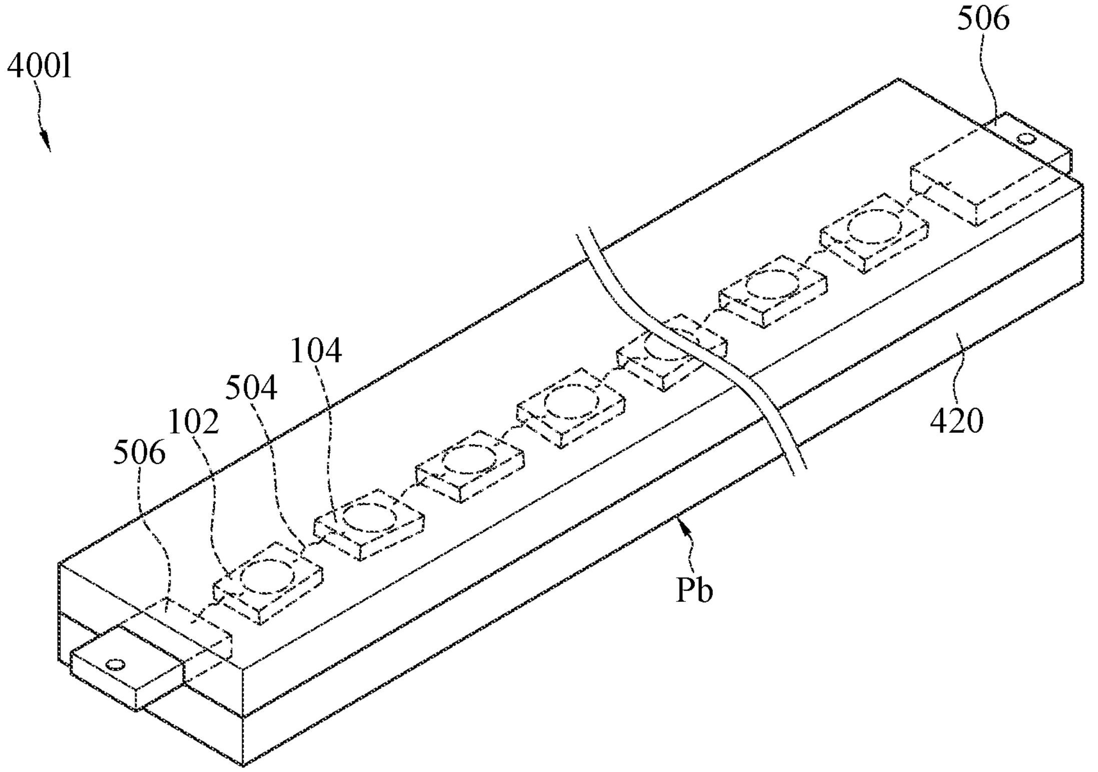

As shown in FIG. 6E, in the embodiment, the LED chips 102, 104 tilt respectively towards the first direction, the second direction, the third direction, and the fourth direction related to the base plane Pb. In the embodiment, the LED chips 102, 104 tilt respectively towards the first direction, the second direction, the third direction, and the fourth direction in an order. For example, the first one of the LED chips 102, 104 tilts towards the first direction, the next one of the LED chips 102, 104 tilts towards the second direction, the third one of the LED chips 102, 104 tilts towards the third direction, the fourth one of the LED chips 102, 104 tilts towards the fourth direction, the fifth one of the LED chips 102, 104 tilts towards the first direction, and so on. In other embodiments, the LED chips 102, 104 may tilt respectively towards the first direction, the second direction, the third direction, and the fourth direction without any order. In yet other embodiments, the LED chips 102, 104 may tilt respectively towards any directions. That is to say, the LED chips 102, 104 may have irregular illumination directions.

Figure 6F:
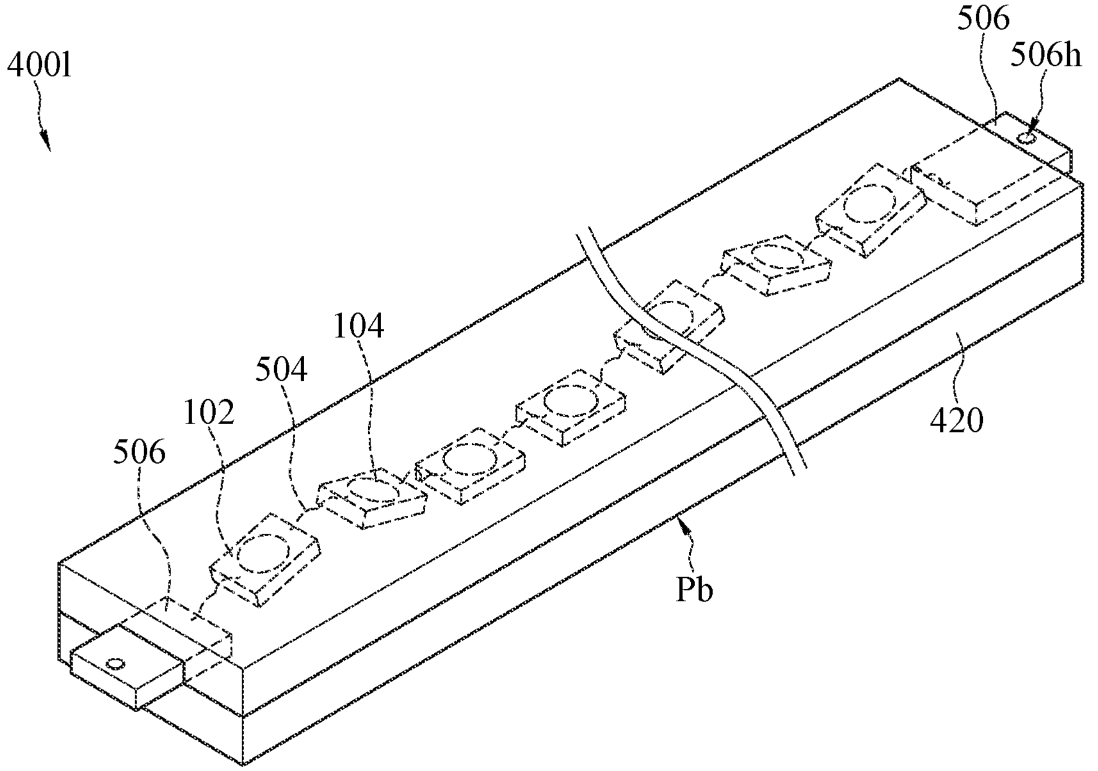

As shown in FIG. 6A to FIG. 6E, each of the LED chips 102, 104 may tilt towards different direction but all of the LED chips 102, 104 may still remain on an axis of the LED filament 4001. As shown in FIG. 6F, some of the LED chips 102, 104 may rotate about the radial direction of the LED filament 4001. The rotated LED chips 102, 104 would face towards a direction different from the radial direction. The rotated LED chips 102, 104 do not remain on the axis of the LED filament 4001. In addition, the rotated LED chips 102, 104 (e.g., the LED chips 102, 104 shown in the 19F) not only have different angles related to the base plane Pb the LED filament 4001 is laid on, but also have different heights related to the base plane Pb.

Figure 6G:
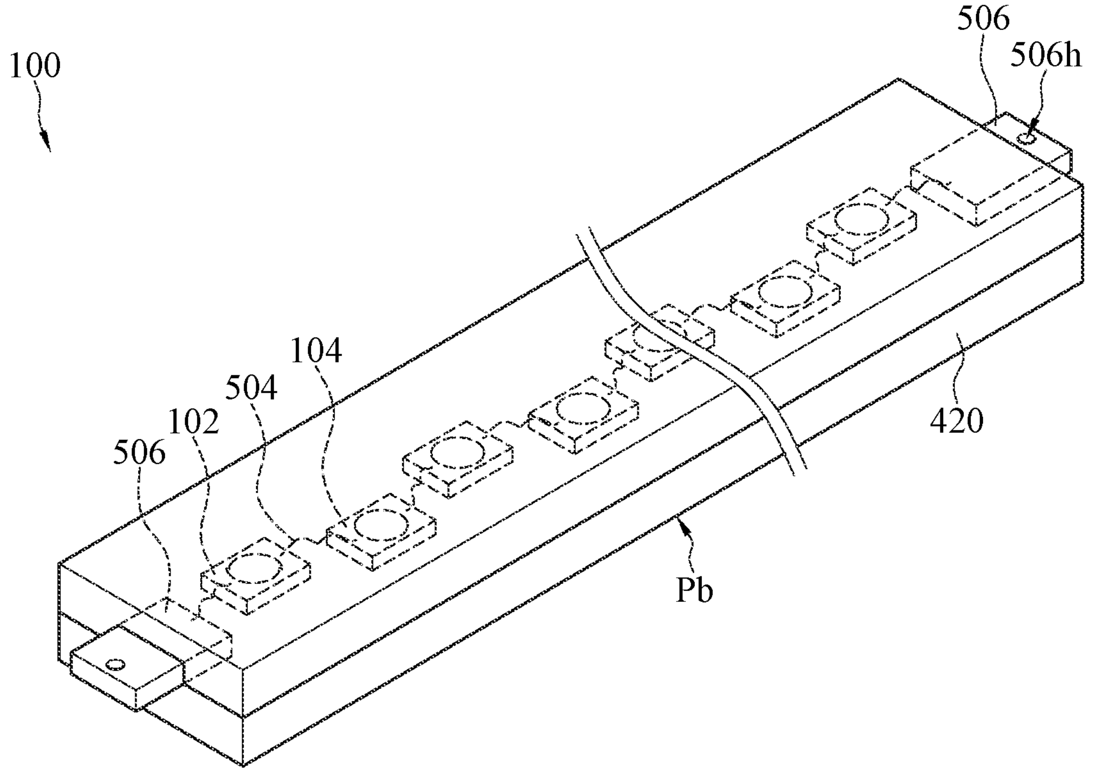

As shown in FIG. 6G, some of the LED chips 102, 104 may shift on the radial direction of the LED filament 4001 from the axis of the LED filament 4001. In other words, postures of the LED chips 102, 104 related to the axis of the LED filament 4001 are different from one another. The shifted LED chips 102, 104 do not remain on the axis of the LED filament 4001; however, the illumination direction of the shifted LED chips 102, 104 may be the same as that of the LED chips 102, 104 remaining on the axis of the LED filament 4001. In other embodiments, distances between each of the LED chips 102, 104 and the axis of the LED filament 4001 on the radial direction may be different from one another.

Figure 6H:
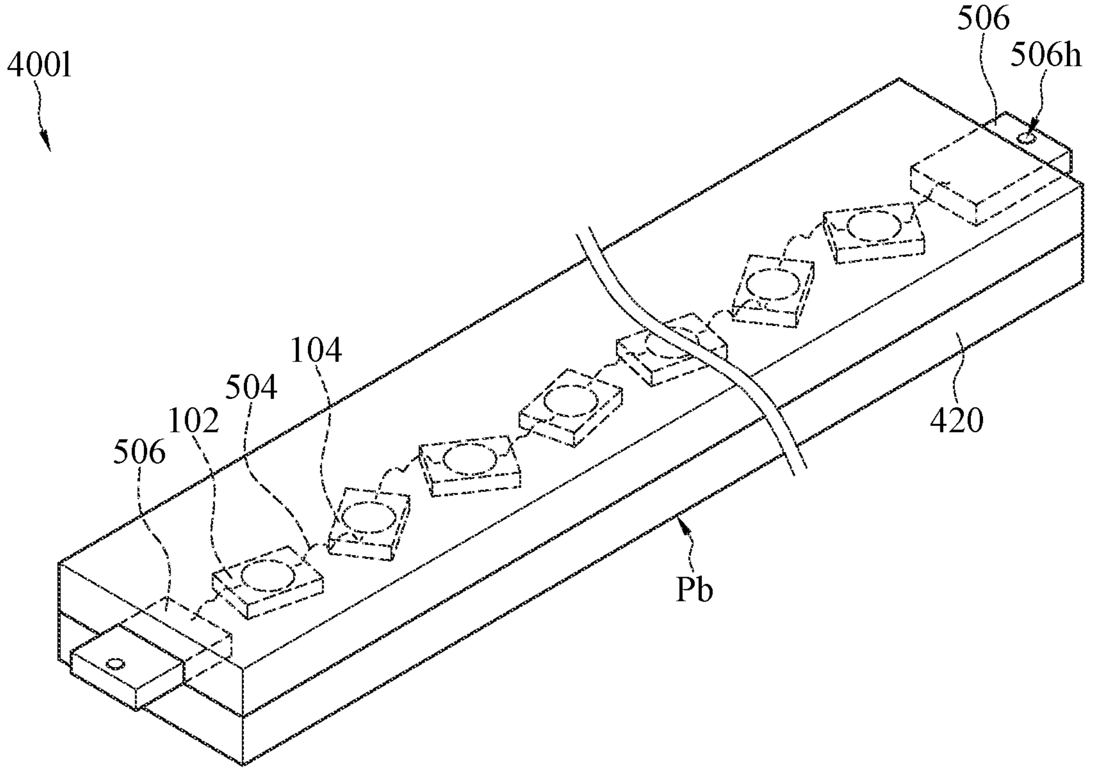

As shown in FIG. 6H, in the embodiment, the LED chips 102, 104 are aligned with the axial direction and at the same level, but some of the LED chips 102, 104 may rotate clockwise or counterclockwise about the normal line of the light emitting face of the LED chips 102, 104. For example, some of the LED chips 102, 104 rotate clockwise about the normal line thereof to 30 degrees, some of the LED chips 102, 104 rotate clockwise about the normal line thereof to 60 degrees, and some of the LED chips 102, 104 rotate counterclockwise about the normal line thereof to 60 degrees. In the embodiment, the LED chips 102, 104 have different angels related to the axis of the LED filament 4001. For example, an angle between the longest side of one of the LED chips 102, 104 and the axis of the LED filament 4001 may be different from that of another one of the LED chips 102, 104.

Figure 6I:
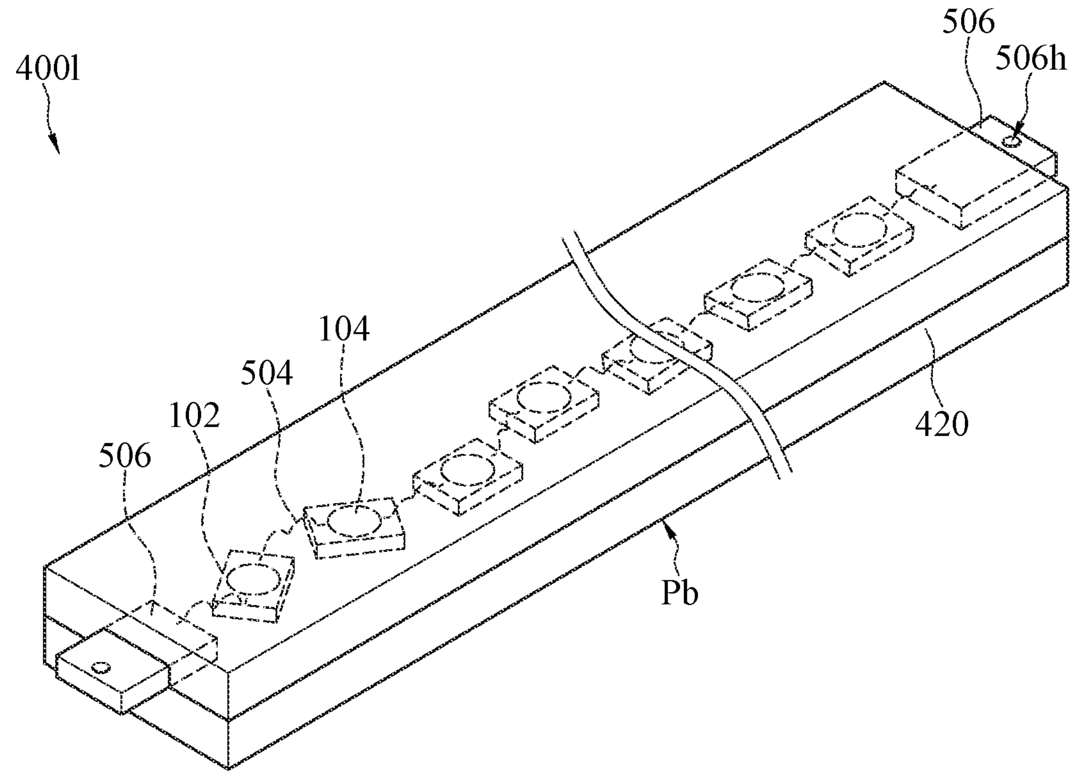

As shown in FIG. 6I, some of the LED chips 102, 104 may tilt towards different directions similar to the tilted LED chips 102, 104 shown in FIG. 6A to FIG. 6E, some of the LED chips 102, 104 may shift on the radial direction of the LED filament 4001 away from the axis of the LED filament 4001 similar to the shifted LED chips 102, 104 shown in FIG. 6G, and some of the LED chips 102, 104 may rotate about the normal line similar to the rotated LED chips 102, 104 shown in FIG. 6H. The LED filaments 4001 according to embodiments of FIG. 6A to FIG. 6I may have a more even illumination effect.

Figure 6J:
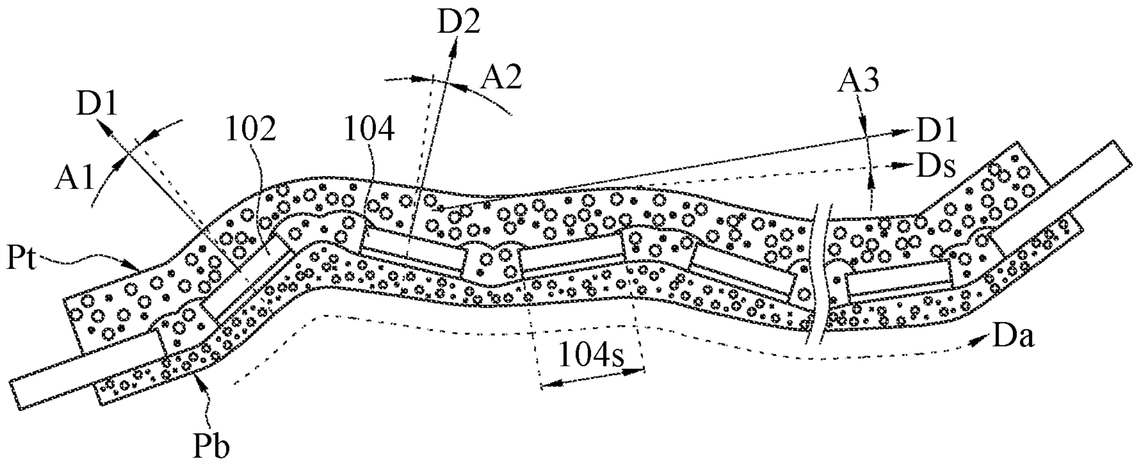
FIG. 6J illustrates a cross sectional view of an LED filament according to an embodiment of the present disclosure.

Please refer to FIG. 6J. FIG. 6J is a cross sectional view of an LED filament 4001 according to an embodiment of the present disclosure. The LED filament 4001 of FIG. 6J is analogous to the LED filament 4001 of FIG. 6A; however, the LED filament 4001 of FIG. 6J is not laid on the horizontal plane Ph but is bended or curved to form a curved shape. The LED filament 4001 of FIG. 6J with the curved shape may be used in an LED light bulb. It is noted that the base plane Pb and the axial direction Da of the LED filament 4001 as well as the axis of the LED filament 4001 are curved along with the curved shape of the LED filament 4001. Analogously, the postures of at least a part of the LED chips 102, 104 of FIG. 6J related to the axis of the LED filament 4001 along the axial direction Da or related to the base plane Pb may be varied and different from one another. In addition, the illumination directions of at least a part of the LED chips 102, 104 of FIG. 6J may point to different directions related to the base plane Pb. In particular, the postures or the illumination directions of the LED chips 102, 104 of FIG. 6J related to regions of the base plane Pb above which the corresponding LED chips 102, 104 are respectively located may be varied and different from one another.

As shown in FIG. 6J, in the embodiment, there is an angle between the illumination direction of each of the LED chips 102, 104 and a corresponding direction perpendicular to a region of the base plane Pb above which the corresponding one of the LED chips 102, 104 is located. The angles between the illumination directions of the LED chips 102, 104 and corresponding directions perpendicular to regions of the base plane Pb may be varied and different from one another. In the embodiment, the angles may be between 15 degrees to 20 degrees. For example, an angle A1 between the first illumination direction D1 of the LED chip 102 and the direction perpendicular to a region of the base plane Pb above which the corresponding LED chip 102 is located may be 17 degrees, and an angle A2 between the second illumination direction D2 of the LED chip 104 and the direction perpendicular to a region of the base plane Pb above which the corresponding LED chip 104 is located may be 20 degrees.

In the embodiment, as shown in FIG. 6A and FIG. 6J, the top side of the LED filament 4001 can be referred to a top plane Pt of the LED filament 4001. The top plane Pt is a surface of the top layer 420*a* away from the base plane Pb of the base layer 420*b*. The top plane Pt or the base plane Pb defines a surface extending direction Ds along the axial direction Da of the LED filament 4001. A long side of each of the LED chips 102, 104 parallel with the light emitting face Fe defines an LED extending direction D1. In the embodiment, the LED extending directions D1 of one of the LED chips 102, 104 may be different from that of another one of the LED chips 102, 104 because the LED chips 102, 104 of the LED filament 4001 may respectively have different angles related to the horizontal plane Ph. The surface extending direction Ds and the LED extending direction D1 of at least one of the LED chips 102, 104 define an included angle A3. The included angle A3 may be an acute angle greater than 0 degrees and less than 90 degrees. As shown in FIG. 6A, in the embodiment, the surface extending direction Ds is defined by the top plane Pt. Alternatively, the base plane Pb may define the surface extending direction Ds along the axial direction Da of the LED filament 4001. As shown in FIG. 6A, in the embodiment, the surface extending direction Ds defined by the top plane Pt may be the same as that defined by the base plane Pb. In some embodiments, the top plane Pt may not be a flat surface but a surface with a wave shape (as shown in FIG. 3E) or an irregular shape. Generally, the base plane Pb is more likely to be a flat surface due to the manufacturing process of the LED filament 4001. Considering the circumstances, the surface extending direction Ds is able to be defined by the flat base plane Pb as well.

In addition, as shown in FIG. 6J, the LED filament 4001 of FIG. 6J is not laid on the horizontal plane Ph but is bended or curved to form a curved shape. In such case, the surface extending direction Ds of the top plane Pt may vary in different sections of the LED filament 4001 along the axial direction Da. The surface extending direction Ds defined by a part of the top plane Pt in a section of the LED filament 4001 along the axial direction Da and the LED extending direction D1 of at least one of the LED chips 102, 104 in the above section also define the included angle A3. The included angle A3 may be an acute angle greater than 0 degrees and less than 90 degrees. For instance, as shown in FIG. 6J, there is a section 104*s* of the LED filament 4001 defined along the axial direction. A part of the top plane Pt in the section 104*s* overlapped by an LED chip in the section 104*s* along a radial direction perpendicular to the axial direction Da defines the surface extending direction Ds of the section 104*s*. The LED chip in the section 104*s* defines the LED extending direction D1. The surface extending direction Ds of the section 104*s* and the LED extending direction D1 of the LED chip in the section 104*s* define the included angle A3.

It is noted that the LED chips of the LED filament in all embodiments of the present disclosure may be manufactured in a wire bonding manner or in a flip-chip manner.

Figure 7A:
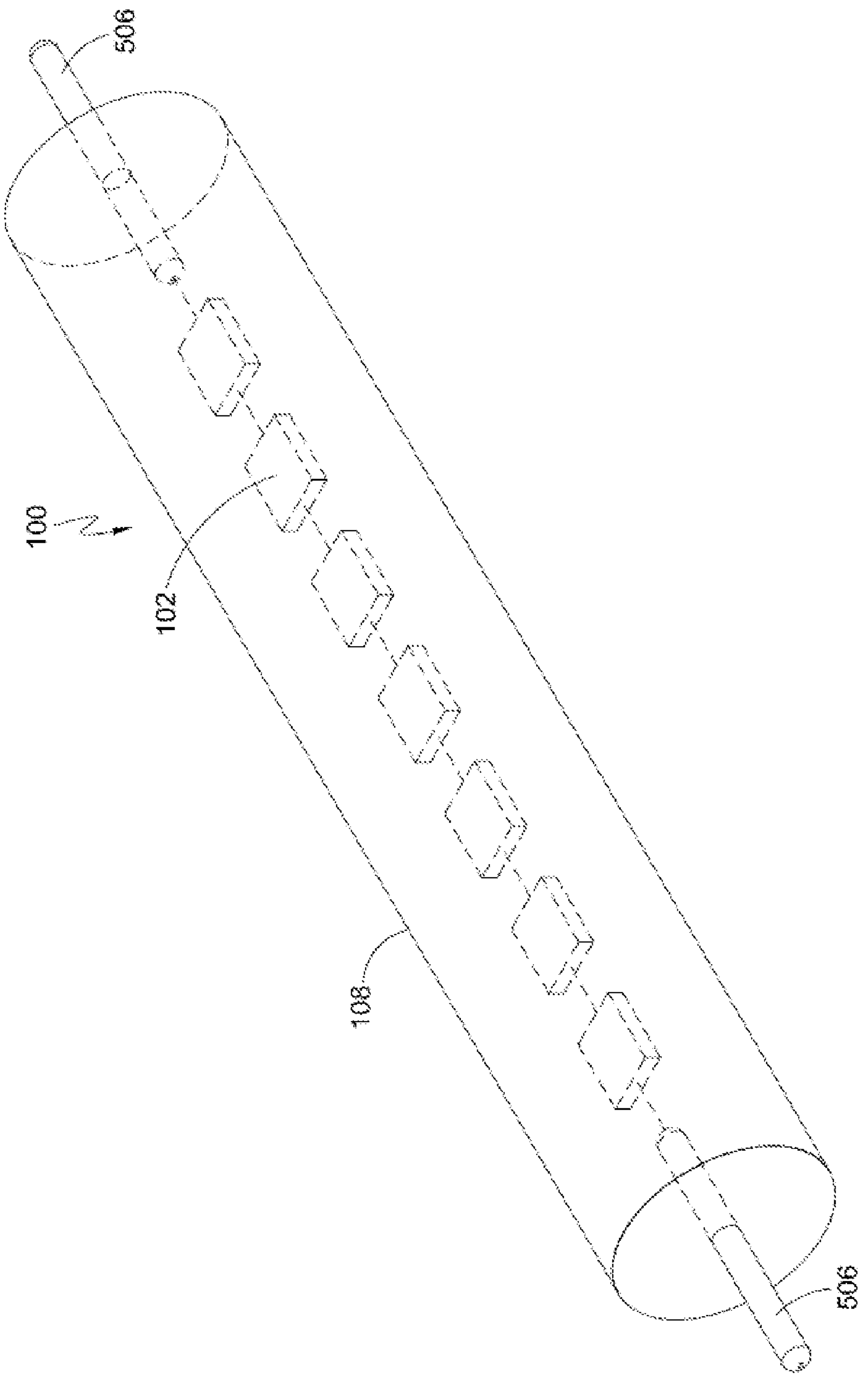
FIG. 7A illustrates a see-through view of an LED filament according to an embodiment of the present disclosure.

Please refer to FIG. 7A. FIG. 7A is a see-through view of the LED filament 100 in accordance with an exemplary embodiment of the present invention. The LED filament 100 includes an enclosure 108, a linear array of LED chips 102 and electrical connectors 506. The linear array of LED chips 102 is disposed in the enclosure 108 to be operable to emit light when energized through the electrical connectors 506. The enclosure 108 is an elongated structure preferably made of primarily flexible materials such as silicone. The enclosure 108 has either a fixed shape or, if made of a flexible material, a variable shape. The enclosure 108 is thus capable of maintaining either a straight posture or curvaceous posture (e.g. like a gift ribbon or helical spiral), with or without external support depending on applications, in an LED light bulb. The enclosure 108 has a cross section in any regular shapes (e.g. circle and polygon) or any irregular shapes (e.g. petal and star). The LED filament 100 of FIG. 7A can be referred to the LED filament 100, 400*a*, 4001 described above shown in FIG. 2A to FIG. 6E. The enclosure 108 can be referred to the light conversion coating 420.

In an embodiment, the enclosure 108 is a monolithic structure. In some embodiments, the monolithic structure shares a uniform set of chemical and physical properties throughout the entire structure. Being structurally indivisible, the monolithic structure need not be a uniform structure. In other embodiments, the monolithic structure includes a first portion and a second portion having a different property from the first portion. In another embodiment, the enclosure 108 includes a set of otherwise divisible layers or modules interconnected to form a unitary structure of the enclosure.

Figure 7B:
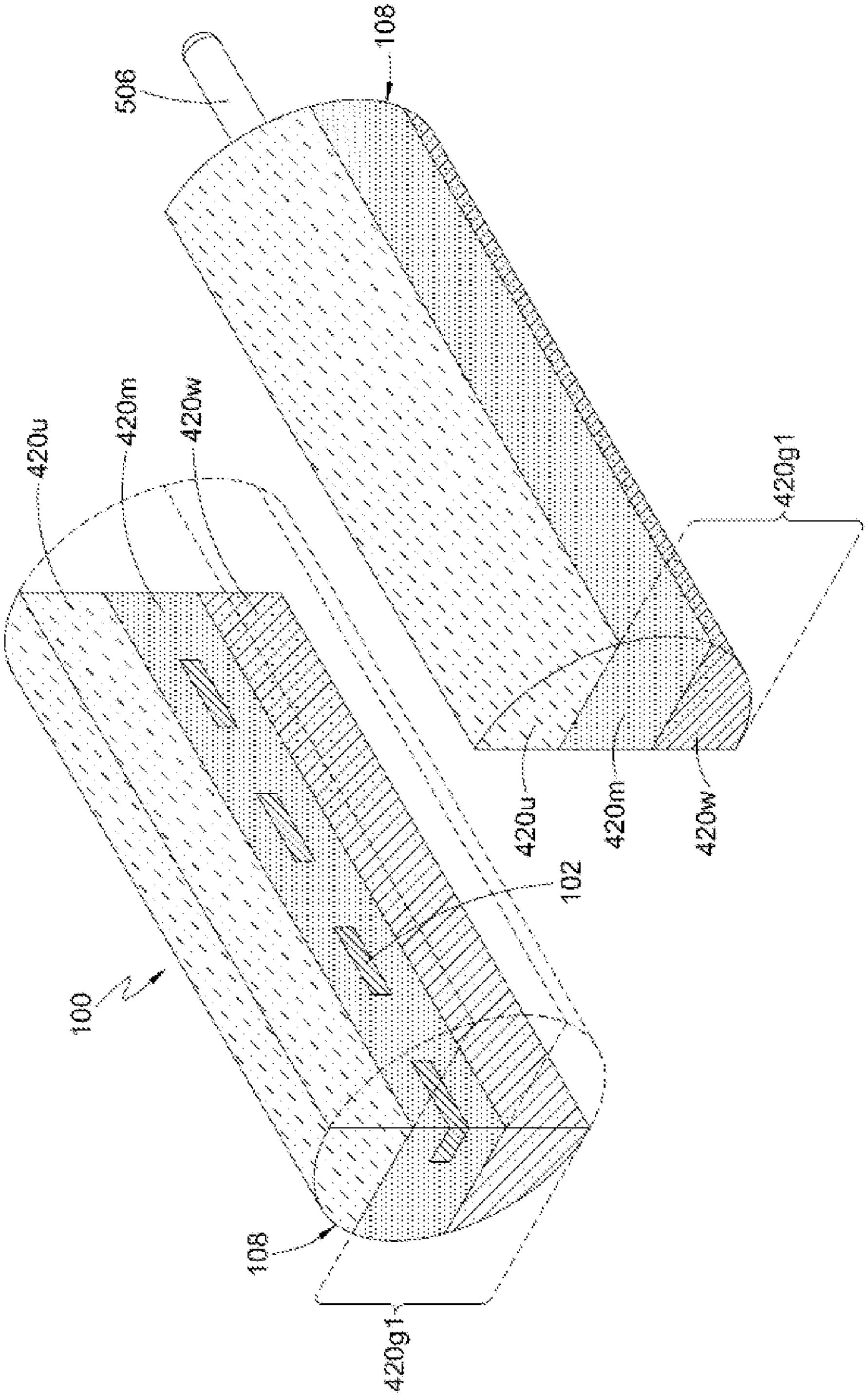
FIG. 7B and FIG. 7C respectively illustrate truncated LED filaments cut into halves according to different embodiments of the present disclosure.

In the embodiments where the enclosure is a monolithic structure exhibiting diverse chemical or physical properties in an otherwise indivisible structure, the enclosure 108 includes a plurality of regions having distinctive properties to enable a desired totality of functions for the LED filament. The plurality of regions in the enclosure is defined in a variety of ways depending on applications. In FIG. 7B, the truncated LED filament 100 is further sliced vertically—i.e. along the light illuminating direction of the linear array of LED chips 102—into equal halves along the longitudinal axis of the LED filament 100 to show its internal structure. The regions of the enclosure are defined by a hypothetical plane perpendicular to the light illuminating direction of the linear array of LED chips 102. For example, the enclosure 108 includes three regions, 420*w*, 420*m*, 420*u* defined by a hypothetical pair of planes compartmentalizing the enclosure 108 into an upper region 420*u*, a lower region 420*w* and a middle region 420*m* sandwiched by the upper region 420*u* and the lower region 420*w*. The linear array of LED chips 102 is disposed exclusively in one of the regions of the enclosure 108. Alternatively, the linear array of LED chips 102 is absent from at least one of the regions of the enclosure 108. Alternatively, the linear array of LED chips 102 is disposed in all regions of the enclosure 108. In FIG. 7B, the linear array of LED chips 102 is disposed exclusively in the middle region 420*m* of the enclosure 108 and is spaced apart by the middle region 420*m* from the top region 420*u* and the lower region 420*w*. In an embodiment, the middle region 420*m* includes a wavelength converter for converting blue light emitting from the LED chip 102 into white light. The upper region 420*u* includes a cylindrical lens for aligning the light beaming upwards. The lower region 420*w* includes a cylindrical lens for aligning the light beaming downwards. In another embodiment, the middle region 420*m* is made harder than the upper region 420*u*, the lower region 420*w* or both by, for example, embedding a greater concentration of phosphor particles in the middle region 420*m* than in the upper region 420*u*, the lower region 420*w* or both. The middle region 420*m*, because it is harder, is thus configured to better protect the linear array of LED chips 102 from malfunctioning when the LED filament 100 is bent to maintain a desired posture in a light bulb. The upper region 420*u* (or the lower region 420*w*) is made softer for keeping the entire LED filament 100 as bendable in the light bulb as it requires for generating omnidirectional light with preferably exactly one LED filament 100. In yet another embodiment, the middle region 420*m* has greater thermal conductivity than the upper region 420*u*, the lower region 420*w* or both by, for example, doping a greater concentration of nanoparticles in the middle region 420*m* than in the upper region 420*u*, the lower region 420*w* or both. The middle region 420*m*, having greater thermal conductivity, is thus configured to better protect the linear array of LED chips 102 from degrading or burning by removing excess heat from the LED chip 102. The upper region 420*u* (or the lower region 420*w*), because it is spaced apart from the linear array of LED chips 102, plays a lesser role than the middle region 420*m* in cooling the LED chip 102. The cost for making the LED filament 100 is thus economized when the upper region 420*u* (or the lower region 420*w*) is not as heavily doped with nanoparticles as the middle region 420*m*. The dimension of the middle region 420*m*, in which the linear array of LED chips 102 is exclusively disposed, in relation to the entire enclosure 108 is determined by a desired totality of considerations such as light conversion capability, bendability and thermal conductivity. Other things equal, the bigger the middle region 420*m* in relation to the entire enclosure 108, the LED filament 100 has greater light conversion capability and thermal conductivity but will be less bendable. A cross section perpendicular to the longitudinal axis of the LED filament 100 reveals the middle region 420*m* and other regions of the enclosure. R1 is a ratio of the area of the middle region 420*m* to the overall area of the cross section. Preferably, R1 is from 0.2 to 0.8. Most preferably, R1 is from 0.4 to 0.6.

In an embodiment, the middle region 420*m*, the top region 420*u*, and the lower region 420*w* can function as converters for converting color temperature. For example, the light emitted from the LED chips 102 may have a first color temperature, and the light passing through the middle region 420*m* may have a second color temperature. The second color temperature is less than the first color temperature, meaning that the color temperature of the light emitted from the LED chips 102 is converted by the middle region 420*m*. To achieve the conversion of the color temperature, the middle region 420*m* may contain certain phosphors or other optical particles. In addition, the light from the middle region 420*m* passing through the top region 420*u* or the lower region 420*w* may have a third color temperature. The third color temperature is less than the second color temperature, meaning that the color temperature of the light passing through the middle region 420*m* is further converted by the top region 420*u* or the lower region 420*w*. The first, second, and third color temperatures are different from one another. In other words, the light emitted from the LED chips 102 may have a main wavelength, the light passing through the middle region 420*m* may have another main wavelength, and the light further passing through the top region 420*u* or the lower region 420*w* may have yet another main wavelength. In the embodiment, most of the light may pass through the middle region 420*m* and then pass through the upper region 420*u* or the lower region 420*w* along the light illuminating direction of the linear array of LED chips 102; however, a lateral portion of the middle region 420*m* is exposed from the enclosure 108, and thus a part of the light may directly pass through the lateral portion of the middle region 420*m* to outside without passing through the top region 420*u* or the lower region 420*w*. In the embodiment, the lateral portion of the middle region 420*m* is not on the light illuminating direction of the linear array of LED chips 102; therefore, a trace amount of the light directly pass through the lateral portion of the middle region 420*m* to outside. The overall color temperature measured from outside of the LED filament 100 may be slightly greater than the third color temperature due to the trace amount of the light directly passing through the lateral portion of the middle region 420*m*.

Figure 7C:
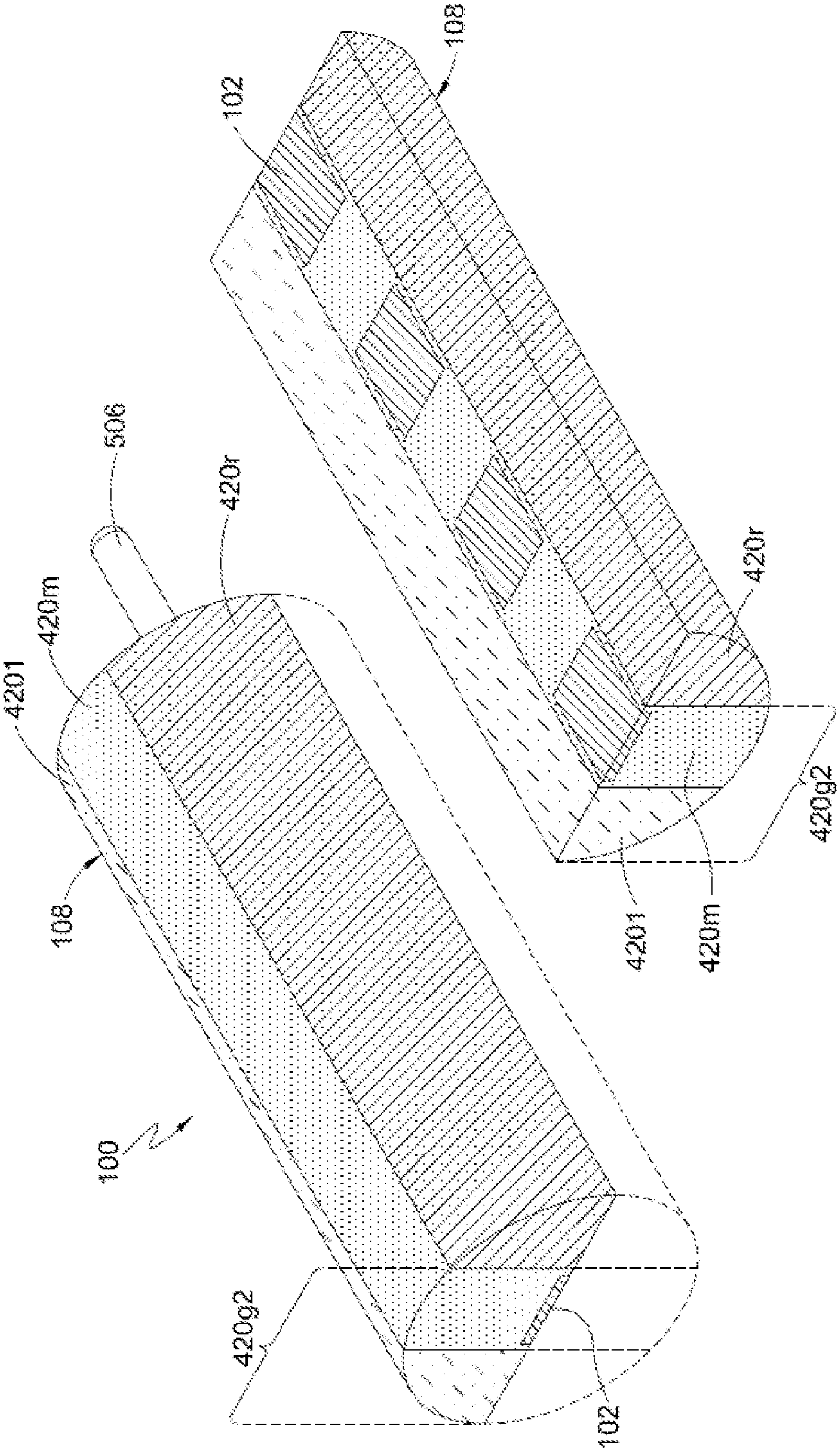

In FIG. 7C, the truncated LED filament 100 is further sliced horizontally—i.e. perpendicular to the light illuminating direction of the linear array of LED chips 102—into equal halves along the longitudinal axis of the LED filament 100 to show its internal structure. The regions of the enclosure 108 are defined by a hypothetical plane parallel to the light illuminating direction of the linear array of LED chips 102. For example, the enclosure 108 includes three regions 4201, 420*m*, 420*r* defined by a hypothetical pair of planes compartmentalizing the enclosure 108 into a right region 420*r*, a left region 4201 and a middle region 420*m* sandwiched by the right region 420*r* and the left region 4201. The linear array of LED chips 102 is disposed exclusively in one of the regions of the enclosure 108. Alternatively, the linear array of LED chips 102 is absent from at least one of the regions of the enclosure 108. Alternatively, the linear array of LED chips 102 is disposed in all regions of the enclosure 108. In FIG. 7C, the linear array of LED chips 102 is disposed exclusively in the middle region 420*m* of the enclosure 108 and is spaced apart by the middle region 420*m* from the right region 420*r* and the left region 4201. In an embodiment, the middle region 420*m* includes a wavelength converter for converting blue light emitting from the LED chip 102 into white light. The right region 420*r* includes a cylindrical lens for aligning the light beaming rightwards. The left region 4201 includes a cylindrical lens for aligning the light beaming leftwards. In another embodiment, the middle region 420*m* is made harder than the right region 420*r*, the left region 4201 or both by, for example, embedding a greater concentration of phosphor particles in the middle region 420*m* than in the right region 420*r*, the left region 4201 or both. The middle region 420*m*, because it is harder, is thus configured to better protect the linear array of LED chips 102 from malfunctioning when the LED filament 100 is bent to maintain a desired posture in a light bulb. The right region 420*r* (or the left region 4201) is made softer for keeping the entire LED filament 100 as bendable in the light bulb as it requires for generating omnidirectional light with, preferably, exactly one LED filament 100. In yet another embodiment, the middle region 420*m* has greater thermal conductivity than the right region 420*r*, the left region 4201 or both by, for example, doping a greater concentration of nanoparticles in the middle region 420*m* than in the right region 420*r*, the left region 4201 or both. The middle region 420*m*, having greater thermal conductivity, is thus configured to better protect the linear array of LED chips 102 from degrading or burning by removing excess heat from the LED chip 102. The right region 420*r* (or the left region 4201), because it is spaced apart from the linear array of LED chips 102, plays a lesser role than the middle region 420*m* in cooling the LED chip 102. The cost for making the LED filament 100 is thus economized when the right region 420*r* (or the left region 4201) is not as heavily doped with nanoparticles as the middle region 420*m*. The dimension of the middle region 420*m*, in which the linear array of LED chips 102 is exclusively disposed, in relation to the entire enclosure 108 is determined by a desired totality of considerations such as light conversion capability, bendability and thermal conductivity. Other things equal, the bigger the middle region 420*m* in relation to the entire enclosure 108, the LED filament 100 has greater light conversion capability and thermal conductivity but will be less bendable. A cross section perpendicular to the longitudinal axis of the LED filament 100 reveals the middle region 420*m* and other regions of the enclosure 108. R2 is a ratio of the area of the middle region 420*m* to the overall area of the cross section. Preferably, R2 is from 0.2 to 0.8. Most preferably, R2 is from 0.4 to 0.6.

In an embodiment, the middle region 420*m*, the right region 420*r*, and the left region 4201 can function as converters for converting color temperature. For example, the light emitted from the LED chips 102 may have a first color temperature, and the light passing through the middle region 420*m* may have a second color temperature. The second color temperature is less than the first color temperature, meaning that the color temperature of the light emitted from the LED chips 102 is converted by the middle region 420*m*. To achieve the conversion of the color temperature, the middle region 420*m* may contain certain phosphors or other optical particles. In addition, the light from the middle region 420*m* passing through the right region 420*r* or the left region 4201 may have a third color temperature. The third color temperature is less than the second color temperature, meaning that the color temperature of the light passing through the middle region 420*m* is further converted by the right region 420*r* or the left region 4201. The first, second, and third color temperatures are different from one another. In other words, the light emitted from the LED chips 102 may have a main wavelength, the light passing through the middle region 420*m* may have another main wavelength, and the light further passing through the right region 420*r* or the left region 4201 may have yet another main wavelength. In the embodiment, less of the light may pass through the middle region 420*m* and then pass through the upper region 420*u* or the left region 4201 along the light illuminating direction of the linear array of LED chips 102 comparing to the above embodiment shown in FIG. 7B. A lateral portion of the middle region 420*m* is exposed from the enclosure 108, and thus a part of the light may directly pass through the lateral portion of the middle region 420*m* to outside without passing through the right region 420*r* or the left region 4201. In the embodiment, the lateral portion of the middle region 420*m* is exactly on the light illuminating direction of the linear array of LED chips 102; therefore, a large amount of the light directly pass through the lateral portion of the middle region 420*m* to outside. The overall color temperature measured from outside of the LED filament 100 may be significantly greater than the third color temperature due to the large amount of the light directly passing through the lateral portion of the middle region 420*m*.

Figure 7D:
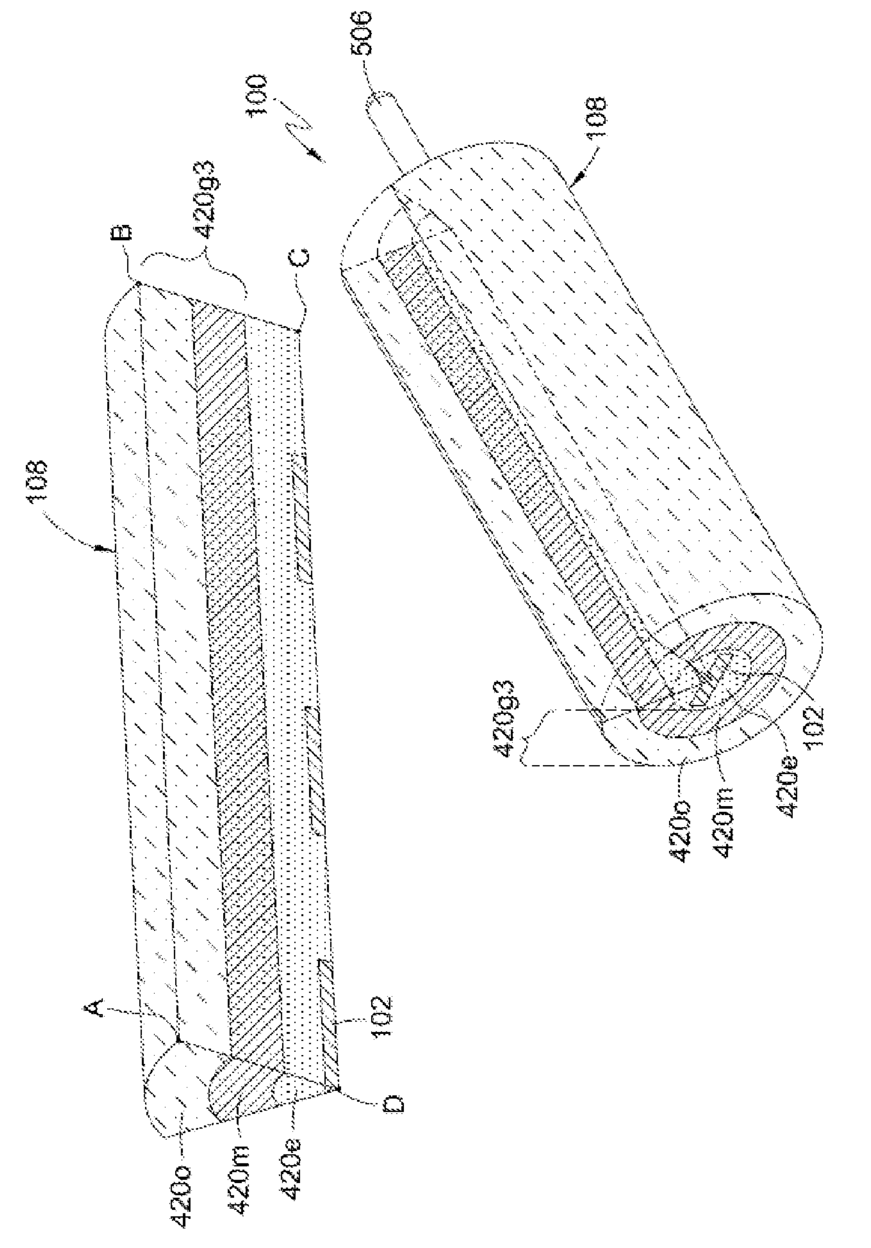
FIG. 7D and FIG. 7E respectively illustrate a truncated LED filaments carved into two portions according to an embodiment of the present disclosure.

In FIG. 7D, the truncated LED filament 100 is further carved into a small portion and a big portion to show its internal structure. The small portion is defined by revolving the rectangle ABCD around the line CD (i.e. the central axis of the LED filament 100) for a fraction of 360 degrees. Likewise, the big portion is defined by revolving the rectangle ABCD around the line CD but for the entirety of 360 degrees except for the space taken by the small portion. The regions of the enclosure 108 are defined by a hypothetical cylindrical surface having the central axis of the LED filament 100 as its central axis. For example, the enclosure 108 includes three regions 420*e*, 420*m*, 420*o* defined by a hypothetical pair of coaxial cylindrical surfaces compartmentalizing the enclosure 108 into a core region 420*e*, an outer region 420*o* and a middle region 420*m* sandwiched by the core region 420*e* and the outer region 420*o*. The linear array of LED chips 102 is disposed exclusively in one of the regions of the enclosure 108. Alternatively, the linear array of LED chips 102 is absent from at least one of the regions of the enclosure 108. Alternatively, the linear array of LED chips 102 is disposed in all regions of the enclosure 108. In FIG. 7D, the linear array of LED chips 102 is disposed exclusively in the core region 420*e* of the enclosure 108 and is spaced apart by the core region 420*e* from the middle region 420*m* and the outer region 420*o*. In an embodiment, the outer region 420*o* includes a light scatterer for increasing light extraction from the LED chip 102 by reducing total internal reflection. The middle region 420*m* includes a wavelength converter for converting blue light emitting from the LED chip 102 into white light. The core region 420*e* includes a spacer. The spacer prevents heat coming from the LED chip 102 from quickly degrading the phosphor particle in the wavelength converter by keeping the phosphor particle apart from the LED chip 102. Moreover, the spacer enables a uniform thickness of the middle region 420*m*, which includes the wavelength converter, to produce uniform white light, which entails a proper combination of blue light and the phosphor light. In another embodiment, the middle region 420*m* is made harder than the core region 420*e*, the outer region 420*o* or both by, for example, embedding a greater concentration of phosphor particles in the middle region 420*m* than in the core region 420*e*, the outer region 420*o* or both. The middle region 420*m*, because it is harder, is thus configured to better protect the linear array of LED chips 102 from malfunctioning when the LED filament 100 is bent to maintain a desired posture in a light bulb. The core region 420*e* (or the outer region 420*o*) is made softer for keeping the entire LED filament 100 as bendable in the light bulb as it requires for generating omnidirectional light with, preferably, exactly one LED filament 100. In yet another embodiment, the core region 420*e* has greater thermal conductivity than the middle region 420*m*, the outer region 420*o* or both by, for example, doping a greater concentration of such particles as nanoparticles, aluminium oxide, aluminium nitride and boron nitride in the core region 420*e* than in the middle region 420*m*, the outer region 420*o* or both. These particles are electrical insulators while having greater heat conductivity than phosphor particles. The core region 420*e*, having greater thermal conductivity, is thus configured to better protect the linear array of LED chips 102 from degrading or burning by removing excess heat from the LED chip 102. The middle region 420*m* (or the outer region 420*o*), because it is spaced apart from the linear array of LED chips 102, plays a lesser role than the core region 420*e* in cooling the LED chip 102 through heat conduction. The cost for making the LED filament 100 is thus economized when the outer region 420*o* (or the middle region 420*m*) is not as heavily doped with nanoparticles as the core region 420*e*. In still another embodiment, the outer region 420*o* has greater thermal radiation power than the middle region 420*m*, the core region 420*e* or both by, for example, doping a greater concentration of such particles as nanoparticles, graphene, nano-silver, carbon nanotube and aluminium nitride in the outer region 420*o* than in the middle region 420*m*, the core region 420*e* or both. These particles have greater thermal radiation power than the optically transmissive binder and greater thermal conductivity than phosphor particles. The outer region 420*o*, having greater thermal conductivity, is thus configured to better protect the linear array of LED chips 102 from degrading or burning by removing excess heat from the LED chip 102. The core region 420*e* (or the outer region 420*o*), because of their weaker thermal radiation power, plays a lesser role than the outer region 420*o* in cooling the LED chip 102 through thermal radiation. The cost for making the LED filament 100 is thus economized when the core region 420*m* (or the middle region 420*m*) is not as heavily doped with nanoparticles as the outer region 420*o*. These particles are electrical insulators while having greater heat conductivity than phosphor particles. The core region 420*e*, having greater thermal conductivity, is thus configured to better protect the linear array of LED chips 102 from degrading or burning by removing excess heat from the LED chip 102. The middle region 420*m* (or the outer region 420*o*), because it is spaced apart from the linear array of LED chips 102, plays a lesser role than the core region 420*e* in cooling the LED chip 102 through heat conduction. The cost for making the LED filament 100 is thus economized when the outer region 420*o* (or the middle region 420*m*) is not as heavily doped with nanoparticles as the core region 420*e*. To enhance the ability of the LED filament 100 to reveal colors of objects faithfully in comparison with an ideal or natural light source, in still another embodiment, the core region 420*e* has an excitation spectrum (and/or emission spectrum) induced at shorter wavelengths than the middle region 420*m*, the outer region 420*o* or both by, for example, doping a greater concentration of such particles as phosphors in the core region 420*e* than in the middle region 420*m*, the outer region 420*o* or both. The core region 420*e* is responsible for converting light coming from the LED chip 102 at the ultraviolet range into the visible spectrum. Other regions 420*m*, 420*o* of the LED filament 100 are responsible for, by contrast, further converting light coming from the core region 420*e* into light having even longer wavelengths. In an embodiment, the core region 420*e* is doped with a greater concentration of phosphor particles than the middle region 420*m*, the outer region 420*o* or both. The middle region 420*m*, which is optional in some embodiments, includes a luminescent dye for converting light coming from the core region 420*e* into light having longer wavelengths and a lesser concentration of phosphor particles than the core region 420*e*. The outer region 420*o* includes a luminescent dye for converting light coming from the core region 420*e* into light having longer wavelengths but includes no phosphor particles for keeping high flexibility of the LED filament 100. The dimension of the core region 420*e*, in which the linear array of LED chips 102 is exclusively disposed, in relation to the entire enclosure 108 is determined by a desired totality of considerations such as light conversion capability, bendability and thermal conductivity. Other things equal, the bigger the core region 420*e* in relation to the entire enclosure 108, the LED filament 100 has less light conversion capability and thermal conductivity but will be more bendable. A cross section perpendicular to the longitudinal axis of the LED filament 100 reveals the core region 420*e* and other regions of the enclosure 108. R3 is a ratio of the area of the core region 420*e* to the overall area of the cross section. Preferably, R3 is from 0.1 to 0.8. Most preferably, R3 is from 0.2 to 0.5. The dimension of the middle region 420*m*, which includes the wavelength converter, in relation to the entire enclosure 108 is determined by a desired totality of considerations such as light conversion capability, bendability and thermal conductivity. Other things equal, the bigger the middle region 420*m* in relation to the entire enclosure 108, the LED filament 100 has greater light conversion capability and thermal conductivity but will be less bendable. A cross section perpendicular to the longitudinal axis of the LED filament 100 reveals the middle region 420*m* and other regions of the enclosure 108. R4 is a ratio of the area of the middle region 420*m* to the overall area of the cross section. Preferably, R4 is from 0.1 to 0.8. Most preferably, R4 is from 0.2 to 0.5.

In an embodiment, the middle region 420*m*, the core region 420*e*, and the outer region 420*o* can function as converters for converting color temperature. For example, the light emitted from the LED chips 102 may have a first color temperature, and the light passing through the core region 420*e* may have a second color temperature. The second color temperature is less than the first color temperature, meaning that the color temperature of the light emitted from the LED chips 102 is converted by the core region 420*e*. To achieve the conversion of the color temperature, the core region 420*m* may contain certain phosphors or other optical particles. In addition, the light from the core region 420*e* passing through the middle region 420*m* may have a third color temperature. The third color temperature is less than the second color temperature, meaning that the color temperature of the light passing through the core region 420*e* is further converted by the middle region 420*m*. The light from the middle region 420*m* passing through the outer region 420*o* may have a fourth color temperature. The fourth color temperature is less than the third color temperature, meaning that the color temperature of the light passing through the middle region 420*m* is further converted by the outer region 420*o*. The first, second, third, and fourth color temperatures are different from one another. In other words, the light emitted from the LED chips 102 may have a first main wavelength, the light passing through the core region 420*e* may have a second main wavelength, the light further passing through the middle region 420*m* may have a third main wavelength, and the light eventually passing through the outer region 420*o* may have a fourth main wavelength. In the embodiment, the core region 420*e* completely encloses the LED chips 102, the middle region 420*m* completely encloses the core region 420*e*, and the outer region 420*o* completely encloses the middle region 420*m*. As a result, all of the light passes through the core region 420*e*, the middle region 420*m*, and the outer region 420*o* in sequence. The overall color temperature measured from outside of the LED filament 100 may be substantially equal to the fourth color temperature.

Figure 7E:
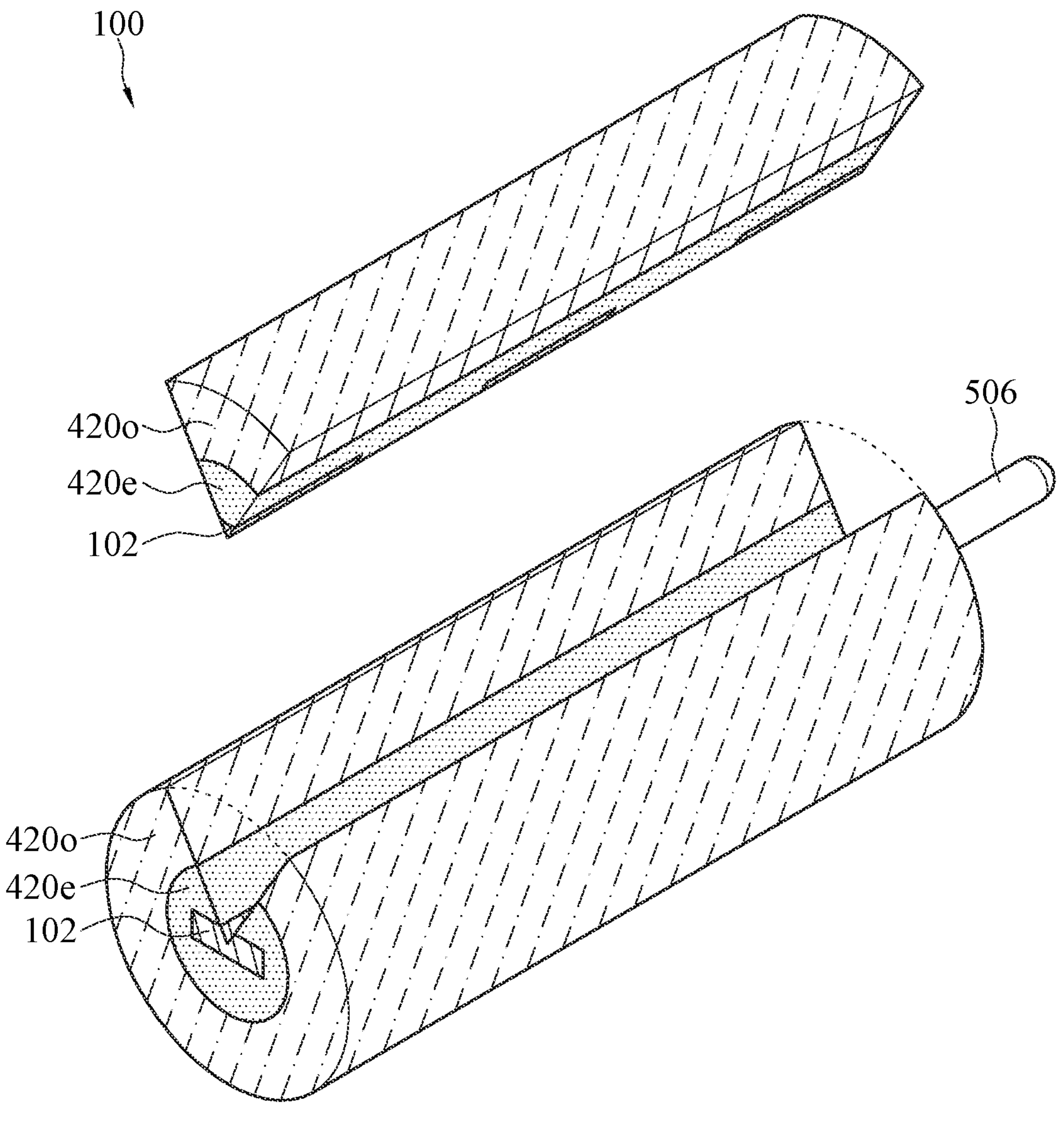

As shown in FIG. 7E, a difference between the enclosure 108 in FIG. 7E and the enclosure 108 in FIG. 7D is that the enclosure 108 in FIG. 7E includes two regions 420*e*, 420*o* defined by a hypothetical pair of coaxial cylindrical surfaces compartmentalizing the enclosure 108 into a core region 420*e* and an outer region 420*o*. The linear array of LED chips 102 is disposed exclusively in the core region 420*e* of the enclosure 108 and is spaced apart by the core region 420*e* from the outer region 420*o*. In an embodiment, the outer region 420*o* includes a light scatterer for increasing light extraction from the LED chip 102 by reducing total internal reflection and a wavelength converter for converting blue light emitting from the LED chip 102 into white light. In another embodiment, the outer region 420*o* is made harder than the core region 420*e* for protecting the LED chips 102. In yet another embodiment, the core region 420*e* has greater thermal conductivity than the outer region 420*o*. The core region 420*e*, having greater thermal conductivity, is thus configured to better protect the linear array of LED chips 102 from degrading or burning by removing excess heat from the LED chip 102. The outer region 420*o*, because it is spaced apart from the linear array of LED chips 102, plays a lesser role than the core region 420*e* in cooling the LED chip 102 through heat conduction. In still another embodiment, the outer region 420*o* has greater thermal radiation power than the core region 420*e*. The outer region 420*o*, having greater thermal conductivity, is thus configured to better protect the linear array of LED chips 102 from degrading or burning by removing excess heat from the LED chip 102. The core region 420*e*, because of their weaker thermal radiation power, plays a lesser role than the outer region 420*o* in cooling the LED chip 102 through thermal radiation. The core region 420*e*, having greater thermal conductivity, is thus configured to better protect the linear array of LED chips 102 from degrading or burning by removing excess heat from the LED chip 102. To enhance the ability of the LED filament 100 to reveal colors of objects faithfully in comparison with an ideal or natural light source, in still another embodiment, the core region 420*e* has an excitation spectrum (and/or emission spectrum) induced at shorter wavelengths than the outer region 420*o*. The core region 420*e* is responsible for converting light coming from the LED chip 102 at the ultraviolet range into the visible spectrum. The outer region 420*o* of the LED filament 100 is responsible for, by contrast, further converting light coming from the core region 420*e* into light having even longer wavelengths. In an embodiment, the core region 420*e* is doped with a greater concentration of phosphor particles than the outer region 420*o*. The outer region 420*o*, which is optional in some embodiments, includes a luminescent dye for converting light coming from the core region 420*e* into light having longer wavelengths and a lesser concentration of phosphor particles than the core region 420*e*. The outer region 420*o* also includes a luminescent dye for converting light coming from the core region 420*e* into light having longer wavelengths but includes no phosphor particles for keeping high flexibility of the LED filament 100. The dimension of the core region 420*e*, in which the linear array of LED chips 102 is exclusively disposed, in relation to the entire enclosure 108 is determined by a desired totality of considerations such as light conversion capability, bendability and thermal conductivity. Other things equal, the bigger the core region 420*e* in relation to the entire enclosure 108, the LED filament 100 has less light conversion capability and thermal conductivity but will be more bendable.

The LED bulb lamps according to various different embodiments of the present invention are described as above. With respect to an entire LED bulb lamp, the features including "having an electrical isolation assembly disposed on the LED lamp substrate", "adopting an electrical isolation unit covering the LED lamp substrate for electrically isolating", "having a light processing unit disposed on the electrical isolation unit for converting the outputting direction of the light emitted by the LED light sources", "having an extending portion outwardly extended from the circumferential of the bottom portion of the light processing unit", "coating an adhesive film on the inside surface or outside surface of the lamp housing or both", "coating a diffusion film on the inside surface or outside surface of the lamp housing or both", and "coating a reflecting film on the inside surface of the lamp housing", may be applied in practice singly or integrally such that only one of the features is practiced or a number of the features are simultaneously practiced.

It should be understood that the above described embodiments are merely preferred embodiments of the invention, but not intended to limit the invention. Any modifications, equivalent alternations and improvements, or any direct and indirect applications in other related technical field that are made within the spirit and scope of the invention described in the specification and the figures should be included in the protection scope of the invention.

What is claimed is:

1. An LED filament, comprising:

a plurality of LED chips arranged in an array substantially along an axial direction of the LED filament and electrically connected with one another;

two conductive electrodes disposed corresponding to the array, each of the two conductive electrodes being electrically connected to a corresponding LED chip at an end of the array; and an enclosure coated on at least two sides of the array and the two conductive electrodes, a portion of each of the two conductive electrodes being exposed from the enclosure;

and wherein a surface of the enclosure defines a surface extending direction along the axial direction of the LED filament, a long side of each of the LED chips defines an LED extending direction, the surface extending direction and the LED extending direction of at least one of the LED chips define an included angle, wherein the included angle is an acute angle.

2. The LED filament of claim 1, wherein the surface extending direction is defined by a part of the surface in a section of the LED filament along the axial direction, and the LED extending direction is defined by the long side of the LED chip in the section.

3. The LED filament of claim 2, wherein the part of the surface in the section is overlapped by the LED chip in the section along a radial direction perpendicular to the axial direction of the LED filament.

4. The LED filament of claim 3, wherein the long side of each of the LED chips is parallel with a light emitting face of the corresponding LED chip.

5. The LED filament of claim 4, wherein the enclosure comprises a top layer and a base layer; a concave-convex plane of the base layer is coated on one side of the array; the plurality of LED chips are disposed on the concave-convex plane; the top layer is coated on other sides of the array; the base layer has a base plane away from the top layer the top layer has a top plane away from the base layer; and the surface extending direction is defined by the top plane or the base plane.

6. The LED filament of claim 1, wherein the plurality of LED chips are interposed in the enclosure in a shape selecting from a group consisting of a wave-shape, a saw tooth shape, a bended shape, and a curved shape.

7. The LED filament of claim 1, wherein two adjacent LED chips of the plurality of the LED chips is connected by a first wire, a distance between the two adjacent LED chips is less than a length of the first wire.

8. The LED filament of claim 7, wherein the enclosure comprising a base layer and a top layer, and the base layer contacts with the first wire.

9. The LED filament of claim 8, wherein a thickness of the base layer is less than a thickness of the top layer.

10. The LED filament of claim 8, wherein the base layer respectively has a first slant edge and a second slant edge, and the first slant edge is aligned with the second slant edge.

11. The LED filament of claim 10, wherein the extension direction of the first slant edge intersects with the extension direction of the second edge.

12. The LED filament of claim 10, wherein the extension direction of the first slant edge intersects with the length direction of the LED filament.

13. The LED filament of claim 8, wherein the top layer contacts with the first wire.

14. The LED filament of claim 1, wherein one of the two conductive electrodes connected with one of the plurality of the LED chips by a second wire, a distance between the one of the two conductive electrodes and the one of the plurality of the LED chips is less than a length of the second wire.

15. A LED light bulb comprising:

a bulb shell;

a bulb base connected with the bulb shell;

at least two conductive supports disposed in the bulb shell;

a driving circuit electrically connected with the at least two conductive supports and the bulb base; and the LED filament of claim 1 disposed in the bulb shell.

16. The LED light bulb of claim 15, wherein the surface extending direction is defined by a part of the surface in a section of the LED filament along the axial direction, and the LED extending direction is defined by the long side of the LED chip in the section.

17. The LED light bulb of claim 16, wherein the part of the surface in the section is overlapped by the LED chip in the section along a radial direction perpendicular to the axial direction of the LED filament.

18. The LED light bulb of claim 16, wherein the enclosure comprises a top layer and a base layer; a concave-convex plane of the base layer is coated on one side of the array; the plurality of LED chips are disposed on the concave-convex plane; the top layer is coated on other sides of the array; the base layer has a base plane away from the top layer; the top layer has a top plane away from the base layer; and the surface extending direction is defined by the top plane or the base plane.

* * * * *